US010763501B2

(12) United States Patent
Feaver et al.

(10) Patent No.: US 10,763,501 B2
(45) Date of Patent: Sep. 1, 2020

(54) NANO-FEATURED POROUS SILICON MATERIALS

(71) Applicant: Group14 Technologies, Inc., Woodinville, WA (US)

(72) Inventors: Aaron M. Feaver, Seattle, WA (US); Leah A. Thompkins, Seattle, WA (US); Katharine Geramita, Seattle, WA (US); Benjamin E. Kron, Seattle, WA (US); Avery J. Sakshaug, Everett, WA (US); Sarah Fredrick, Seattle, WA (US); Henry R. Costantino, Woodinville, WA (US); Chad Goodwin, Seattle, WA (US); Christopher Timmons, Seattle, WA (US); Farshid Afkhami, Woodinville, WA (US); Adam Strong, Lake Forest Park, WA (US)

(73) Assignee: Group14 Technologies, Inc., Woodinville, WA (US)

( * ) Notice: Subject to any disclaimer, the term of this patent is extended or adjusted under 35 U.S.C. 154(b) by 0 days.

(21) Appl. No.: 15/752,566

(22) PCT Filed: Aug. 12, 2016

(86) PCT No.: PCT/US2016/046882
§ 371 (c)(1),
(2) Date: Feb. 13, 2018

(87) PCT Pub. No.: WO2017/030995
PCT Pub. Date: Feb. 23, 2017

(65) Prior Publication Data
US 2018/0331356 A1  Nov. 15, 2018

Related U.S. Application Data

(60) Provisional application No. 62/205,542, filed on Aug. 14, 2015, provisional application No. 62/208,357,
(Continued)

(51) Int. Cl.
*C23F 1/00* (2006.01)
*H01M 4/38* (2006.01)
(Continued)

(52) U.S. Cl.
CPC .......... *H01M 4/386* (2013.01); *C01B 33/021* (2013.01); *C23F 1/00* (2013.01); *H01M 4/366* (2013.01);
(Continued)

(58) Field of Classification Search
None
See application file for complete search history.

(56) References Cited

U.S. PATENT DOCUMENTS 3,518,123 A   6/1970   Katsoulis et al.
3,619,428 A   11/1971  David
(Continued)

FOREIGN PATENT DOCUMENTS

CA   2176452 A1   11/1997
CN   1554102 A    12/2004
(Continued)

OTHER PUBLICATIONS

Malvern Instruments Worldwide, "A basic guide to particle characterization," URL=http://golik.co.il/Data/ABasicGuidtoParticleCharacterization(2)1962085150.pdf, 2012. (24 pages).
(Continued)

*Primary Examiner* — Shamim Ahmed
(74) *Attorney, Agent, or Firm* — Seed Intellectual Property Law Group LLP

(57) ABSTRACT

Porous silicon and methods for preparation and use of the same are disclosed. The porous silicon materials have utility either alone or in combination with other materials, for example, combined with carbon particles for energy storage applications.

24 Claims, 24 Drawing Sheets

Schematic of dunk tank for production of nano-featured porous silicon.

Related U.S. Application Data filed on Aug. 21, 2015, provisional application No. 62/209,651, filed on Aug. 25, 2015, provisional application No. 62/271,795, filed on Dec. 28, 2015, provisional application No. 62/271,799, filed on Dec. 28, 2015.

(51) Int. Cl.
  *C01B 33/021* (2006.01)
  *H01M 10/0525* (2010.01)
  *H01M 4/36* (2006.01)
  *H01M 4/587* (2010.01)
  *H01M 4/02* (2006.01)

(52) U.S. Cl.
  CPC ....... *H01M 4/587* (2013.01); *H01M 10/0525* (2013.01); *C01P 2002/72* (2013.01); *C01P 2002/85* (2013.01); *C01P 2004/03* (2013.01); *C01P 2006/10* (2013.01); *C01P 2006/11* (2013.01); *C01P 2006/12* (2013.01); *C01P 2006/14* (2013.01); *C01P 2006/16* (2013.01); *C01P 2006/17* (2013.01); *C01P 2006/21* (2013.01); *C01P 2006/40* (2013.01); *C01P 2006/80* (2013.01); *H01M 2004/021* (2013.01); *H01M 2004/027* (2013.01)

(56) References Cited

U.S. PATENT DOCUMENTS

| | | | |
|---|---|---|---|
| 3,876,505 A | 4/1975 | Stoneburner | |
| 3,892,580 A * | 7/1975 | Messing | B01D 39/2075 501/80 |
| 3,977,901 A | 8/1976 | Buzzelli | |
| 4,082,694 A | 4/1978 | Wennerberg et al. | |
| 4,159,913 A | 7/1979 | Birchall et al. | |
| 4,198,382 A | 4/1980 | Matsui | |
| 4,543,341 A | 9/1985 | Barringer et al. | |
| 4,580,404 A | 4/1986 | Pez et al. | |
| 4,769,197 A | 9/1988 | Kromrey | |
| 4,843,015 A | 6/1989 | Grubbs, Jr. et al. | |
| 4,862,328 A | 8/1989 | Morimoto et al. | |
| 4,873,218 A | 10/1989 | Pekala | |
| 4,954,469 A | 9/1990 | Robinson | |
| 4,997,804 A | 3/1991 | Pekala | |
| 4,999,330 A | 3/1991 | Bose et al. | |
| 5,061,416 A | 10/1991 | Willkens et al. | |
| 5,093,216 A | 3/1992 | Azuma et al. | |
| 5,260,855 A | 11/1993 | Kaschmitter et al. | |
| 5,294,498 A | 3/1994 | Omaru et al. | |
| 5,416,056 A | 5/1995 | Baker | |
| 5,420,168 A | 5/1995 | Mayer et al. | |
| 5,465,603 A | 11/1995 | Anthony et al. | |
| 5,508,341 A | 4/1996 | Mayer et al. | |
| 5,529,971 A | 6/1996 | Kaschmitter et al. | |
| 5,614,460 A | 3/1997 | Schwarz et al. | |
| 5,626,637 A | 5/1997 | Baker | |
| 5,626,977 A | 5/1997 | Mayer et al. | |
| 5,670,571 A | 9/1997 | Gabrielson et al. | |
| 5,674,642 A | 10/1997 | Le et al. | |
| 5,710,092 A | 1/1998 | Baker | |
| 5,726,118 A | 3/1998 | Ivey et al. | |
| 5,744,258 A | 4/1998 | Bai et al. | |
| 5,789,338 A | 8/1998 | Kaschmitter et al. | |
| 5,834,138 A | 11/1998 | Yamada et al. | |
| 5,858,486 A | 1/1999 | Metter et al. | |
| 5,882,621 A | 3/1999 | Doddapaneni et al. | |
| 5,891,822 A | 4/1999 | Oyama et al. | |
| 5,908,896 A | 6/1999 | Mayer et al. | |
| 5,945,084 A | 8/1999 | Droege | |
| 5,965,483 A | 10/1999 | Baker et al. | |
| 6,006,797 A | 12/1999 | Bülow et al. | |
| 6,064,560 A | 5/2000 | Hirahara et al. | |
| 6,069,107 A | 5/2000 | Kuznetsov et al. | |
| 6,072,693 A | 6/2000 | Tsushima et al. | |
| 6,096,456 A | 8/2000 | Takeuchi et al. | |
| 6,117,585 A | 9/2000 | Anani et al. | |
| 6,147,213 A | 11/2000 | Poli et al. | |
| 6,153,562 A | 11/2000 | Villar et al. | |
| 6,205,016 B1 | 3/2001 | Niu | |
| 6,225,257 B1 | 5/2001 | Putyera et al. | |
| 6,242,127 B1 | 6/2001 | Paik et al. | |
| 6,268,081 B1 | 7/2001 | Clough | |
| 6,309,446 B1 | 10/2001 | Nakanoya et al. | |
| 6,310,762 B1 | 10/2001 | Okamura et al. | |
| 6,339,528 B1 | 1/2002 | Lee et al. | |
| 6,509,119 B1 | 1/2003 | Kobayashi et al. | |
| 6,574,092 B2 | 6/2003 | Sato et al. | |
| 6,592,838 B1 | 7/2003 | Nomoto et al. | |
| 6,631,072 B1 | 10/2003 | Paul et al. | |
| 6,631,073 B1 | 10/2003 | Sakata et al. | |
| 6,697,249 B2 | 2/2004 | Maletin et al. | |
| 6,764,667 B1 | 7/2004 | Steiner, III | |
| 6,815,105 B2 | 11/2004 | Cooper et al. | |
| 6,865,068 B1 | 3/2005 | Murakami et al. | |
| 7,245,478 B2 | 7/2007 | Zhong et al. | |
| 7,419,649 B2 | 9/2008 | Lundquist et al. | |
| 7,582,902 B2 | 9/2009 | Tano et al. | |
| 7,626,804 B2 | 12/2009 | Yoshio et al. | |
| 7,722,991 B2 | 5/2010 | Zhang et al. | |
| 7,723,262 B2 | 5/2010 | Feaver et al. | |
| 7,754,178 B2 | 7/2010 | Tano et al. | |
| 7,785,495 B2 | 8/2010 | Kikuchi et al. | |
| 7,816,413 B2 | 10/2010 | Feaver et al. | |
| 7,835,136 B2 | 11/2010 | Feaver et al. | |
| 8,158,556 B2 | 4/2012 | Feaver et al. | |
| 8,293,818 B2 | 10/2012 | Costantino et al. | |
| 8,329,252 B2 | 12/2012 | Markavov et al. | |
| 8,361,659 B2 | 1/2013 | Richard | |
| 8,404,384 B2 | 3/2013 | Feaver et al. | |
| 8,411,415 B2 | 4/2013 | Yoshinaga et al. | |
| 8,467,170 B2 | 6/2013 | Feaver et al. | |
| 8,480,930 B2 | 7/2013 | Suh et al. | |
| 8,482,900 B2 | 7/2013 | Gadkaree et al. | |
| 8,580,870 B2 | 11/2013 | Costantino et al. | |
| 8,654,507 B2 | 2/2014 | Costantino et al. | |
| 8,691,177 B2 | 4/2014 | Pfeifer et al. | |
| 8,709,971 B2 | 4/2014 | Feaver et al. | |
| 8,797,717 B2 | 8/2014 | Feaver et al. | |
| 8,906,978 B2 | 12/2014 | Costantino et al. | |
| 8,916,296 B2 | 12/2014 | Feaver et al. | |
| 8,999,202 B2 | 4/2015 | Mulik et al. | |
| 9,005,812 B2 | 4/2015 | Ma et al. | |
| 9,067,848 B2 | 6/2015 | Stadie et al. | |
| 9,112,230 B2 | 8/2015 | Feaver et al. | |
| 9,133,295 B2 | 9/2015 | Qureshi et al. | |
| 9,133,337 B2 | 9/2015 | Ludvik et al. | |
| 9,136,064 B2 | 9/2015 | Gadkaree et al. | |
| 9,186,174 B2 | 11/2015 | Krishnan | |
| 9,269,502 B2 | 2/2016 | Chang et al. | |
| 9,287,556 B2 | 3/2016 | Neumann et al. | |
| 9,409,777 B2 | 8/2016 | Geramita et al. | |
| 9,412,523 B2 | 8/2016 | Costantino et al. | |
| 9,464,162 B2 | 10/2016 | Kron et al. | |
| 9,580,321 B2 | 2/2017 | Feaver et al. | |
| 9,666,860 B2 | 5/2017 | Lam et al. | |
| 9,680,159 B2 | 6/2017 | Feaver et al. | |
| 9,709,971 B2 | 7/2017 | Ellis | |
| 9,714,172 B2 | 7/2017 | Geramita et al. | |
| 9,985,289 B2 | 5/2018 | Costantino et al. | |
| 10,141,122 B2 | 11/2018 | Feaver et al. | |
| 10,147,950 B2 | 12/2018 | Sakshaug et al. | |
| 10,173,900 B2 | 1/2019 | Ludvik et al. | |
| 10,195,583 B2 | 2/2019 | Costantino et al. | |
| 10,273,328 B2 | 4/2019 | Kron et al. | |
| 10,287,170 B2 | 5/2019 | Feaver et al. | |
| 10,361,428 B2 * | 7/2019 | Kim | H01M 4/386 |
| 10,454,103 B2 | 10/2019 | Sakshaug et al. | |
| 10,490,358 B2 | 11/2019 | Feaver et al. | |
| 10,522,836 B2 | 12/2019 | Thompkins et al. | |
| 2001/0002086 A1 | 5/2001 | Webb | |
| 2002/0031706 A1 | 3/2002 | Dasgupta et al. | |
| 2002/0031710 A1 | 3/2002 | Kezuka et al. | |

(56) References Cited

U.S. PATENT DOCUMENTS

| | | |
|---|---|---|
| 2002/0036885 A1 | 3/2002 | Lee et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0108785 A1 | 6/2003 | Wu et al. |
| 2003/0170548 A1 | 9/2003 | Otsuki et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1 | 3/2005 | Kurihara et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0266990 A1 | 12/2005 | Iwasaki et al. |
| 2005/0282062 A1 | 12/2005 | Manako et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |
| 2007/0166602 A1 | 7/2007 | Burchardt |
| 2008/0011986 A1 | 1/2008 | Yamakawa et al. |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0279172 A1 | 11/2010 | Hwang et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0200848 A1 | 8/2011 | Chiang et al. |
| 2011/0223494 A1 | 9/2011 | Feaver et al. |
| 2011/0281180 A1 | 11/2011 | Kim et al. |
| 2011/0287189 A1 | 11/2011 | Shembel |
| 2011/0300447 A1 | 12/2011 | Archer |
| 2011/0311873 A1 | 12/2011 | Schulz et al. |
| 2012/0045685 A1 | 2/2012 | Seki et al. |
| 2012/0129049 A1 | 5/2012 | Rayner |
| 2012/0156493 A1 | 6/2012 | Maisels et al. |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0004841 A1 | 1/2013 | Thompkins et al. |
| 2013/0082213 A1 | 4/2013 | Duncan et al. |
| 2013/0169238 A1 | 7/2013 | Rojeski |
| 2013/0189575 A1 | 7/2013 | Anguchamy et al. |
| 2013/0196158 A1* | 8/2013 | Yoshida ............. H01M 4/386 428/402 |
| 2013/0244862 A1 | 9/2013 | Ivanovici et al. |
| 2013/0252082 A1 | 9/2013 | Thompkins et al. |
| 2013/0280601 A1 | 10/2013 | Geramita et al. |
| 2013/0295462 A1 | 11/2013 | Atanassova et al. |
| 2013/0337334 A1 | 12/2013 | Tao et al. |
| 2013/0344391 A1 | 12/2013 | Yushin et al. |
| 2014/0038042 A1 | 2/2014 | Rios et al. |
| 2014/0094572 A1 | 4/2014 | Costantino et al. |
| 2014/0170482 A1 | 6/2014 | Park et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0162603 A1 | 6/2015 | Yushin et al. |
| 2015/0207148 A1 | 7/2015 | Kimura et al. |
| 2015/0238917 A1 | 8/2015 | Mulik et al. |
| 2015/0306570 A1 | 10/2015 | Mayes et al. |
| 2016/0039970 A1 | 2/2016 | Kron et al. |
| 2016/0043384 A1 | 2/2016 | Zhamu et al. |
| 2016/0104882 A1 | 4/2016 | Yushin et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0316888 A1 | 11/2017 | Geramita et al. |
| 2017/0346084 A1 | 11/2017 | Sakshaug et al. |
| 2017/0349442 A1 | 12/2017 | Feaver et al. |
| 2018/0097240 A1 | 4/2018 | Feaver et al. |
| 2018/0130609 A1 | 5/2018 | Feaver et al. |
| 2018/0294484 A1 | 10/2018 | Fredrick et al. |
| 2019/0088931 A1 | 3/2019 | Abrahamson et al. |
| 2019/0097222 A1 | 3/2019 | Feaver et al. |
| 2019/0103608 A1 | 4/2019 | Costantino et al. |
| 2019/0259546 A1 | 8/2019 | Kron et al. |
| 2019/0267622 A1 | 8/2019 | Sakshaug et al. |
| 2019/0280298 A1 | 9/2019 | Sakshaug et al. |
| 2019/0287737 A1 | 9/2019 | Feaver et al. |
| 2019/0358607 A1 | 11/2019 | Costantino et al. |

FOREIGN PATENT DOCUMENTS

| | | |
|---|---|---|
| CN | 1762900 A | 4/2006 |
| CN | 1986401 A | 6/2007 |

(56) References Cited

FOREIGN PATENT DOCUMENTS

| | | |
|---|---|---|
| CN | 101194384 A | 6/2008 |
| CN | 101318648 A | 12/2008 |
| CN | 101604743 A | 12/2009 |
| CN | 101969120 A | 2/2011 |
| CN | 102482095 A | 5/2012 |
| CN | 102820455 A | 12/2012 |
| CN | 102834955 A | 12/2012 |
| CN | 103094528 A | 5/2013 |
| CN | 103746098 A | 4/2014 |
| CN | 104108698 A | 10/2014 |
| CN | 102509781 B | 11/2015 |
| DE | 10 2010 049 249 A1 | 4/2012 |
| EP | 0 649 815 A1 | 4/1995 |
| EP | 0 861 804 A1 | 9/1998 |
| EP | 1 049 116 A1 | 11/2000 |
| EP | 1 052 716 A2 | 11/2000 |
| EP | 1 115 130 A1 | 7/2001 |
| EP | 1 248 307 A1 | 10/2002 |
| EP | 1 514 859 A2 | 3/2005 |
| EP | 2 117 068 A1 | 11/2009 |
| EP | 2 983 186 A1 | 2/2016 |
| JP | 2-300222 A | 12/1990 |
| JP | 4-59806 A | 2/1992 |
| JP | 4-139174 A | 5/1992 |
| JP | 5-117493 A | 5/1993 |
| JP | 5-156121 A | 6/1993 |
| JP | 5-320955 A | 12/1993 |
| JP | 8-59919 A | 3/1996 |
| JP | 8-112539 A | 5/1996 |
| JP | 9-63905 A | 3/1997 |
| JP | 9-275042 A | 10/1997 |
| JP | 9-328308 A | 12/1997 |
| JP | 7-232908 A | 4/1998 |
| JP | 10-297912 A | 11/1998 |
| JP | 2001-89119 A | 4/2001 |
| JP | 2001-278609 A | 10/2001 |
| JP | 2002-532869 A | 10/2002 |
| JP | 2004-67498 A | 3/2004 |
| JP | 2004-514637 A | 5/2004 |
| JP | 2004-203715 A | 7/2004 |
| JP | 2004-221332 A | 8/2004 |
| JP | 2004-315283 A | 11/2004 |
| JP | 2005-93984 A | 4/2005 |
| JP | 2005-132696 A | 5/2005 |
| JP | 2005-136397 A | 5/2005 |
| JP | 2005-187320 A | 7/2005 |
| JP | 2006-160597 A | 6/2006 |
| JP | 2006-248848 A | 9/2006 |
| JP | 2006-264993 A | 10/2006 |
| JP | 2007-115749 A | 5/2007 |
| JP | 2008-7387 A | 1/2008 |
| JP | 2008-94925 A | 4/2008 |
| JP | 2009-259803 A | 11/2009 |
| JP | 2012-121796 A | 6/2012 |
| KR | 10-2004-0080010 A | 9/2004 |
| WO | 95/01165 A1 | 1/1995 |
| WO | 98/30496 A1 | 7/1998 |
| WO | 02/39468 A2 | 5/2002 |
| WO | 2004/087285 A1 | 10/2004 |
| WO | 2004/099073 A2 | 11/2004 |
| WO | 2004/110930 A1 | 12/2004 |
| WO | 2005/043653 A1 | 5/2005 |
| WO | 2007/061761 A1 | 5/2007 |
| WO | 2008/047700 A1 | 4/2008 |
| WO | 2008/113133 A1 | 9/2008 |
| WO | 2009/032104 A2 | 3/2009 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/071916 A1 | 6/2012 |
| WO | 2012/092210 A1 | 7/2012 |
| WO | 2013/120009 A1 | 8/2013 |
| WO | 2013/120011 A1 | 8/2013 |
| WO | 2014/201275 A2 | 12/2014 |

OTHER PUBLICATIONS

Huang et al., "Nitrogen-containing mesoporous carbons prepared from melamine formaldehyde resins with $CaCl_2$ as a template," *Journal of Colloid and Interface Science* 363:193-198, 2011.

Xiang et al., "Beneficial effects of activated carbon additives on the performance of negative lead-acid battery electrode for high-rate partial-state-of-charge operation," *Journal of Power Sources* 241:150-158, 2013. (10 pages).

Zhao et al., "Highly-Ordered Mesoporous Carbon Nitride with Ultrahigh Surface Area and Pore Volume as a Superior Dehydrogenation Catalyst," *Chem. Mater.* 26:3151-3161, 2014.

Abánades et al., "Experimental Analysis of Direct Thermal Methane Cracking," *International Journal of Hydrogen Energy* 36(20):12877-12886, 2011.

Abraham et al., "A Polymer Electrolyte-Based Rechargeable Lithium/Oxygen Battery," *J. Electrochem. Soc.* 143(1):1-5, Jan. 1996.

Alcañiz-Monge et al., "Methane Storage in Activated Carbon Fibres," *Carbon* 35(2):291-297, 1997.

Anderegg, "Grading Aggregates: II—The Application of Mathematical Formulas to Mortars," *Industrial and Engineering Chemistry* 23(9): 1058-1064, 1931.

Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).

Babić et al., "Carbon cryogel as support of platinum nano-sized electrocatalyst for the hydrogen oxidation reaction," *Electrochimica Acta* 51:3820-3826, 2006.

Babić et al., "Characterization of carbon cryogel synthesized by sol-gel polycondensation and freeze-drying," *Carbon* 42:2617-2624, 2004.

Babić et al., "Characterization of carbon cryogels synthesized by sol-gel polycondensation," *J. Serb. Chem. Soc.* 70(1):21-31, 2005.

Barbieri et al., "Capacitance limits of high surface area activated carbons for double layer capacitors," *Carbon* 43:1303-1310, 2005.

Barton et al., "Tailored Porous Materials," *Chem. Mater.* 11:2633-2656, 1999.

Beattie et al., "High-Capacity Lithium-Air Cathodes," *J. Electrochem. Soc.* 156(1):A44-A47, 2009.

Besenhard, "Handbook of battery materials," Weinheim, Wiley—VCH, Weinheim, New York, 398-401, Dec. 31, 1999.

Bock et al., "Structural Investigation of Resorcinol Formaldehyde and Carbon Aerogels Using SAXS and BET," *Journal of Porous Materials* 4:287-294, 1997.

Buiel, et al., "Li-insertion in hard carbon anode materials for Li-ion batteries," *Electrochimica Acta* 45:121-130, 1999.

Burchell et al., "Low Pressure Storage of Natural Gas for Vehicular Applications," *The Engineering Society for Advancing Mobility Land Sea Air and Space, Government/Industry Meeting,* Washington D.C., Jun. 19-21, 2000, 7 pages.

Butler et al., "Braking Performance Test Procedure for the Hybrid Vehicle Energy Storage Systems: Capacitor Test Results," Joint International Meeting of the Electrochemical Society, Abstract 684, Honolulu, HI, Oct. 3-8, 2004, 5 pages.

Cao et al., "Li-ion capacitors with carbon cathode and hard carbon/stabilized lithium metal powder anode electrodes," *Journal of Power Sources* 213:180-185, Apr. 2012.

Chmiola et al., "Anomalous Increase in Carbon Capacitance at Pore Sizes Less Than 1 Nanometer," *Science* 313:1760-1763, Sep. 22, 2006.

Conway et al., "Partial Molal Volumes of Tetraalkylammonium Halides and Assignment of Individual Ionic Contributions," *Trans. Faraday Soc.* 62:2738-2749, 1966.

Czakkel et al., "Influence of drying on the morphology of resorcinol-formaldehyde-based carbon gels," *Microporous and Mesoporous Materials* 86:124-133, 2005.

(56) References Cited

OTHER PUBLICATIONS

Débart et al., "α-MnO2 Nanowires: A Catalyst for the O2 Electrode in Rechargeable Lithium Batteries," *Agnew. Chem. Int. Ed.* 47:4521-4524, 2008.
Ding et al., "How Conductivities and Viscosities of PC-DEC and PC-EC Solutions of LiBF4, LiPF6, LiBOB, Et4NBF4, and Et4NBF6 Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Fotouhi et al., "A Low Cost, Disposable Cable-Shaped AI-Air Battery for Portable Biosensors," *J. Micromech. Microeng.* 26:055011, 2016. (8 pages).
Furnas, "Grading Aggregates I—Mathematical Relations for Beds of Broken Solids of Maximum Density," *Industrial and Engineering Chemistry* 23(9): 1052-1058, 1931.
Gao et al., "Nitrogen-rich graphene from small molecules as high performance anode material," *Nanotechnology* 25:415402, 2014, 8 pages.
Gouérec et al., "Preparation and Modification of Polyacrylonitrile Microcellular Foam Films for Use as Electrodes in Supercapacitors," *Journal of the Electrochemical Society* 148(1):A94-A101, 2001.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hong et al., "Hydrogen evolution inhibition with diethylenetriamine modification of activated carbon for a lead-acid battery," *RSC Adv.* 4:33574-33577, 2014.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Indo German Carbons Limited, "Activated Carbon," Apr. 2009, URL=http://www.igcl.com/php/activated_carbon.php, download date Nov. 29, 2018, 3 pages.
Inomata et al., "Natural gas storage in activated carbon pellets without a binder," *Carbon* 40:87-93, 2002.
Job et al., "Carbon aerogels, cryogels and xerogels: Influence of the drying method on the textural properties of porous carbon materials," *Carbon* 43:2481-2494, 2005.
Job et al., "Highly dispersed platinum catalysts prepared by impregnation of texture-tailored carbon xerogels," *Journal of Catalysis* 240:160-171, 2006.
Job et al., "Synthesis of transition metal-doped carbon xerogels by solubilization of metal salts in resorcinol-formaldehyde aqueous solution," *Carbon* 42:3217-3227, 2004.
Khomenko et al., "High-voltage asymmetric supercapacitors operating in aqueous electrolyte," *Appl. Phys. A* 82:567-573, 2006.

Kim et al., "Correlation between the capacitor performance and pore structure," *Tanso* 221:31-39, 2006.
Kim et al., "Adsorption of phenol and reactive dyes from aqueous solution on carbon cryogel microspheres with controlled porous structure," *Microporous and Mesoporous Materials* 96:191-196, 2006.
Kocklenberg et al., "Texture control of freeze-dried resorcinol-formaldehyde gels," *Journal of Non-Crystalline Solids* 225:8-13, 1998.
Konno et al., "Preparation of activated carbon having the structure derived from biomass by alkali activation with NaOH, and its application for electric double-layer capacitor," *Tanso* 231:2-7, 2008.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Influence of pore structure and surface chemistry on electric double layer capacitance in non-aqueous electrolyte," *Carbon* 41:1765-1775, 2003.
Lozano-Castelló et al., "Powdered Activated Carbons and Activated Carbon Fibers for Methane Storage: A Comparative Study," *Energy & Fuels* 16:1321-1328, 2002.
McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci.* 5:9363-9373, 2012.
Nishihara et al., "Preparation of resorcinol—formaldehyde carbon cryogel microhoneycombs," *Carbon* 42:899-901, 2004.
Ogasawara et al., "Rechargeable Li2O2 Electrode for Lithium Batteries," *Journal American Chemical Society* 128(4):1390-1393, 2006.
Otowa et al., "Production and adsorption characteristics of MAXSORB: High-surface-area active carbon," *Gas Separation and Purification* 7(4):241-245, 1993.
Pääkkö, "Long and entangled native cellulose I nanofibers allow flexible aerogels and hierarchically porous templates for functionalities," *Soft Matter* 4:2492-2499, 2008.
Pekala et al., "Aerogels derived from multifunctional organic monomers," *Journal of Non-Crystalline Solids* 145:90-98, 1992.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pimenta et al., "Studying disorder in graphite-based systems by Raman spectroscopy," *Phys. Chem. Chem. Phys.* 9:1276-1291, 2007.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from N2, Ar, and CO2 Adsorption Isotherms," *Langmuir* 16:2311-2320, 2000.
Read, "Ether-Based Electrolytes for the Lithium/Oxygen Organic Electrolyte Battery," *J. Electrochem. Soc.* 153(1):A96-A100, 2006.
Read et al., "Oxygen Transport Properties of Organic Electrolytes and Performance of Lithium/Oxygen Battery," *J. Electrochem. Soc.* 150(10):A1351-A1356, 2003.
Read, "Characterization of the Lithium/Oxygen Organic Electrolyte Battery," *J. Electrochemical Soc.* 149(9):A1190-A1195, 2002.

(56) References Cited

OTHER PUBLICATIONS

Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between a High Resolution αs-Plot and the Pore Size Distribution for Activated Carbon," *Carbon* 36(10):1459-1467, 1998.
Sigma Aldrich, "Triton X-100," Data Sheet, URL=https://www.sigmaaldrich.com/catalog/product/roche/11332481001?lang=en&region=US, download date Feb. 21, 2019.
Simon et al., "Materials for electrochemical capacitors," *Nature Materials* 7:845-854, Nov. 2008.
Sivakkumar et al., "Evaluation of Lithium-ion capacitors assembled with pre-lithiated graphite anode and activated carbon cathode," *Electrochimica Acta* 65:280-287, Jan. 2012.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso Carbon Products, "Special Graphite and Compound Material Products," Toyo Tanso Co., Ltd. Catalog published 2008.
Toyo Tanso, "Graphite Applications," Toyo Tanso Co., Ltd. Catalog published 1998. (Machine Translation Attached).
Toyo Tanso, "Isotropic Graphite Engineering Data," Toyo Tanso Co., Ltd. Catalog published 1994.
Toyo Tanso, "Isotropic Graphite Technical Data," Toyo Tanso Co., Ltd. Catalog published 1997.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xie et al., "Pore size control of Pitch-based activated carbon fibers by pyrolytic deposition of propylene," *Applied Surface Science* 250:152-160, 2005.
Xu et al., "Optimization of Nonaqueous Electrolytes for Primary Lithium/Air Batteries Operated in Ambient Environment," *Journal of the Electrochemical Society* 156(10):A773-A779, 2009.
Xu et al., "Synthesis of mesoporous carbon and its adsorption property to biomolecules," *Microporous and Mesoporous Materials* 115:461-468, 2008.
Yamamoto et al., "Porous properties of carbon gel microspheres as adsorbents for gas separation," *Carbon* 42:1671-1676, 2004.
Yamamoto et al., "Control of mesoporosity of carbon gels prepared by sol-gel polycondensation and freeze drying," *Journal of Non-Crystalline Solids* 288:46-55, 2001.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte Li/O2 battery," *Journal of Power Sources* 195:1235-1240, 2010.

\* cited by examiner

SEM of an exemplary porous silicon material demonstrating nano-scale features.

SEM for material according to example 4-1.

SEM for material according to example 4-3.

SEM for material according to example 4-4.

SEM for material according to example 4-5.

SEM for material according to example 4-6.

SEM for material according to example 4-10.

SEM for material according to example 4-11.

SEM for material according to example 4-15

SEM for heat-treated nano-featured porous silicon.

SEM for nano-sized nano-featured porous silicon.

Schematic of electrochemical process for production of nano-featured porous silicon.

NANO-FEATURED POROUS SILICON MATERIALS

BACKGROUND

Technical Field

The present invention generally relates to porous silicon materials, and carbon-impregnated silicon materials produced therefrom, and related manufacturing methods. The silicon materials exhibit nano-features and extraordinary friability. The porous silicon materials and/or carbon-impregnated silicon materials have utility either alone or in combination with other materials, for example, combined with carbon particles as composition of matter for energy storage applications. Said energy storage applications include employing the materials herein as electrode materials for lithium ion batteries and related energy storage devices employing lithium or lithium ions, for instance lithium air batteries. In certain embodiments, the materials disclosed herein have utility as anode materials for energy storage devices such as lithium ion batteries and related energy storage device employing lithium or lithium ions. Thus, the present invention also relates to compositions and devices containing such materials and methods related to the same.

Description of the Related Art

Lithium-based electrical storage devices have potential to replace devices currently used in any number of applications. For example, current lead acid automobile batteries are not adequate for next generation all-electric and hybrid electric vehicles due to irreversible, stable sulfate formations during discharge. Lithium ion batteries are a viable alternative to the lead-based systems currently used due to their capacity, and other considerations. Carbon is one of the primary materials used in both lithium secondary batteries and hybrid lithium-ion capacitors (LIC). The carbon anode typically stores lithium in between layered graphite sheets through a mechanism called intercalation. Traditional lithium ion batteries are comprised of a graphitic carbon anode and a metal oxide cathode; however such graphitic anodes typically suffer from low power performance and limited capacity.

Silicon, tin, and other lithium alloying electrochemical modifiers have also been proposed based on their ability to store very large amounts of lithium per unit weight. However, these materials are fundamentally limited by the substantial swelling that occurs when they are fully lithiated. This swelling and shrinkage when the lithium is removed results in an electrode that has limited cycle life and low power. The solution thus far has been to use very small amounts of alloying electrochemical modifier in a largely carbon electrode, but this approach does not impart the desired increase in lithium capacity. Finding a way to increase the alloying electrochemical modifier content in an anode composition while maintaining cycle stability is desired to increase capacity. A number of approaches have been utilized involving nano-structured alloying electrochemical modifier, blends of carbon with alloying electrochemical modifier, or deposition of alloying electrochemical modifier onto carbon using vacuum or high temperature. However none of these processes has proven to combine a scalable process that results in the desired properties.

Current technology for achieving nano sized silicons are expensive and difficult to scale, for instance technologies based on vapor deposition of silicon-containing gases such as silane or trichlorosilane. There continues to be a need in the art for easily scalable, inexpensive, and improved processes for producing porous silicon materials comprising nano-sized particles and/or exhibiting nano-features that, upon combination with a suitable hard carbon material, can generate the desired electrochemical properties. The current invention meets this need, and provides further related advantages.

BRIEF SUMMARY

In general terms, the current invention is directed to porous silicon materials, and their manufacturing, and composites comprising the porous silicon materials and hard carbon materials, and their manufacturing. The porous silicon materials and the composites that contain the porous silicon materials and hard carbon materials provide optimized lithium storage and utilization properties. The novel porous silicon and composite materials find utility in any number of electrical energy storage devices, for example as electrode material in lithium-based electrical energy storage devices (e.g., lithium ion batteries). Electrodes comprising the porous silicon and composite materials display high reversible capacity, high first cycle efficiency, high power performance or any combination thereof. The present inventors have discovered that such improved electrochemical performance is related, at least in part, to the porous silicon and carbon materials physical and chemical properties such as surface area, pore structure, crystallinity, surface chemistry and other properties as well as the approaches used to manufacture and compound the materials.

Accordingly, in one embodiment, the present disclosure provides for the manufacturing of a porous silicon material with nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the the silicon alloy in to the liquid medium to yield porous silicon particles with nano-sized features; and
  c) removing the liquid medium to yield dried porous silicon particles with nano-sized features.

Accordingly, in one embodiment, the present disclosure provides for the manufacturing of a highly friable silicon material with nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield highly friable silicon material with nano-sized features; and
  c) removing the liquid medium to yield dried highly friable silicon material with nano-sized features Accordingly, in another embodiment, the present disclosure provides for the manufacturing of a nano-sized porous silicon particle with nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield highly friable silicon material with nano-sized features c) removing the liquid medium to yield dried highly friable silicon material with nano-sized features; and d) particle size reduction of the friable silicon material with nano-sized features to yield nano-sized silicon particles with nano-sized features The particle size reduction in the above embodiment can be carried out as known in the art, for example by jet milling in the presence of various gases including air, nitrogen, argon, helium, supercritical steam, and other gases known in the art. Other particle size reducing methods are known in the art, such as ball milling, attrition milling, cryogenic grinding, and the like.

Accordingly, in some embodiments the present disclosure provides a porous silicon material having high first cycle efficiency and high reversible capacity when incorporated into an electrode of a lithium based energy storage device. In some embodiments, the lithium based electrical energy storage device is a lithium ion battery or lithium ion capacitor.

These and other aspects of the invention will be apparent upon reference to the following detailed description. To this end, various references are set forth herein which describe in more detail certain background information, procedures, compounds and/or compositions, and are each hereby incorporated by reference in their entirety.

DETAILED DESCRIPTION

Figure 1:
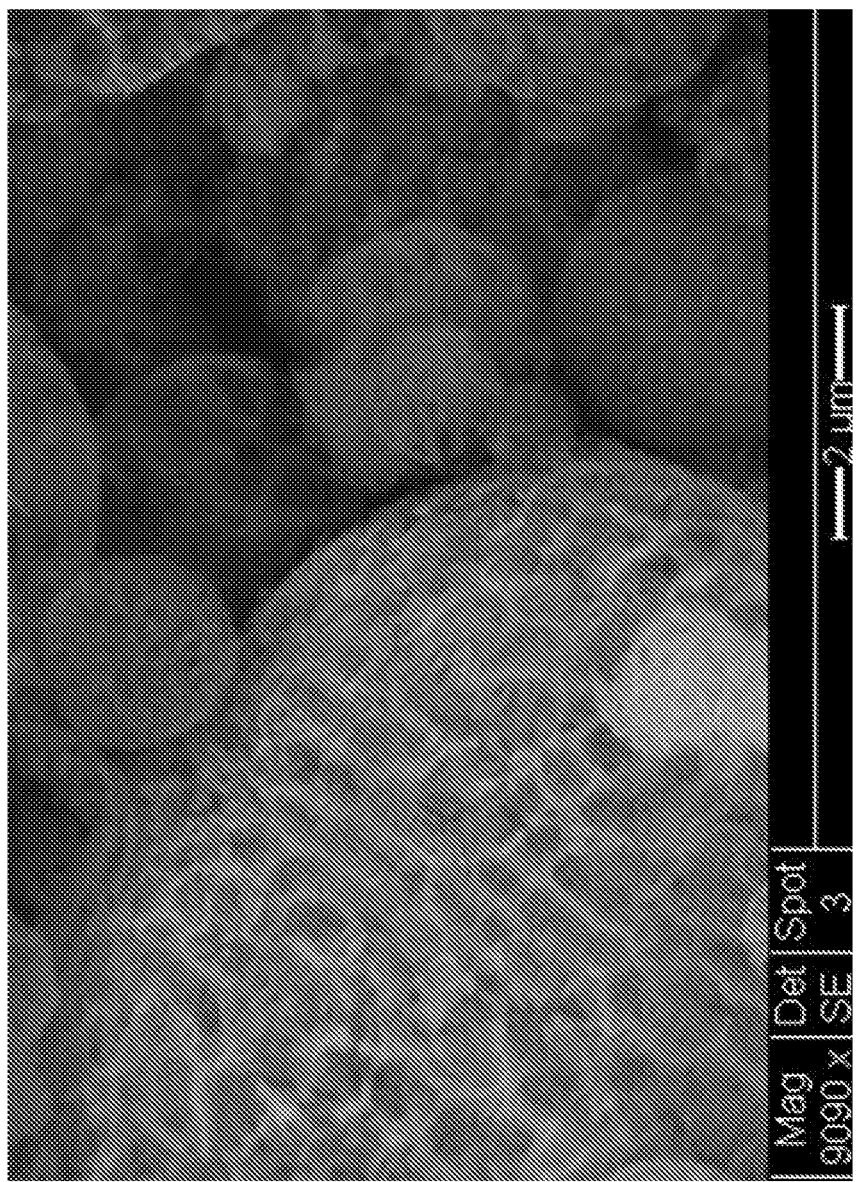
FIG. 1. SEM of an exemplary porous silicon material demonstrating nano-scale features.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Energy storage material" refers to a material capable of storing electrical charge, for example in the form of physically entrained electrolytes. Energy storage materials are capable of being charged and discharged. Examples of energy storage materials include, but are not limited to, carbon, for example activated carbon, silicon, sulfur, lithium, and combinations thereof. Energy storage materials may be used in the form of particles, or combinations of inter- and/or intra-particle blends of particles. Energy storage particles can be assembled into electrodes employing dry processing or aqueous or non-aqueous slurry processing as described in the art.

"Carbon material" refers to a material or substance comprised substantially of carbon. Examples of carbon materials include, but are not limited to, activated carbon, pyrolyzed carbon, hard carbon, graphite, and other allotropes of carbon.

"Impurity" or "impurity element" refers to a foreign substance (e.g., a chemical element) within a material, which differs from the chemical composition of the base material. For example, an impurity in a carbon material refers to any element or combination of elements, other than carbon, which is present in the carbon material. Impurity levels are typically expressed in parts per million (ppm).

"TXRF impurity" is any impurity element as detected by total x-ray fluorescence (TXRF). The phrases "total TXRF impurity content" and "total TXRF impurity level" both refer to the sum of all TXRF impurities present in a sample, for example, a polymer gel or a carbon material, or a silicon material, or a composite material comprising carbon and silicon.

"Ash content" refers to the nonvolatile inorganic matter that remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a molecule comprised of two or more structural repeating units.

"Synthetic polymer precursor material" or "polymer precursor" refers to the compounds used in the preparation of a synthetic polymer. Examples of polymer precursors that can be used in the preparations disclosed herein include, but are not limited to aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by to reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel as described herein can be any compound that facilitates the polymerization of the polymer precursors to form a polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Carbonizing", "pyrolyzing", "carbonization" and "pyrolysis" each refer to the process of heating a carbon-containing substance at a pyrolysis dwell temperature in an inert atmosphere (e.g., argon or nitrogen) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution, and pore length. Generally the pore structure of activated carbon material comprises micropores and mesopores.

"Mesopore" generally refers to pores having a diameter between about 2 nanometers and about 50 nanometers while the term "micropore" refers to pores having a diameter less than about 2 nanometers. Mesoporous carbon materials comprise greater than 50% of their total pore volume in mesopores while microporous carbon materials comprise greater than 50% of their total pore volume in micropores. Pores larger than about 50 nanometers are referred to as "macropores".

"Surface area" refers to the total specific surface area of a substance measurable by the BET technique. Surface area is typically expressed in units of m2/g. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Binder" refers to a material capable of holding individual particles of carbon together such that after mixing a binder and carbon together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Composite material" refers to a composition comprising both carbon materials and porous silicon materials. The two populations of materials may be intimately integrated through chemical bonding or may be a distinct mixture between two powders.

"Allotrope" refers to a material which can exists in different forms. C60, graphene, diamond, hard carbon, soft carbon, graphite, and carbon nanotubes are all examples of carbon allotropes. "Hard Carbon" refers to a non-graphitizable carbon material. At elevated temperatures (e.g., >1500° C.) a hard carbon remains substantially amorphous, whereas a "soft" carbon will undergo crystallization and become graphitic.

"Lithium uptake" refers to a carbon's ability to intercalate, absorb, or store lithium as measured as a ratio between the maximum number of lithium atoms to 6 carbon atoms.

"Nano-sized" means the material (e.g., silicon) has at least one dimension on the order of nanometers, for example at least one dimension less than 1 micron. For energy storage applications, the preferred silicon size is less than 1 micron, preferable less than 800 nm, preferably less than 300 nm, preferably less than 150 nm, preferably less than 100 nm, preferably less than 50 nm, preferably less than 30 nm, preferably less than 15 nm. A silicon particle of the dimensions described above is generally referred to as a nano-sized silicon particle. The particle size is typically described as the Dv,50 or silicon particle size at 50% of the volume distribution, as measured by various methods known in the art, for instance by laser diffraction particle sizing techniques.

Alternatively, or in addition the silicon exhibiting a primary particle size in the ranges described above, the silicon particle can also exhibit nano features. "Nanofeatures" refer to features, such as pores and the like, having a dimension on the order of nanometers, for example less than 1 micron. A "nano-featured" material is one which comprises nanofeatures. The silicon nano-features preferably comprise a nano feature size less than 1 micron, preferably less than 300 nm, preferably less than 150 nm, preferably less than 100 um, preferably less than 50 nm, preferably less than 30 nm, preferably less than 15 nm. A silicon particle with the features described above is generally referred to as a silicon particle with nano-sized features. The nano-sized features can be discerned by various methods known in the art, for instance by scanning electron microscopy.

"Friability," is defined as the % reduction in volume average particle size upon employing standard jet milling processing as known in the art.

A. Porous Silicon Materials

Embodiments of the present invention relate to the preparation of porous silicon materials, for instance porous silicon particles, and their further processing into composite materials, for example, carbon-impregnated silicon particles. The porous silicon particles can be produced by various means. For instance, solid silicon can be etched, for example employing a strong acid, such as HF or HNO3, to make pores directly into a solid silicon particle. In this case, the porosity within the silicon particle arising directly from the pores formed on the surface of the silicon particle, rather than inter-crystalline spaces.

Another approach to create porous silicon particles is to treat a silicon alloy, for example an aluminum silicon alloy, with an acid to remove the metal, resulting in a porous silicon particle. In this case, the porosity within the silicon particle is not due to pores formed on the surface of the silicon particle, but rather is due to inter-crystalline spaces. It is theorized that this arrangement is preferred for electrochemical applications, wherein the significant volume changes that occur in the silicon materials can be accommodated.

Accordingly, in one embodiment, the present disclosure provides for the manufacturing of a porous silicon material with nano-sized features. For example, the process may comprise the following steps:
  a) suspending particles of a silicon alloy in a liquid medium containing a dissolved acid;
  b) storing the suspended particles for a period of time at sufficient temperature to allow for erosion of metal cations from the silicon alloy in to the liquid medium to yield porous silicon particles with nano-sized features; and
  c) removing the liquid medium to yield dried porous silicon particles with nano-sized features.

The silicon alloy may be comprised of an aluminum silicon alloy. The aluminum silicon alloy, may have another metal present in addition to aluminum, for example chromium, copper or magnesium. Examples of aluminum silicon alloys include, but are not limited to, alusis, avional, and silumin. The silicon alloy may be comprised of an iron silicon alloy. The iron silicon alloy, may have another metal present in addition to iron, for example chromium, copper or magnesium. An example iron silicon alloy is ferrosilicon. The silicon alloy may also be comprised of a nickel silicon alloy. The nickel silicon alloy may have another metal present in addition to nickel, for example chromium, copper or magnesium. Examples of silicon nickel alloys include, but are not limited to, nicrosil and nisil. Examples of other silicon alloys include, but are not limited to, silicon germanium alloys, silicon tin alloys, and silicon gold alloys.

The silicon alloy particles may be present as primary particles, or as particle agglomerates, provided that there is sufficient access of the liquid to the particle surface to allow for the erosion of the metal cations previously comprising the silicon metal in to the liquid medium. The size of the silicon alloy particles can vary. In some embodiments, the silicon alloy particles are comprised of particles below 1000 um, for example below 100 um, for example below 10 um, for example below 1 um. In certain embodiments, the silicon alloy particles are comprised of particles below 100 nm, for example 10 nm, for example 1 nm. In certain embodiments, the silicon alloy particles are comprised of particles between 1 and 1000 nm, for example between 1 and 10 nm, for example between 10 and 100 nm, for example, between 100 and 1000 nm. In certain embodiments, the silicon alloy particles are comprised of particles between 1 and 1000 um, for example between 1 and 10 um, for example between 10 and 100 um, for example, between 100 and 1000 um. In some embodiments, the silicon alloy particles are greater than 100 um.

The liquid media for suspending the silicon alloy particles may be aqueous. In other embodiments, the liquid media for suspending the silicon alloy particles may be non-aqueous. In certain embodiments, the liquid media may be multi-phase, for example, be comprised of aqueous and non-aqueous phases. In certain embodiments, the liquid media may be a suspension or emulsion. In certain further embodiments, the liquid media may be multi-phase wherein the silicon alloy particles, are preferentially retained in a different phase compared to the porous silicon particles. In certain further embodiments, the liquid media may be multi-phase wherein the acid and metal cations are preferentially retained in a different phase compared to the porous silicon particles. The acid dissolved within the liquid medium can be either an organic acid or an inorganic acid. Suitable acids in this context are described in the art. In one embodiment, the acid is hydrochloric acid.

The silicon alloy can be etched employing a number of different etchants. Without being bound by theory, the etchants are typically acids or other chemical moieties capable of disrupting the interactions between the silicon atoms and the corresponding alloy atoms, for instance between silicon atoms and aluminum atoms in an aluminum-silicon alloy. Preferably, etchant's milieu is capable of dissolving the alloy atom counter ion in the form of a dissolved salt. For example, a preferred milieu for etching aluminum silicon alloy is capable of dissolving aluminum ions into an aluminum salt. One embodiment comprises aqueous hydrochloric acid as the etchant to etch the aluminum in the aluminum-silicon alloy and yield aluminum in the form of aluminum chloride, which is soluble in the aqueous medium.

Examples of etchants acids include, but are not limited to organic and inorganic acids, and mixtures thereof. Examples of inorganic acids in the context of etching a silicon-metal alloy include, but are not limited to, hydrochloric acid, hydrofluoric acid, sulfurous acid, sulfuric acid, hyposulfurous acid, persulfuric acid, pyrosulfuric acid, disulfurous acid, dithionous acid, tetrathionic acid, thiosulfurous acid, hydrosulfuric acid, peroxydisulfuric acid, perchloric acid, hypochlorous acid, chlorous acid, chloric acid, hyponitrous acid, nitrous acid, nitric acid, pernitric acid, carbonous acid, carbonic acid, hypocarbonous acid, percarbonic acid, phosphoric acid, phosphorous acid, hypophosphous acid, perphosphoric acid, hypophosphoric acid, pyrophosphoric acid, hydrophosphoric acid, hydrobromic acid, bromous acid, bromic acid, hypobromous acid, hypoiodous acid, iodous acid, iodic acid, periodic acid, hydroiodic acid, fluorous acid, fluoric acid, hypofluorous acid, perfluoric acid, hydrofluoric acid, chromic acid, chromous acid, hypochromous acid, perchromic acid, hydroselenic acid, selenic acid, selenous acid, hydronitric acid, boric acid, molybdic acid, perxenic acid, silicofluoric acid, telluric acid, tellurous acid, tungstic acid, xenic acid, pyroantimonic acid, permanganic acid, manganic acid, antimonic acid, antimonous acid, silicic acid, titanic acid, arsenic acid, pertechnetic acid, hydroarsenic acid, dichromic acid, tetraboric acid, metastannic acid, hypooxalous acid, ferricyanic acid, silicous acid, hydrocyanic acid, thiocyanic acid, uranic acid, and diuranic acid. In certain embodiments, mixtures of inorganic acids are employed.

Examples of organic acids in the context of etching a silicon-metal alloy include, but are not limited to, formic acid, citric acid, oxalic acid, cyanic acid, cyanuric acid, malonic acid, tartartic acid, glutamic acid, glucaric acid, gluconic acid, phthalic acid, azelaic acid, barbituric acid, benzilic acid, cinnamic acid, fumaric acid, glutaric acid acid, hexanoic acid, lactic acid, malic acid, oleic acid, folic acid, propiolic acid, propionic acid, rosolic acid, stearic acid, tannic acid, trifluoroacetic acid, uric acid, ascorbic acid, gallic acid, acetylsalicylic acid, propanoic acid, butyric acid, and acetic acid. In certain embodiments, mixtures of organic acids are employed. In certain other embodiments, one or more organic acids and one or more inorganic acids are combined.

In certain embodiments, the etchant comprises water. In certain other embodiments, the aqueous etchant solution further comprises one or more water-miscible co-solvents. In certain embodiments, the water-miscible co-solvent is also the etchant species, for example the water-miscible co-solvent is sulfuric acid, nitric acid, hydrochloric acid, hydrofluoric acid, acetic acid, butyric acid, formic acid, or propanoic acid. Exemplary water-miscible co-solvents include, but are not limited to, acetone, acetonitrile, 1,2-Butanediol, 1,3-Butanediol, 1,4-Butanediol, 2-Butoxyethanol, butyric acid, diethanolamine, diethylenetriamine, dimethylformamide, dimethoxyethane, dimethyl sulfoxide, 1,4-Dioxane, ethanol, ethylamine, ethylene glycol, formic acid, furfuryl alcohol, glycerol, methanol, methyl diethanolamine, methyl isocyanide, 1-propanol, 1,3-propanediol. 1,5-pentanediol, 2-propanol, propylene glycol, pyridine, tetrahydrofuran, triethylene glycol, 2-dimethylhydrazine, hydrazine, or hydrogen peroxide.

In certain embodiments, the etchant comprises a non-aqueous solvent, or a mixture of aqueous and non-aqueous solvents to form an emulsion or suspension. Examples of organic solvents in this context includes, but are not limited to benzene, benzyl alcohol, butanol, t-butyl alcohol, 1-butanol, 2-butanol, 2-butanone, carbon tetrachloride, chloroform, chlorobenzene, dichloromethane, diethylene glycol, diethyl ether, dimethylformamide, dimethylsulfoxide, glycerin, heptane, mineral oils, pyridine, methylene chloride, nitromethane, toluene, and xylenes. Additional organic solvents are known in the art.

Certain etchant mixtures are known in the art. One example is Krolls reagent comprising water, nitric acid, and hydrofluoric acid. A further example is aqua regia, comprising nitric acid and hydrochloric acid. As another example, Kellers etch, comprising nitric acid, hydrochloric acid, and hydrofluoric acid and water is reported as a suitable etchant for most aluminum alloys. Alternatively, a combination of methanol, hydrochloric acid, nitric acid, and hydrofluoric acid is known as a suitable etchant for aluminum-magnesium-silicon alloys. Another example is Piranha solution, also known as piranha etch, comprising sulfuric acid and hydrogen peroxide, which can additionally be employed to hydroxylate most surfaces (add OH groups), for example, hydroxylation of the etched silicon surface to provide a silicon oxide surface layer.

In some embodiments, the porous silicon particles can be removed from the liquid medium by a variety of means. For example, the liquid medium can be removed by ambient drying, drying at elevated temperature, with or without vacuum. The range of elevated temperatures employed for drying can be selected as known in art, for example, can be between 25 and 200 C, between 50 and 200 C, between 100 and 200 C, or about 150 C. The range of vaccum employed for drying can be selected as known in art, for example, can be less than 1 bar, for example less than 0.5 bar, for example less than 0.2 bar, for example less than 0.1 bar, for example less than 0.05 bar, for example less than 0.01 bar, for example less than 0.001 bar. Certain embodiments combine centrifugation followed by vacuum drying or combination of vacuum drying and elevated temperature. Other combinations of methods for removal of liquid from the system can be envisioned as known by experts in the relevant process art. In preferred embodiments, the porous silicon particles are washed prior to drying to remove residual metal salts, for example in the case wherein a silicon-aluminum alloy is etched with hydrochloric acid, the resulting porous silicon can be washed one or more times with deionized water to remove residual aluminum chloride remaining in the porous silicon. Prior to drying, the porous silicon particles can be concentrated by various means, for example by settling, or by centrifugation. In preferred embodiments, the removal of the liquid medium is conducted such that the porosity within the silicon particle due to inter-crystalline spaces is retained, and any collapse or otherwise inducement of agglomeration is avoided.

The particle size of the porous silicon can be according to the size of the starting silicon alloy particles. The porous silicon particles may be primary particles, or particle agglomerates. In some embodiments, the porous silicon particles are comprised of particles below 1000 um, for example below 100 um, for example below 10 um, for example below 1 um. In certain embodiments, the porous silicon particles are comprised of particles below 100 nm, for example 10 nm, for example 1 nm. In certain embodiments, the porous silicon particles are comprised of particles between 1 and 1000 nm, for example between 1 and 10 nm, for example between 10 and 100 nm, for example, between 100 and 1000 nm. In certain embodiments, the porous silicon particles are comprised of particles between 1 and 1000 um, for example between 1 and 10 um, for example between 10 and 100 um, for example, between 100 and 1000 um. In some embodiments, the porous silicon particles are greater than 100 um. In one embodiment, the porous silicon is comprised of particles of about 1 micron. In one embodiment, the porous silicon is comprised of particles of about 5 micron. In one embodiment, the porous silicon is comprised of particles of about 20 micron.

The pH of the silicon particles can vary, for example the pH can be acidic, for example less than pH 6, for example less than pH 5, for example less than pH 4. In other embodiments, the pH of the silicon particles can be neutral, for example between pH 6 and pH 8. In certain other embodiments, the pH can be basic, for example greater than pH 8, for example greater than pH 9, for example greater than pH 10.

In certain embodiments, the residual alloy metal within the porous silicon particles can vary, for example between 10 to 90%, for example between 20-80%, for example between 30-70%, for example, between 40-70%, for example about 50%. In certain other embodiments, the residual aluminum content can be between 1 and 10%. In certain other embodiments, the residual alloy metal content can be below 1%, for example below 0.1%, for example below 0.01%.

In certain embodiments, the silicon alloy employed to produced to porous silicon particles is an aluminum alloy, and the residual content of aluminum within the porous silicon particles can vary, for example between 10 to 90%, for example between 20-80%, for example between 30-70%, for example, between 40-70%, for example about 50%. In certain other embodiments, the residual aluminum content can be between 1% and 30%. In certain embodiments, the residual aluminum is between 10% and 30%. In certain embodiments, the residual aluminum is between 20% and 30%. In certain other embodiments, the residual aluminum content can be below 1%, for example below 0.1%, for example below 0.01%.

The oxygen content in the porous silicon particles can be less than 50%, for example, less than 30%, for example less than 20%, for example less than 15%, for example, less than 10%, for example, less than 5%, for example, less than 1%, for example less than 0.1%. In certain embodiments, the oxygen content in the porous silicon materials is between 1 and 30%. In certain embodiments, the oxygen content in the porous silicon materials is between 1 and 20%. In certain embodiments, the oxygen content in the porous silicon materials is between 1 and 10%. In certain embodiments, the oxygen content in the porous silicon materials is between 5 and 10%.

In certain embodiments wherein the silicon contains oxygen, the oxygen is incorporated such that the silicon exists as a mixture of silicon and silicon oxides of the general formula $SiO_x$, where X is a non-integer (real number) can vary continuously from 0.01 to 2. In certain embodiments, the fraction of oxygen present on the surface of the nano-feature porous silicon is higher compared to the interior of the particle.

In certain embodiments, the porous silicon particles are comprised of crystalline silicon. In certain embodiments, the porous silicon particles are comprised of polycrystalline silicon. In certain embodiments, the porous silicon particles are comprised of micro-polycrystalline silicon. In certain embodiments, the porous silicon particles are comprised of nano-polycrystalline silicon. In certain other embodiments, the porous silicon particles are comprised of amorphous silicon. In certain other embodiments, the porous silicon particles are comprised of both crystalline and non-crystalline silicon.

In certain embodiments, the porous silicon particles are spherical. In certain other embodiments, the porous silicon particles are non-spherical, for example rod-like, or fibrous in structure.

In preferred embodiments, the porous silicon particles comprise nano-sized features. The nano-sized features can have a characteristic length scale of preferably less than 1 um, preferably less than 300 nm, preferably less than 150 nm, preferably less than 100 um, preferably less than 50 nm, preferably less than 30 nm, preferably less than 15 nm, preferably less than 10 nm, preferably less than 5 nm.

In certain embodiments, the porous silicon is highly friable and comprises nano-sized features. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield highly friable silicon material with nano-sized features; and
 c) removing the liquid medium to yield dried highly friable silicon material with nano-sized features.

Accordingly, the present disclosure provides for the manufacturing of a nano-sized porous silicon particle with nano-sized features. For example, the process may comprise the following steps:
 a) suspending particles of a silicon alloy in a liquid medium containing a dissolved acid;
 b) storing the suspended particles for a period of time at sufficient temperature to allow for erosion of metal cations from the silicon alloy in to the liquid medium to yield highly friable silicon material with nano-sized features;
 c) removing the liquid medium to yield dried highly friable silicon material with nano-sized features; and
 d) particle size reduction of the friable silicon material with nano-sized features to yield nano-sized silicon particles with nano-sized features.

The particle size reduction in the above embodiment can be carried out as known in the art, for example by jet milling in the presence of various gases including air, nitrogen, argon, helium, supercritical steam, and other gases known in the art.

In some embodiments, the surface area of the porous silicon particles can be greater than 500 m2/g. In other embodiments, the surface area of the porous silicon particles can be less than 500 m2/g. In some embodiments, the surface area of the porous silicon particles is between 200 and 500 m2/g. In some embodiments, the surface area of the porous silicon particles is between 100 and 200 m2/g. In some embodiments, the surface area of the porous silicon particles is between 50 and 100 m2/g. In some embodiments, the surface area of the porous silicon particles is between 10 and 50 m2/g. In some embodiments, the surface area of the porous silicon particles can be less than 10 m2/g.

B. Physicochemical Properties of Porous Silicon Materials that Influence Electrochemical Performance The volumetric and gravimetric capacity can be determined through the use of any number of methods known in the art, for example by incorporating into an electrode half-cell with lithium metal counter electrode in a coin cell. The gravimetric specific capacity is determined by dividing the measured capacity by the mass of the electrochemically active carbon materials. The volumetric specific capacity is determined by dividing the measured capacity by the volume of the electrode, including binder and conductivity additive. Methods for determining the volumetric and gravimetric capacity are described in more detail in the Examples.

The particle size distribution of the porous silicon material is important to both determine power performance as well as volumetric capacity. As the packing improves, the volumetric capacity may increase. In one embodiment the distributions are either Gaussian with a single peak in shape, bimodal, or polymodal (>2 distinct peaks). The properties of particle size of the composite can be described by the D0 (smallest particle in the distribution), D50 (average particle size) and D100 (maximum size of the largest particle). The optimal combined of particle packing and performance will be some combination of the size ranges below.

In one embodiment the D0 of the porous silicon material can range from 1 nm to 5 microns. In another embodiment the D0 ranges from 5 nm to 1 micron, 5 nm to 500 nm, 5 nm to 100 nm, 10 nm to 50 nm. In another embodiment the D0 ranges from 500 to 2 microns, 750 nm to 1 micron, 1 micron to 2 microns. In still another embodiment, the D0 ranges from 2 to 5 microns or even greater than 5 microns.

In one embodiment the D50 of the porous silicon material can range from 5 nm to 20 microns. In another embodiment the D50 ranges from 5 nm to 1 micron, 5 nm to 500 nm, 5 nm to 100 nm, 10 nm to 50 nm. In another embodiment the D50 ranges from 500 to 2 microns, 750 nm to 1 micron, 1 microns to 2 microns. In still another embodiment, the D50 ranges from 2 to 20 microns, 3 microns to 10 microns, 4 microns to 8 microns, greater than 20 microns.

In one embodiment the D100 of the porous silicon material can range from 8 nm to 100 microns. In another embodiment the D100 ranges from 5 nm to 1 micron, 5 nm to 500 nm, 5 nm to 100 nm, 10 nm to 50 nm. In another embodiment the D100 ranges from 500 to 2 microns, 750 nm to 1 micron, 1 microns to 2 microns. In still another embodiment, the D100 ranges from 2 to 100 microns, 5 to 50 microns, 8 to 40 microns, 10 to 35 microns, 15 to 30 microns, 20 to 30 microns, around 25 microns, greater than 100 microns.

In certain embodiments, the porous silicon has nano sized features. In certain embodiments, the nano-sized silicon features are between 1 nm and 1 um, for example between 300 nm and 1 um, for example between 150 nm and 300 nm, for example between 50 nm and 150 um, for example between 30 nm and 50 nm, for example between 10 nm and 30 nm, for example between 1 nm and 10 nm. It is also envisioned that certain embodiments comprise combination of the above descriptions of preferred nano-sized features.

In still other embodiments the present disclosure provides a porous silicon material, wherein when the material is incorporated into an electrode of a lithium based energy storage device the material has a volumetric capacity at least 10% greater than when the lithium based energy storage device comprises a graphite electrode. In some embodiments, the lithium based energy storage device is a lithium ion battery. In other embodiments, the porous silicon material has a volumetric capacity in a lithium based energy storage device that is at least 5% greater, at least 10% greater, at least 15% greater than the volumetric capacity of the same electrical energy storage device having a graphite electrode. In still other embodiments, the porous silicon material has a volumetric capacity in a lithium based energy storage device that is at least 20% greater, at least 30% greater, at least 40% greater, at least 50% greater, at least 200% greater, at least 100% greater, at least 150% greater, or at least 200% greater than the volumetric capacity of the same electrical energy storage device having a graphite electrode.

While not wishing to be bound by theory, the present applicants believe the superior properties of the porous silicon material is related, at least in part, to its unique properties such as surface area, purity, pore structure, crystallinity and surface chemistry, etc. Furthermore, the surface of the porous silicon material may be modified through various treatments. The treatments include exposure to elevated temperature and various gases. The range of temperature can vary, including, but not limited to, 100 to 200 C, 200 to 300 C, 300 to 400 C, 400 to 500 C, 500 to 600 C, 600 to 700 C, 700 to 800 C, 800 to 900 C, 900 to 1000 C, or 1000 to 1100 C. The gas(es) employed can vary, and can comprise one or more of the following: nitrogen, carbon dioxide, ammonia, or steam. The various surface treatments can alter the porous silicon surface and its tendency to produce The porous silicon material may be prelithiated, as known in the art. In certain embodiments, the prelithiation is achieved electrochemically, for example in a half cell, prior to assembling the lithiated anode comprising the porous silicon material into a full cell lithium ion battery. In certain embodiments, prelithiation is accomplished by doping the cathode with a lithium-containing compound, for example a lithium containing salt. Examples of suitable lithium salts in this context include, but are not limited to, dilithium tetrabromonickelate(II), dilithium tetrachlorocuprate(II), lithium azide, lithium benzoate, lithium bromide, lithium carbonate, lithium chloride, lithium cyclohexanebutyrate, lithium fluoride, lithium formate, lithium hexafluoroarsenate(V), lithium hexafluorophosphate, lithium hydroxide, lithium iodate, lithium iodide, lithium metaborate, lithium perchlorate, lithium phosphate, lithium sulfate, lithium tetraborate, lithium tetrachloroaluminate, lithium tetrafluoroborate, lithium thiocyanate, lithium trifluoromethanesulfonate, lithium trifluoromethanesulfonate, and combinations thereof.

The anode comprising the porous silicon material can be paired with various cathode materials to result in a full cell lithium ion battery. Examples of suitable cathode materials are known in the art. Examples of such cathode materials include, but are not limited to $LiCoO_2$ (LCO), $LiNi_{0.8}Co_{0.15}Al_{0.05}O_2$ (NCA), $LiNi_{1/3}Co_{1/3}Mn_{1/3}O_2$ (NMC), $LiMn_2O_4$ and variants (LMO), and $LiFePO_4$ (LFP).

For the full cell lithium ion battery comprising an anode further comprising the porous silicon material, pairing of cathode to anode can be varied. For example, the ratio of cathode-to-anode capacity can vary from 0.7 to 1.3. In certain embodiments, the ratio of cathode-to-anode capacity can vary from 0.7 to 1.0, for example from 0.8 to 1.0, for example from 0.85 to 1.0, for example from 0.9 to 1.0, for example from 0.95 to 1.0. In other embodiments, the ratio of cathode-to-anode capacity can vary from 1.0 to 1.3, for example from 1.0 to 1.2, for example from 1.0 to 1.15, for example from 1.0 to 1.1, for example from 1.0 to 1.05. In yet other embodiments, the ratio of cathode-to-anode capacity can vary from 0.8 to 1.2, for example from 0.9 to 1.1, for example from 0.95 to 1.05.

For the full cell lithium ion battery comprising an anode further comprising the porous silicon material, the voltage window for charging and discharging can be varied. In this regard, the voltage window can be varied as known in the art, depending on various properties of the lithium ion battery. For instance, the choice of cathode plays a role in the voltage window chosen, as known in the art. Examples of voltage windows vary, for example, in terms of potential versus Li/Li+, from 2.0 V to 5.0 V, for example from 2.5 V to 4.5V, for example from 2.5V to 4.2V.

For the full cell lithium ion battery comprising an anode further comprising the porous silicon material, the strategy for conditioning the cell can be varied as known in the art. For example, the conditioning can be accomplished by one or more charge and discharge cycles at various rate(s), for example at rates slower than the desired cycling rate. As known in the art, the conditioning process may also include a step to unseal the lithium ion battery, evacuate any gases generated within during the conditioning process, followed by resealing the lithium ion battery.

For the full cell lithium ion battery comprising an anode further comprising the porous silicon material, the cycling rate can be varied as known in the art, for example, the rate can between C/20 and 20C, for example between C10 to 10C, for example between C/5 and 5C. In certain embodiments, the cycling rate is C/10. In certain embodiments, the cycling rate is C/5. In certain embodiments, the cycling rate is C/2. In certain embodiments, the cycling rate is 1C. In certain embodiments, the cycling rate is 1C, with periodic reductions in the rate to a slower rate, for example cycling at 1C with a C/10 rate employed every $20^{th}$ cycle. In certain embodiments, the cycling rate is 2C. In certain embodiments, the cycling rate is 4C. In certain embodiments, the cycling rate is 5C. In certain embodiments, the cycling rate is 10C. In certain embodiments, the cycling rate is 20C Since the total pore volume (as determined by nitrogen gas sorption) may partially relate to the storage of lithium ions, the internal ionic kinetics, as well as the available composite/electrolyte surfaces capable of charge-transfer, this is one parameter that can be adjusted to obtain the desired electrochemical properties. Some embodiments include porous silicon materials having low total pore volume (e.g., less than about 0.2 cc/g). In one embodiment, the total pore volume of the porous silicon material is less than about 0.15 cc/g. In one embodiment, the total pore volume is less than about 0.1 cc/g. In one embodiment, the total pore volume is less than about 0.05 cc/g. In one embodiment, the total pore volume is less than about 0.03 cc/g. In one embodiment, the total pore volume is less than about 0.02 cc/g. In one embodiment, the total pore volume is less than about 0.01 cc/g. In another embodiment, the total pore volume is less than about 0.001 cc/g. In yet another embodiment, the total pore volume is less than about 0.0001 cc/g.

In one embodiment, the total pore volume of the porous silicon material ranges from about 0.00001 cc/g to about 0.2 cc/g, for example from about 0.0001 cc/g to about 0.001 cc/g. In some other embodiments, the total pore volume ranges from about 0.001 cc/g to about 0.01 cc/g. In some other embodiments, the total pore volume ranges from about 0.01 cc/g to about 0.02 cc/g. In some other embodiments, the total pore volume ranges from about 0.02 cc/g to about 0.03 cc/g. In some other embodiments, the total pore volume ranges from about 0.03 cc/g to about 0.05 cc/g. In some other embodiments, the total pore volume ranges from about 0.05 cc/g to about 0.1 cc/g. In some other embodiments, the total pore volume ranges from about 0.1 cc/g to about 0.2 cc/g.

In other embodiments, the porous silicon material comprises a total pore volume ranging greater than or equal to 0.1 cc/g, and in other embodiments the porous silicon material comprises a total pore volume less than or equal to 0.6 cc/g. In other embodiments, the porous silicon material comprises a total pore volume ranging from about 0.1 cc/g to about 0.6 cc/g. In some other embodiments, the total pore volume ranges from about 0.1 cc/g to about 0.2 cc/g. In some other embodiments, the total pore volume ranges from about 0.2 cc/g to about 0.3 cc/g. In some other embodiments, the total pore volume ranges from about 0.3 cc/g to about 0.4 cc/g. In some other embodiments, the total pore volume ranges from about 0.4 cc/g to about 0.5 cc/g. In some other embodiments, the total pore volume ranges from about 0.5 cc/g to about 0.6 cc/g.

Embodiments of the present invention also includes porous silicon material having high total pore volume, for example greater than 0.6 cc/g. In some other embodiments, the total pore volume ranges from about 0.6 cc/g to about 2.0 cc/g. In some other embodiments, the total pore volume ranges from about 0.6 cc/g to about 1.0 cc/g. In some other embodiments, the total pore volume ranges from about 1.0 cc/g to about 1.5 cc/g. In some other embodiments, the total pore volume ranges from about 1.5 cc/g to about 2.0 cc/g.

In some embodiments, the tap density of the porous silicon material may be predictive of their electrochemical performance, for example the volumetric capacity. While not limiting in any way, the pore volume of a porous silicon material may be related to its tap density and low pore volume can correlate with high tap density (and vice versa). Accordingly, porous silicon materials having low tap density (e.g., <0.3 g/cc), medium tap density (e.g., from 0.3 to 0.75 g/cc) or high tap density (e.g., >0.75 g/cc) are provided.

In some other embodiments, the porous silicon material comprises a tap density less than 0.3 g/cc. In yet some other embodiments, the porous silicon materials comprises a tap density ranging from about 0.05 g/cc to about 0.25 g/cc. In some embodiments, the porous silicon material comprise a tap density ranging from about 0.1 g/cc to about 0.2 g/cc.

In yet some other embodiments, the porous silicon material comprises a tap density greater than or equal to 0.3 g/cc. In yet some other embodiments, the porous silicon material comprises a tap density ranging from about 0.3 g/cc to about 0.75 g/cc. In some embodiments, the porous silicon material comprises a tap density ranging from about 0.35 g/cc to about 0.45 g/cc. In some other embodiments, the porous silicon material comprises a tap density ranging from about 0.30 g/cc to about 0.40 g/cc. In some embodiments, the porous silicon material comprise a tap density ranging from about 0.40 g/cc to about 0.50 g/cc. In some embodiments, the porous silicon material comprises a tap density ranging from about 0.5 g/cc to about 0.75 g/cc. In some embodiments, the porous silicon material comprises a tap density ranging from about 0.75 g/cc to about 0.9 g/cc. In some embodiments, the porous silicon material comprise a tap density ranging from about 0.9 g/cc to about 1.2 g/cc. In some embodiments, the porous silicon material comprise a tap density ranging from about 1 g/cc to 1.2 g/cc.

In yet some other embodiments, the porous silicon material comprises a tap density greater than about 0.5 g/cc. In some other embodiments, the porous silicon material comprises a tap density ranging from about 0.5 g/cc to about 2.0 g/cc. In some other embodiments, the porous silicon material comprises a tap density ranging from about 0.5 g/cc to about 1.0 g/cc. In some embodiments, the porous silicon material comprises a tap density ranging from about 0.5 g/cc to about 0.75 g/cc. In some embodiments, the porous silicon material comprises a tap density ranging from about 0.75 g/cc to about 1.0 g/cc, for example from about 0.75 g/cc to about 0.95 g/cc. In some embodiments of the foregoing, the porous silicon material comprise a low, medium or high total pore volume.

The density of the porous silicon material can also be characterized by their skeletal density as measured by helium pycnometry. In certain embodiments, the skeletal density of the composite materials ranges from about 1 g/cc to about 3 g/cc, for example from about 1.5 g/cc to about 2.3 g/cc. In other embodiments, the skeletal density ranges from about 1.5 cc/g to about 1.6 cc/g, from about 1.6 cc/g to about 1.7 cc/g, from about 1.7 cc/g to about 1.8 cc/g, from about 1.8 cc/g to about 1.9 cc/g, from about 1.9 cc/g to about 2.0 cc/g, from about 2.0 cc/g to about 2.1 cc/g, from about 2.1 cc/g to about 2.2 cc/g or from about 2.2 cc/g to about 2.4 cc/g.

As discussed in more detail below, the surface functionality of the presently disclosed porous silicon material may be altered to obtain the desired electrochemical properties. One property which can be predictive of surface functionality is the pH of the porous silicon material. The presently disclosed porous silicon material comprises pH values ranging from less than 1 to about 14, for example less than 5, from 5 to 8 or greater than 8. In some embodiments, the pH of the composite materials is less than 4, less than 3, less than 2 or even less than 1. In other embodiments, the pH of the composite materials is between about 5 and 6, between about 6 and 7, between about 7 and 8 or between 8 and 9 or between 9 and 10. In still other embodiments, the pH is high and the pH of the composite materials ranges is greater than 8, greater than 9, greater than 10, greater than 11, greater than 12, or even greater than 13.

Pore size distribution of the porous silicon material may be important to both the storage capacity of the material and the kinetics and power capability of the system as well as the ability to incorporate large amounts of electrochemical modifiers. The pore size distribution can range from micro- to meso- to macropore sized and may be either monomodal, bimodal or multimodal. Micropores, with average pore sizes less than 1 nm, may create additional storage sites as well as lithium (or sodium) ion diffusion paths. Graphite sheets typically are spaced 0.33 nm apart for lithium storage. While not wishing to be bound by theory, it is thought that large quantities of pores of similar size may yield graphite-like structures within pores with additional hard carbon-type storage in the bulk structure. Mesopores are typically below 100 nm. These pores are ideal locations for nano particle dopants, such as metals, and provide pathways for both conductive additive and electrolyte for ion and electron conduction. In some embodiments the porous silicon materials comprise macropores greater than 100 nm which may be especially suited for large particle doping.

Pore size distribution of the porous silicon material may be important to both the storage capacity of the material and the kinetics and power capability of the system as well as the ability to incorporate large amounts of electrochemical modifiers. The pore size distribution can range from micro to meso to macro and may be either monomodal, bimodal or multimodal. In some embodiments the composite materials comprise micropores less than 100 nm that may be especially suited for lithium diffusion.

The present inventors have found that the extent of disorder in the porous silicon material may have an impact on the electrochemical properties. Thus, controlling the extent of disorder in the porous silicon material provides a possible avenue to improve the rate capability since a smaller crystallite size may allow for lower resistive lithium ion diffusion. The present invention includes embodiments which comprise both high and low levels of disorder.

In a related embodiment, the electrochemical properties of the porous silicon material related to the level of crystallinity, which can be measured as known in the art, for example by X-ray diffraction (XRD). While Raman measures the size of the crystallites, XRD records the level of periodicity in the bulk structure through the scattering of incident X-rays. The crystallinity of the porous silicon material ranges from about 0% to about 99%. In some embodiments, the porous silicon material comprises less than 10% crystallinity, less than 5% crystallinity or even less than 1% crystallinity (i.e., highly amorphous). In other embodiments, the porous silicon material comprises from 10% to 50% crystallinity, for example between 10% and 20%, or between 20% and 30%, or between 30% and 40%, or between 40% and 50%. In yet other embodiments, the porous silicon material comprises between 50% and 99% crystallinity, for example between 50% and 90%, or between 50% and 60%, or between 60% and 70%, or between 70% and 80%, or between 80% and 90%, or between 90% and 99%.

In certain embodiments, the organic content of porous silicon material can be manipulated to provide the desired properties, for example by contacting the materials with a hydrocarbon compound such as cyclohexane and the like. Infra-red spectroscopy (FTIR) can be used as a metric to determine the organic content of both surface and bulk structures of the materials. In one embodiment, the porous silicon material comprises essentially no organic material. An FTIR spectra which is essentially featureless is indicative of such embodiments. In other embodiments, the porous silicon material comprises organic material, either on the surface or within the bulk structure. In such embodiments, the FTIR spectra generally elucidate the presence of organic content.

The porous material without electrochemical modifier may also comprise varying amounts of carbon, oxygen, hydrogen and nitrogen as measured by methods known in the art, for instance by gas chromatography CHNO analysis or XPS. In one embodiment, the carbon content ranges from 0.1% to 40%. In certain embodiments, the carbon content ranges from 30% to 40%. In certain embodiments, the carbon content ranges from 20% to 30%. In certain embodiments, the carbon content ranges from 10% to 20%. In certain embodiments, the carbon content ranges from 0.1% to 10%. In certain embodiments, the carbon content ranges from 1% to 8%. In certain embodiments, the carbon content is less than 5%.

In another embodiment, the nitrogen content of the porous silicon material ranges from 0 to 90 wt %. In another embodiment, the nitrogen content ranges from 1 to 10 wt. % of the total mass. In yet other embodiments, the nitrogen content ranges from 10 to 20 wt. % of the total mass. In yet other embodiments, the nitrogen content ranges from 20 to 30 wt. % of the total mass. In another embodiment, the nitrogen content is greater than 30 wt. %. In some more specific embodiments, the nitrogen content ranges from about 1% to about 6%, while in other embodiments, the nitrogen content ranges from about 0.1% to about 1%. In certain of the above embodiments, the nitrogen content is based on weight relative to total weight of all components in the porous silicon material XPS may also be used to detect individual bonds between elements. In the case of a modified porous silicon, the interface between the silicon and another moiety, for example an electrochemical modifier, may include an Si—X bond, wherein X is the secondary element that alloys with lithium. This percent of Si—X bonds within a composite can be characterized using XPS. In one embodiment the percent of Si—X bonds as measured by XPS is between 0% and 50%. In another embodiment the percent of C—X bonds is between 0% and 10%, 0% and 5%, 0% and 3%, 0% and 2%, 0% and 1%, 1% and 2%, between 10% and 50%, or greater than 50%. In yet another embodiment, the Si—X bond also produces a material in situ that is also capable of alloying electrochemically with silicon.

In certain embodiments, XPS can be examined to determine the specific nature of specific bonding structures within the nano featured porous silicon. For example, XPS can be examined in the region in the vicinity of 100 eV to ascertain details of Si 2p bonding in the silicon structure. In certain embodiments, the porous silicon material comprises elemental silicon exhibiting an XPS peak located at 99.4 eV. In certain embodiments, the porous silicon material comprises Si3N4 exhibiting an XPS peak located at 101.7 eV. In certain embodiments, the porous silicon material comprises organic silicon exhibiting an XPS peak located at 102 eV. In certain embodiments, the porous silicon material comprises organic silicon exhibiting an XPS peak located at 103.5 eV.

The porous silicon material may also incorporate an electrochemical modifier selected to optimize the electrochemical performance. The electrochemical modifier may be incorporated within the pore structure and/or on the surface of the porous silicon material or incorporated in any number of other ways. For example, in some embodiments, the porous silicon material comprises a coating of electrochemical modifier. In some embodiments, the porous silicon material comprises greater than about 100 ppm of an electrochemical modifier. In certain embodiments, the electrochemical modifier is selected from iron, tin, nickel, aluminum and manganese. In certain cases, the electrochemical modifier comprises a second silicon phase.

In certain embodiments the electrochemical modifier comprises an element with the ability to lithiate from 3 to 0 V versus lithium metal (e.g. secondary silicon phase, tin, sulfur). In other embodiments, the electrochemical modifier comprises metal oxides with the ability to lithiate from 3 to 0 V versus lithium metal (e.g. iron oxide, molybdenum oxide, titanium oxide). In still other embodiments, the electrochemical modifier comprises elements which do not lithiate from 3 to 0 V versus lithium metal (e.g. aluminum, manganese, nickel, metal-phosphates). In yet other embodiments, the electrochemical modifier comprises a non-metal element (e.g. fluorine, nitrogen, hydrogen). In still other embodiments, the electrochemical modifier comprises any of the foregoing electrochemical modifiers or any combination thereof (e.g. tin-silicon, nickel-titanium oxide).

The electrochemical modifier may be provided in any number of forms. For example, in some embodiments the electrochemical modifier comprises a salt. In other embodiments, the electrochemical modifier comprises one or more elements in elemental form, for example elemental iron, tin, a secondary silicon phase, nickel or manganese. In other embodiments, the electrochemical modifier comprises one or more elements in oxidized form, for example iron oxides, tin oxides, silicon oxides, nickel oxides, aluminum oxides or manganese oxides.

In other embodiments, the electrochemical modifier comprises iron. In other embodiments, the electrochemical modifier comprises tin. In other embodiments, the electrochemical modifier comprises a secondary silicon phase. In some other embodiments, the electrochemical modifier comprises nickel. In yet other embodiments, the electrochemical modifier comprises aluminum. In yet other embodiments, the electrochemical modifier comprises manganese. In yet other embodiments, the electrochemical modifier comprises $Al_2O_3$. In yet other embodiments, the electrochemical modifier comprises titanium. In yet other embodiments, the electrochemical modifier comprises titanium oxide. In yet other embodiments, the electrochemical modifier comprises lithium. In yet other embodiments, the electrochemical modifier comprises sulfur. In yet other embodiments, the electrochemical modifier comprises phosphorous. In yet other embodiments, the electrochemical modifier comprises molybdenum. In yet other embodiments, the electrochemical modifier comprises germanium. In yet other embodiments, the electrochemical modifier comprises arsenic. In yet other embodiments, the electrochemical modifier comprises gallium. In yet other embodiments, the electrochemical modifier comprises phosphorous. In yet other embodiments, the electrochemical modifier comprises selenium. In yet other embodiments, the electrochemical modifier comprises antimony. In yet other embodiments, the electrochemical modifier comprises bismuth. In yet other embodiments, the electrochemical modifier comprises tellurium. In yet other embodiments, the electrochemical modifier comprises indium.

The electrochemical properties of the porous silicon material can be modified, at least in part, by the amount of the electrochemical modifier, wherein the electrochemical modifier is an alloying material such as a secondary silicon phase, tin, indium, aluminum, germanium, gallium. Accordingly, in some embodiments, the porous silicon material comprises at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of the electrochemical modifier. For example, in some embodiments, the composite materials comprise between 0.5% and 99.5% porous silicon and between 0.5% and 99.5% electrochemical modifier. In a preferred embodiment, the porous silicon material comprises 70%-99% silicon, for example between 75% and 95%, for example between 80% and 95%. The percent of the electrochemical modifier is calculated on weight percent basis (wt %). In some other more specific embodiments, the electrochemical modifier comprises iron, tin, a secondary silicon phase, nickel, or manganese, or combination thereor. In a preferred embodiment, the porous silicon material comprises 70%-99% silicon, for example between 75% and 95%, for example between 80% and 95%.

In certain embodiments, the porous silicon material comprises two or more different electrochemical modifiers. In embodiments, the material comprises porous silicon and one or more of the following species (or combinations thereof): phosphorus, nitrogen, sulfur, boron or aluminum. In certain embodiments, the composite material comprises carbon, silicon and 1-20% of a Group 13 element or combination thereof. In other certain embodiments, the composite material comprises carbon, silicon and 1-20% of a Group 15 element, or combination thereof. In other certain embodiments, the composite material comprises carbon, silicon and 1-20% of lithium, sodium, or potassium, or combinations thereof. In other certain embodiments, the composite material comprises porous silicon, and 1-20% of lithium, sodium, or potassium, or combinations thereof.

Numerous methods are available for the incorporation of an electrochemical modifier into silicon. The composite may be formed through a gas phase deposition of an electrochemical modifier onto the silicon. The composite may be synthesized through mechanical mixing or milling of two distinct solids. The methods of electrochemical modifier inclusion into the hard are described in more detail below.

The porous silicon material may include various surface treatment or properties in order to further improve the electrochemical performance as defined by capacity, stability and power performance. In one embodiment the porous silicon material is covered by a ceramic protective coating with a thickness between 1 nm and 10 microns. In yet another embodiment the porous silicon material is covered by an organic film with a thickness between 1 nm and 10 microns. The thickness can be measured with a variety of techniques known in the art such as but not limited to XPS sputtering, FIB/SEM or SIMS.

C. Physicochemical and Electrochemical Properties of the Porous Silicon Material The physicochemical properties of the porous nano-featured material can vary. For example, the average particle size of the porous nano-featured material can range from 1 nm to 1 mm, for example from 1 nm to 10 nm, from 10 nm to 100 nm, from 100 nm to 1 um, from 1 um to 2 um, from 2 um to 5 um, from 5 um to 10 um, from 10 um to 20 um, from 20 um to 100 um, from 100 um to 1 mm. In some embodiments, the average particle size of the porous nano-featured material is about 1 um, about 2 um, about 5 um, about 10 um, about 20 um. The span (Dv50)/(Dv90−Dv10), wherein Dv10, Dv50 and Dv90 represent the particle size at 10%, 50%, and 90% of the volume distribution, can be varied from example from 100 to 10, from 10 to 5, from 5 to 2, from 2 to 1; in some embodiments the span can be less than 1. In certain embodiments, the porous nano-featured material particle size distribution can be multimodal, for example, bimodal, or trimodal.

In preferred embodiments, the porous nano-featured is nano-sized and comprises nano-sized features. The Dv50 for the nano-sized silicon particles comprising nano-sized features can be between 1 nm and 1 um, for example between 300 nm and 1 um, for example between 150 nm and 300 nm, for example between 50 nm and 150 nm, for example between 30 nm and 50 nm, for example between 15 nm and 30 nm, for example between 1 nm and 15 nm.

The surface area of the nano-featured porous nano-featured material can vary, for example from 0.1 to 1 m2/g, from 1 to 10 m2/g, from 10 to 25 m2/gm from 25 to 50 m2/g, from 50 to 100 m2/g. In some embodiments, the nano-featured porous nano-featured material can have a surface area of grater than 100 m2/g, for example between 100 m2/g and 500 m2/g, for example between 100 m2/g and 250 m2/g, for example between 100 m2/g and 150 m2/g, for example between 150 m2/g and 250 m2/g.

The average length of the webbing comprising the nano-featured porous nano-featured structure can vary. This average length can be determined as the average span from one point of contact to another. This characteristic length can be estimated by techniques known in the art, for example by atomic force microscopy or by scanning electron microscopy. In preferred embodiments, the average length of the webbing comprising the porous nano-featured structure is nano-sized, resulting in a porous nano-featured particle with nano-sized features. For example, the web structures can have a characteristic length of less than 1 nm, between 1 nm to 2 nm, between 2 to 5 nm, between 5 and 10 nm, between 10 and 30 nm, between 10 and 50 nm, between 50 and 100 nm, between 10 and 100 nm, between 100 and 200 nm, between 200 and 500 nm, between 500 and 750 nm.

The average length between the threads of the webbing comprising the nano-featured porous nano-featured structure can vary. This average length between the threads can be determined as the average distance from one thread to another thread. This characteristic length can be estimated by techniques known in the art, for example by atomic force microscopy or by scanning electron microscopy. For example, the web structures can have a characteristic length of less than 1 nm, between 1 nm to 2 nm, between 2 to 5 nm, between 5 and 10 nm, between 10 and 30 nm, between 10 and 50 nm, between 50 and 100 nm, between 10 and 100 nm, between 100 and 200 nm, between 200 and 500 nm, between 500 and 750 nm.

The pore volume distribution of the nano-featured porous nano-featured can vary. In certain embodiments, the percentage of pore volume comprising micropores (less than 20 A) can be less than 50%, for example less than 40%, for example less than 30%, for example less than 20%, for example less than 10%. In certain embodiments, the pore volume comprising micropores can be between 1% and 10%. In certain embodiments, the pore volume comprising micropores can be between 1% and 5%.

In certain embodiments, the pore volume comprising mesopores (between 20 and 500 A) can be between 10% and 90%. For example, the pore volume comprising mesopores can be between 20% and 80%. For example, the pore volume comprising mesopores can be between 30% and 70%. For example, the pore volume comprising mesopores can be between 30% and 60%. For example, the pore volume comprising mesopores can be between 30% and 50%. For example, the pore volume comprising mesopores can be between 40% and 60%.

In certain embodiments, the pore volume comprising macropores (greater than 500 A) can be between 10% and 90%. For example, the pore volume comprising macropores can be between 20% and 80%. For example, the pore volume comprising macropores can be between 30% and 70%. For example, the pore volume comprising macropores can be between 30% and 60%. For example, the pore volume comprising macropores can be between 30% and 50%. For example, the pore volume comprising macropores can be between 40% and 60%.

In certain embodiments, the pore volume comprises less than 40% micropores, between 30 and 40% mesopores, and between 20 and 30% macropores. In certain other embodiments, the pore volume comprises less than 20% micropores, between 30 and 60% mesopores, and between 20 and 50% macropores. In certain other embodiments, the pore volume comprises less than 10% micropores, between 40 and 70% mesopores, and between 20 and 50% macropores. In certain other embodiments, the pore volume comprises less than 5% micropores, between 40 and 50% mesopores, and between 40 and 50% macropores. In certain other embodiments, the pore volume comprises less than 2% micropores, between 40 and 50% mesopores, and between 50 and 60% macropores.

The particle size of the lithiated as compared to non-lithiated porous nano-featured particles can vary. For example, the expansion factor, defined as ratio of the average particle size of porous nano-featured particles after lithiation divided by the average particle size under non-lithiated conditions. As described in the art, this expansion factor can be relative large for previously known, non-porous nano-featured materials, for example about 4 (corresponding to a 400% volume expansion upon lithiation). The current inventors have devised porous nano-featured materials that can exhibit a lower extent of expansion, for example, the expansion factor can vary from 3.5 to 4, from 3.0 to 3.5, from 2.5 to 3.0, from 2.0 to 2.5, from 1.5 to 2.0, from 1.0 to 1.5.

The properties of the porous nano-featured material (e.g., first cycle efficiency, capacity, etc.) can be determined by incorporating into an electrode, known to those versed in the art. The porous nano-featured silicon is tested electrochemically. The methods of testing may vary depending on the carbon:electrochemical modifier composition, as known in the art.

In certain embodiments, the electrochemical performance of the porous nano-featured silicon is tested in a half-cell; alternatively the performance of the porous nano-featured silicon is tested in a full cell, for example a full cell coin cell, a full cell pouch cell, a prismatic cell, or other battery configurations known in the art. The anode composition comprising the porous nano-featured silicon can further comprise various species, as known in the art. Additional formulation components include, but are not limited to, conductive additives, such as conductive carbons such as Super P, Ketjenblack carbons, and the like, conductive polymers and the like, binders such as styrene-butadiene rubber sodium carboxymethylcellulose (SBR—Na CMC), polyvinylidene difluoride (PVDF), and the like, and combinations thereof. The various types and species comprising the electrode are known in the art. The % of active material in the electrode by weight can vary, for example between 1 and 5%, for example between 5 and 15%, for example between 15 and 25%, for example between 25 and 35%, for example between 35 and 45%, for example between 45 and 55%, for example between 55 and 65%, for example between 65 and 75%, for example between 75 and 85%, for example between 85 and 95%. In preferred embodiments, the active material comprises between 80 and 95% of the electrode. In certain embodiment, the amount of conductive additive in the electrode can vary, for example between 1 and 5%, between 5 and 15%, for example between 15 and 25%, for example between 25 and 35%. In preferred embodiments, the amount of conductive additive in the electrode is between 5 and 25%. In certain embodiments, the amount of binder can vary, for example between 1 and 5%, between 5 and 15%, for example between 15 and 25%, for example between 25 and 35%. In preferred embodiments, the amount of conductive additive in the electrode is between 5 and 25%.

The first cycle efficiency of the porous nano-featured material can be determined by comparing the lithium inserted into the anode during the first cycle to the lithium extracted from the anode on the first cycle, prior prelithation modification. When the insertion and extraction are equal, the efficiency is 100%. As known in the art, the anode material can be tested in a half-cell, where the counter electrode is lithium metal, the electrolyte is a 1M $LiPF_6$ 1:1 ethylene carbonate:diethylcarbonate (EC:DEC), using a commercial polypropylene separator. Also known in the art, the ratio of EC:DEC can be varied, for example can be 2:1. Also known in art, the electrolyte solvent can also include fluorethylene carbonate (FEC), for example at 10% (w/w), for example at 20%, for example 30%.

In some embodiments, the first cycle efficiency of the porous nano-featured material is between 10% and 99.9%. In other embodiments, the first cycle efficiency of the porous nano-featured material is between 50% and 98%. In yet other embodiments, the first cycle efficiency of the porous nano-featured material is between 80% and 95%. In still other embodiments, the first cycle efficiency of the porous nano-featured material is between 85% and 90%. In another embodiment the first cycle efficiency is around 80%. In another embodiment, the first cycle efficiency is between 50 and 80%, for example, between 60% and 80%, for example, between 70% and 80%

The Coulombic efficiency of a particular cycle for the porous nano-featured material can be determined by comparing the lithium inserted during a particular cycle to the lithium extraction from the anode on the same cycle in a half-cell. In some embodiments, this Coulombic efficiency can be averaged, for example, averaged from cycle 7 to 25. In some embodiments, the average Coulombic efficiency from cycle 7 to 25 is between 90% and 100%, for example between 95% and 100%, for example between 98% and 100%, for example between 99% and 100%, for example between 99.1% and 100%, for example between 99.2% and 100%, for example between 99.3% and 100%, for example between 99.4% and 100%, for example between 99.5% and 100%, for example between 99.6% and 100%, for example between 99.7% and 100%, for example between 99.8% and 100%, for example between 99.9% and 100%, for example between 99.95% and 100%, for example between 99.99% and 100%, for example between 99.999% and 100%.

In another embodiment the present disclosure provides a porous nano-featured material, wherein the volumetric capacity (i.e., reversible capacity) independent of the alloying electrochemical modifier of at least 1000 mAh/cc when the porous nano-featured material is incorporated into an electrode of a lithium based energy storage device, for example a lithium ion battery. The volumetric capacity of the porous nano-featured material can be calculated from multiplying the maximum gravimetric capacity (mAh/g) with the pycnometer, skeletal density (g/cc), without the presence of the electrochemical modifier. In other embodiments, the volumetric capacity is at least 2000 mAh/cc. In some other embodiments, the volumetric capacity is at least 3000 mAh/cc. In yet other embodiments, the volumetric capacity is at least 4000 mAh/cc. In still other embodiments, the volumetric capacity is at least 5000 mAh/cc. In other embodiments, the volumetric capacity is at least 7000 mAh/cc, and in other embodiments, the volumetric capacity is at least 9000 mAh/cc. In another embodiment, the volumetric capacity of the carbon component of the composite is between 3000 and 7000 mAh/cc.

In another embodiment the present disclosure provides a porous nano-featured with a gravimetric capacity (i.e., reversible capacity) independent of the alloying electrochemical modifier of at least 800 mAh/g when the porous nano-featured material is incorporated into an electrode of a lithium based energy storage device, for example a lithium ion battery. In other embodiments, the gravimetric capacity is at least 1200 mAh/g. In some other embodiments, the gravimetric capacity is at least 1400 mAh/g. In yet other embodiments, the gravimetric capacity is at least 1600 mAh/g. In still other embodiments, the gravimetric capacity is at least 1800 mAh/g. In other embodiments, the gravimetric capacity is at least 2000 mAh/g, and in other embodiments, the gravimetric capacity is at least 2000 mAh/g, at least 2400 mAh/g, at least 2600 mAh/g, at least 3000 mAh/g, at least 4000 mAh/g or even at least 1200 mAh/g. In yet other embodiments, the gravimetric capacity is between 1800 and 2400 mAh/g. In some particular embodiments the porous nano-featured material have a gravimetric capacity ranging from about 2400 mAh/g to about 4000 mAh/g.

D. Additional Manufacturing Approaches to Produce Nano-Featured Porous Silicons and the Impact of Physico and Electrochemical Properties In particular embodiments, the starting feedstock comprises molten metal in an aerosol production processes—atomization—to form powders with exact control over stoichiometry and purity. This approach has the benefit of low cost feedstocks, continuous processing and excellent control over metallurgical attributes. In order to ensure that the novel material is rapidly commercialized, highly scalable manufacturing equipment is employed. Silicon process variables impacting the characteristics and performance of the resulting nano-featured porous silicon materials include, but are not limited to, host alloy elemental and compositional changes, aerosol production process alterations, and silicon post treatment surface modifications. The details of the technical approaches for each method are described below.

Self-assembled alloy phases are employed to create an ideal nano-structured material for battery applications. One specific microstructure of particular use is the binary eutectic—a metallurgical term for low melting point alloys of two different metals that form interdigitated solid mixtures of each metal at very specific compositions. One exemplary binary eutectic is the silicon-aluminum system, which displays a eutectic at 12.5% silicon. When this silicon-aluminum alloy cools from a melt, the entire solid alloy is comprised of nano-featured coral like formations of polysilicon immersed in solid aluminum. Aluminum is an exemplary host metal in this case because it can be easily etched away by common acids to yield a high value aluminum containing byproduct (used in the water treatment industry) as well as pure porous nano-structured silicon.

Numerous different metals form binary eutectics with silicon. For example, common low cost metals such as Fe, Mg, Ti and Ni form relatively simple silicon containing compounds. Depending on the phase diagram, these combinations of metals form either a pure silicon phase or a silicon-containing compound.

Hyper and hypo-eutectic compositions can be employed for the alloy. Without being bound by theory, deviations from the eutectic can result in very different micro/nano-features in the final product. In the silicon-aluminum system, a slight increase in the silicon content results in a combination of eutectic nano-featured silicon phase along with larger pure silicon particles that solidify at temperatures above the eutectic. The opposite occurs when silicon percentage is just short of the eutectic resulting in aluminum rich zones that yield larger voids in the silicon nano-structure after host metal removal.

Dopants are well known in metallurgy to create substantial changes to physical properties even at only minor levels. Perfectly crystalline silicon is has been established to expand faster in the 110 direction upon lithiation. By disrupting the diamond cubic lattice prior to lithium insertion, we expect to minimize expansion, or modify the phase transition as lithium is inserted. Dopant molecules depending on their crystallographic compatibility can create interstitial or substitutional defects as well as stacking faults and other deviations from the standard crystal structure. Iron, copper, and nitrogen are known to create interstitial defects in silicon, while sulfur and zinc create substitutional defects each of which may be useful in disrupting the diamond cubic crystal structure that absorbs lithium sometimes irreversibly. Stacking faults can be propagated by insertion of aluminum and boron dopants and grain boundaries are easily attacked by phosphorous. Magnesium and strontium have been shown to help nucleate fine eutectic grains in the silicon-aluminum system. In all cases, these metals can be added to the melt at 1-2% or less and result in a large impact on the final silicon structure.

With regards to the production of alloy particle via atomization, the process to produce such materials is well established in the art and uses molten alloy with highly controlled composition atomized into an inert atmosphere cooling and collection chamber. This process starts with very low cost silicon and host metal powders or ingots and can be run continuously at high volume with relatively small footprint equipment. Without being bound by theory, manufacturing processes that control aerosol particle size are an important lever for driving the features of the eutectic alloys. Particle size can be altered by adjusting variable including, but not limited to, the nozzle as well as process variables such as melt temperature, flow rate, and gas pressure. Various particle sizes can thus be achieved by varying the droplet size resulting from the nozzle design and atomization conditions. The particle sizes thus achieved can be varies, for example from 10 nm to 100 nm, for example from 100 nm to 500 nm, for example from 100 nm to 1 um, for example from 1 um to 2 um, for example from 1 um to 5 um, for example from 1 um to 10 um, for example from 5 um to 50 um, for example to over 50 um. Various alloys can be employed in this context, one embodiment is represented by aluminum silicon alloy, wherein the aluminum content can be varied according to eutectic compositions known in the art, for example eutectic compositions comprising about 12% aluminum, for example eutectic compositions comprising about 20% aluminum, for example eutectic compositions comprising about 25% aluminum. Depending on particle size, cooling drives the solid liquid interface through the particle and kinetics determines the way silicon and host metal atoms are able to self segregate into their respective pure metal constituents. Rapid cooling of smaller particles combined with the kinetic limitations of phase separation at a given eutectic solidification temperature result in finer features. Larger particles cool more slowly and allow the silicon and host metal to phase separate into wider bands.

With regards to quench conditions, typically, aerosol processing ejects molten alloys into an inert nitrogen atmosphere. This aspect of the process drives the cooling rate and hence properties of the final silicon. By quenching aerosol particles in inert gasses at different temperature, we will exert additional control. Various liquids can also be used to quench metals to drive changes in the phases that are formed, create meta-stable phases, modify grain boundaries and even control crystal propagation directions. Inert oils at various temperatures will be can be employed as a substitute for aqueous media.

In addition, the surface of the nano-featured porous silicon can be modified. Without being bound by theory, surface functionality is very important for several reasons including: high surface to bulk ratio in nano-materials results in surface driven material properties; silicon surface drives interaction with carbon coating; exposed silicon in the final product is largely eliminated by carbon coating but even small amounts can be harmful to coulombic efficiency and first cycle efficiency.

In certain embodiments, the surface of the nano-featured porous silicon is covered with an alumina coating to creating a very fine atomic layer of alumina over the surface of the nano-featured porous silicon material. For example, when aluminum is used as a host metal, an aluminum byproduct is left in solution after the host metal is removed from the silicon nano-structure. The solvated aluminum material naturally forms a monolayer over the silicon and when oxidized in air at slightly elevated temperatures, the result is an alumina coating much like those generated by much more expensive Atomic Layer Deposition (ALD) techniques.

In certain embodiments, the nano-featured porous silicon material is produced as a grain boundary phase modified polycrystalline silicon. Without being bound by theory, polycrystalline silicon is actually an agglomeration of nano-scale single crystal grains. Furthermore, grain boundaries, which are essentially an accumulation and alignment of crystal defects, are an ideal location to introduce dopant atoms or alternate phases into the polycrystalline matrix. It is expected that introduction of an alternate phase along grain boundaries has a number of advantages including: (i) introduction of a brittle or self destructive phase that could help to initiate "disassembly" of the polycrystalline matrix into nanoparticles of single crystal silicon during for example a milling process; (ii) introduction of a phase with high lithium transport capabilities that allows lithium to rapidly move along grain boundaries before migrating into the single crystal phase (facilitating silicon to form silicon nanoparticles in situ during battery charging or simply improve power performance of the material), and; (iii) introduction of a grain boundary phase that could be intentionally attacked with either chemical, physical, thermal or electrochemical approaches to "disassemble" the polycrystalline matrix into nanoparticles of single crystal silicon. There are a large number of different elements that can be used to produce such an arrangement of the desired phases. Example elements are not limited to, but may include: H, O, P, B, Al, N, Li, Na and many others. In certain embodiments, polycrystalline surfaces can be etched with NaOH, LiOH, or KOH to highlight grain structure and create valleys on the surface; ideal for initiating grain boundary modification or depositing materials to be doped into grain boundaries.

As an example, hydrogen is commonly doped with silicon to achieve improved efficiency in solar cells. It is believed that hydrogen atoms will passivate silicon defects along grain boundaries and at defect sites by bonding with dangling silicon atoms. Different states of hydrogen are also able to exist at various locations in the crystal structure of silicon. The most energetically favorable method for introducing hydrogen is by way of ionized hydrogen via plasma sources. However, hydrogen will diffuse into silicon via a molecular gas stream at lower temperatures in the range of 900-1200 Cvi (followed by rapid quenching) and has been reported in forming gas consisting of N2/H2 blends at temperatures as low as 400-500 C. Once silicon has been adequately doped with hydrogen, there is evidence that exfoliation can occur and mechanisms have been described that outline a process whereby hydrogen gas evolves from the monatomic state back into molecular hydrogen under certain conditions and induced exfoliation and destruction of the silicon crystal structure. In this fashion, hydrogen in the system and the process that devolves H2 out of silicon facilitates the pulverization of silicon at the nanoscale.

An another example, phosphorus embodies utility because of strong preferential diffusion rate along grain boundaries. Studies have shown that P diffuses 8000 times faster along grain boundaries than it does in the bulk silicon crystal structure. Phosphorus can be facilely doped into silicon using the following process. This method used phosphoric acid (H3PO4) as the doping source and silicon powder to obtain phosphorus doped n-type silicon powder according to the art. Fine silicon powder is stirred in a diluted solution of phosphoric acid with purity of 97% having different concentrations. The silicon particles in powder are dried with the phosphorus film then the phosphorus driven into the silicon particles. The binary Si—P phase diagram is well mapped and temperature control along with P content and quenching may be used to control the P containing phase in the matrix.

In another embodiment, the Si—P phase is modified after it has been formed within polycrystalline silicon. For example, in the art it is known that decomposition of $Si_{12}P_5$ occurs at temperatures over 1050 C. Without being bound by theory, the Si—P phase is decomposed while simultaneously passivating the newly exposed surfaces by utilizing a gas stream that contains $H_2$, $O_2$, $CO_2$, or $H_2O$. Acids may also be used to attack the Si—P phase, but elevated temperatures may be required as phosphide has been found to be resistant to cold dilute acids. Phosphide containing silicon may also be easier to degrade by way of milling or other physical, chemical, or combined attack.

The art also describes a large number of different compounds suitable for of treating silicon with. In one embodiment, lithium is employed to pre-stress the silicon and create a material that will withstand future lithiation cycles more easily. Doping silicon with lithium is also well documented in the art. Select addition of oxygen may also be of interest. Oxide forms a robust layer, and if oxygen defects within the crystal structure of silicon are controlled, they make the material either more robust to lithium cycling or conversely may enable selective destruction of the silicon structure to achieve the desired nanostructure. This may also be the case for numerous silicon dopants such as Al, Ge, As, N, B, Ga, Sn, or combinations thereof as well as many other possible elements.

With regards to the process for etching the silicon-metal, the etching can be carried out in various solvents, for example water, of mixtures of water and other miscible aqueous co-solvent mixtures. Alternatively, the solvent can be non-aqueous, or mixed aqueous and non-aqueous emulsion or suspension systems. In a preferred embodiment, the solvent in water, and the etchant is hydrochloric acid. The etching reaction can be carried out at various temperatures, for example between 25 C and 100 C, for example between 25 C and 50 C, for example between 50 C and 100 C.

EXAMPLES

Example 1

Etching of Al—Si Alloy to Yield Bulk Porous Silicon

Aluminum-silicon alloy was dispersed in water and mixed by overhead mixer. Hydrochloric acid was added the dispersion over time, generating heat and accomplishing the etching. To avoid boiling, the heat generated is removed from the reactor by adding water ice to the system. Other modes to remove heat, such as employing a heat exchanger of varying modes of other approaches can also be employed, as known in the art. After the etching reaction subsided, the solids were allowed to settle in the reaction tank, and excess water decanted. The wet cake was dried in an oven, for example at 130 C, to yield dried, porous silicon with nano-scaled features. Alternatively, additional drying at a higher temperature, for example 450 C under an inert environment such as nitrogen gas, is also employed to yield the final dried, porous silicon. Alternatively, additional drying at a higher temperature, for example 1050 C under an inert environment such as nitrogen gas, is also employed to yield the final dried, porous silicon with nano-scale features.

An example SEM for the porous silicon with nano-scaled features in presented in FIG. 1. The nano-sized features are evidenced in the SEM.

Example 2

Particle Size Reduction of Bulk Porous Silicon

Figure 2:
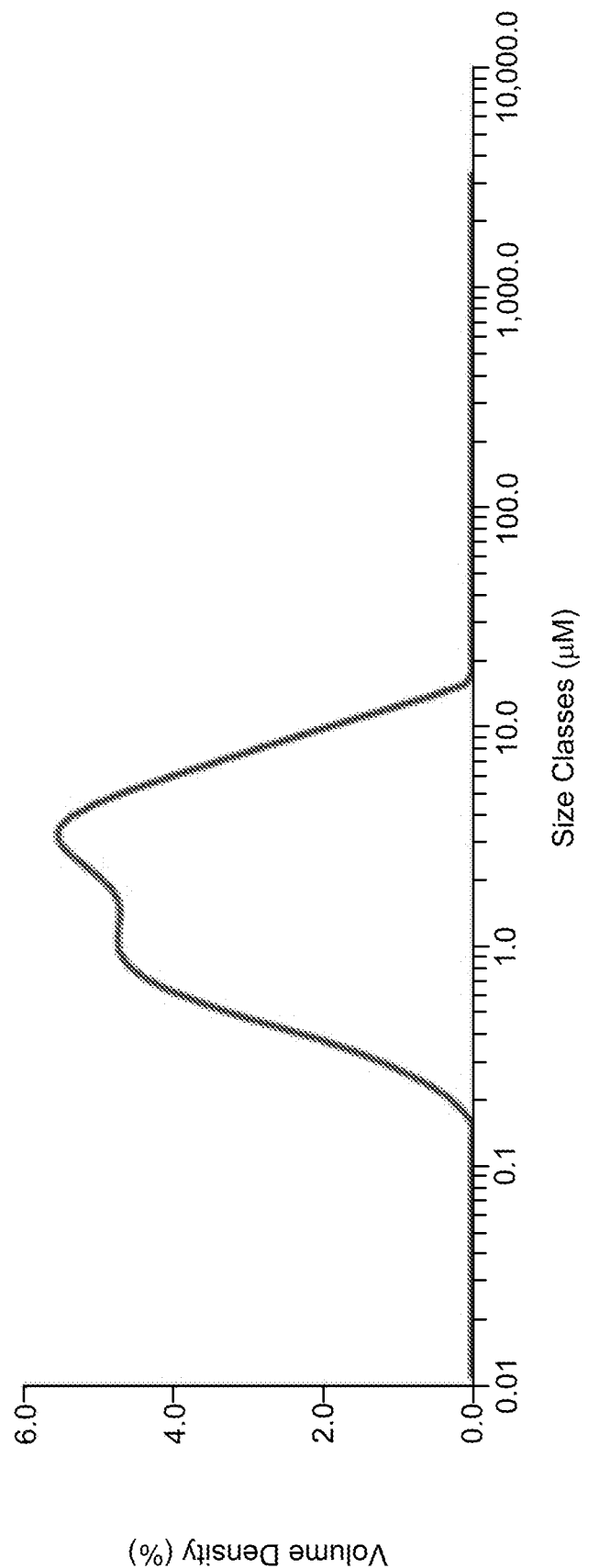
FIG. 2. Example particle size distribution for porous silicon.
Figure 3:
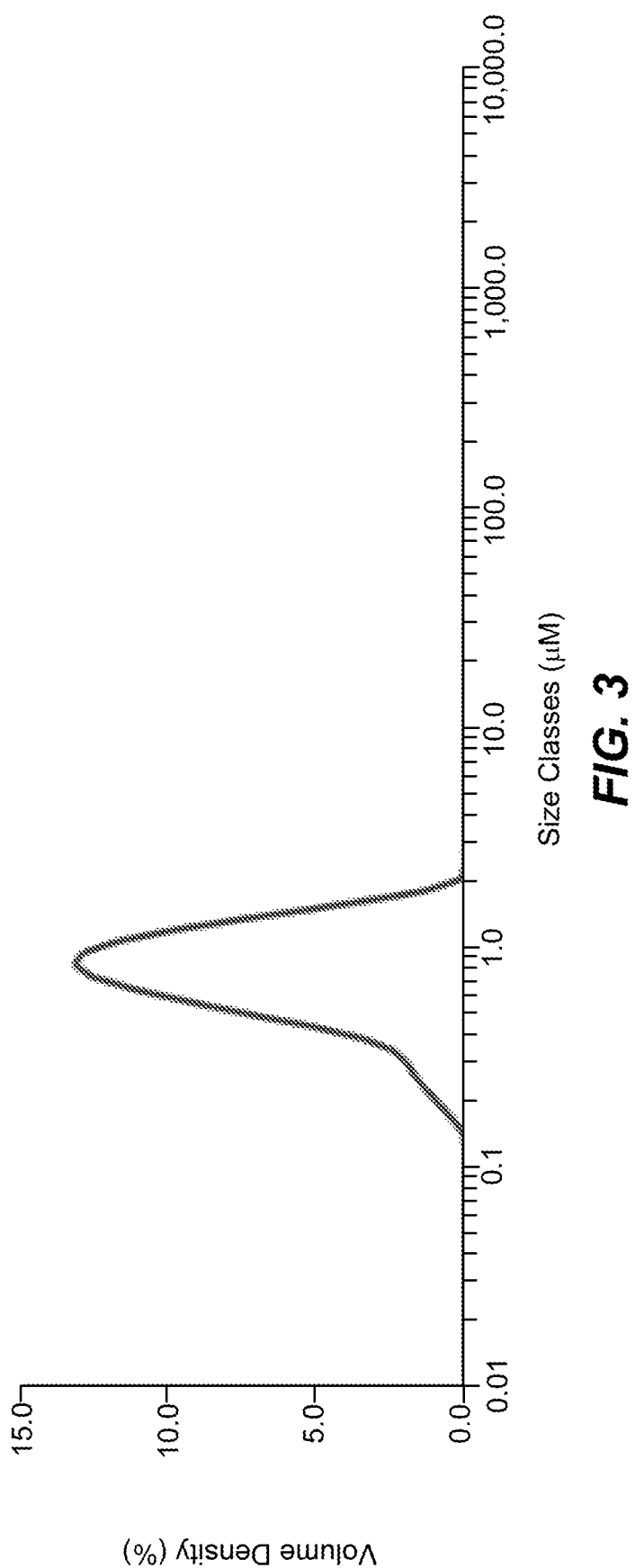
FIG. 3. Example particle size distribution for jet milled porous silicon.

The bulk porous silicon from Example 1 can be size reduced, for example by methods known in the art such as grinding, ball milling, jet milling, water jet milling, and other approaches known in the art. In one embodiment, the porous silicon is particle sized reduced by jet milling. Example particle size distributions before and after jet milling are shown in FIG. 2 and FIG. 3, respectively. Before jet milling, the measured Dv0, Dv1, Dv5, Dv10, Dv20, Dv50, Dv80, Dv890, Dv95, Dv100 were 167 nm, 250 nm, 384 nm, 506 nm, 742 nm, 1.96 um, 4.63 um, 6.64 um, 12.0 um, and 16.2 um, respectively. This material was predominantly micron-sized, for example the Dv50 was 1.96 microns. After jet milling, the measured Dv0, Dv1, Dv5, Dv10, Dv20, Dv50, Dv80, Dv90, Dv99, and Dv100 were 146 nm, 194 nm, 290 nm, 388 nm, 505 nm, 766 nm, 1.10 um, 1.28 um, 1.65 um, and 1.87 um, respectively.

As can be seen, the porous silicon described herein was sufficiently friable to achieve substantially nano-scale particles following jet milling, specifically, the Dv50 was 766 nm for the jet milled porous silicon comprising nano-scale features. The particle size reduction can be described in terms of the material friability, for example, friability is defined as the % reduction in volume average particle size upon employing standard jet milling processing as known in the art. By this criteria, the friability of the novel nano-featured porous silicon is [1−(0.766)/1.96] or 61%.

Example 3

Particle Size Reduction of Non-Porous Silicon

Figure 4:
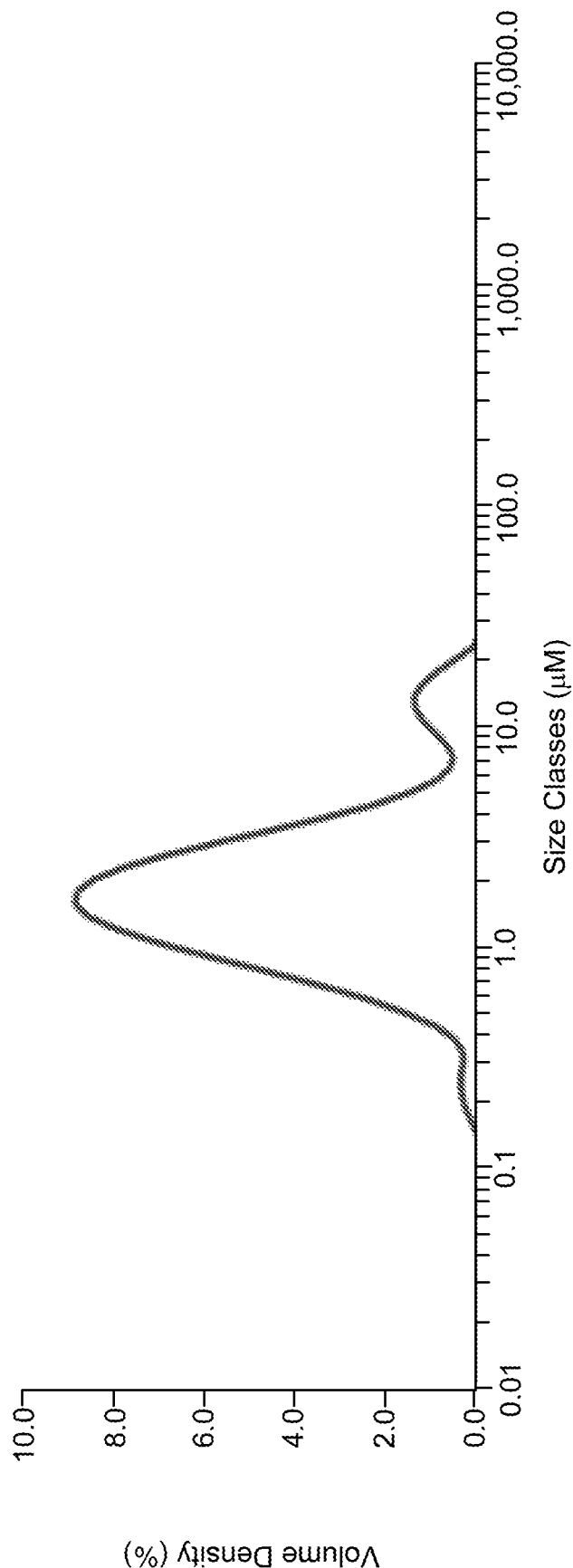
FIG. 4. Example particle size distribution for non-porous silicon.
Figure 5:
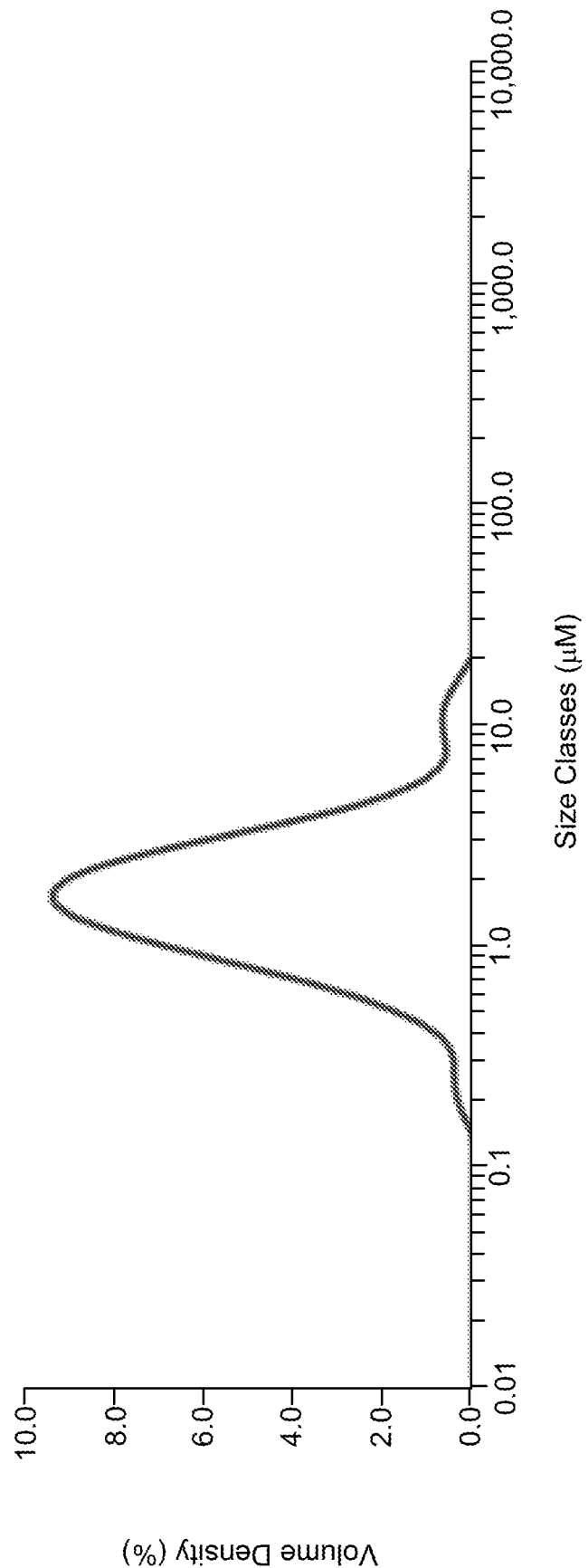
FIG. 5. Example particle size distribution for jet milled non-porous silicon.
Figure 6:
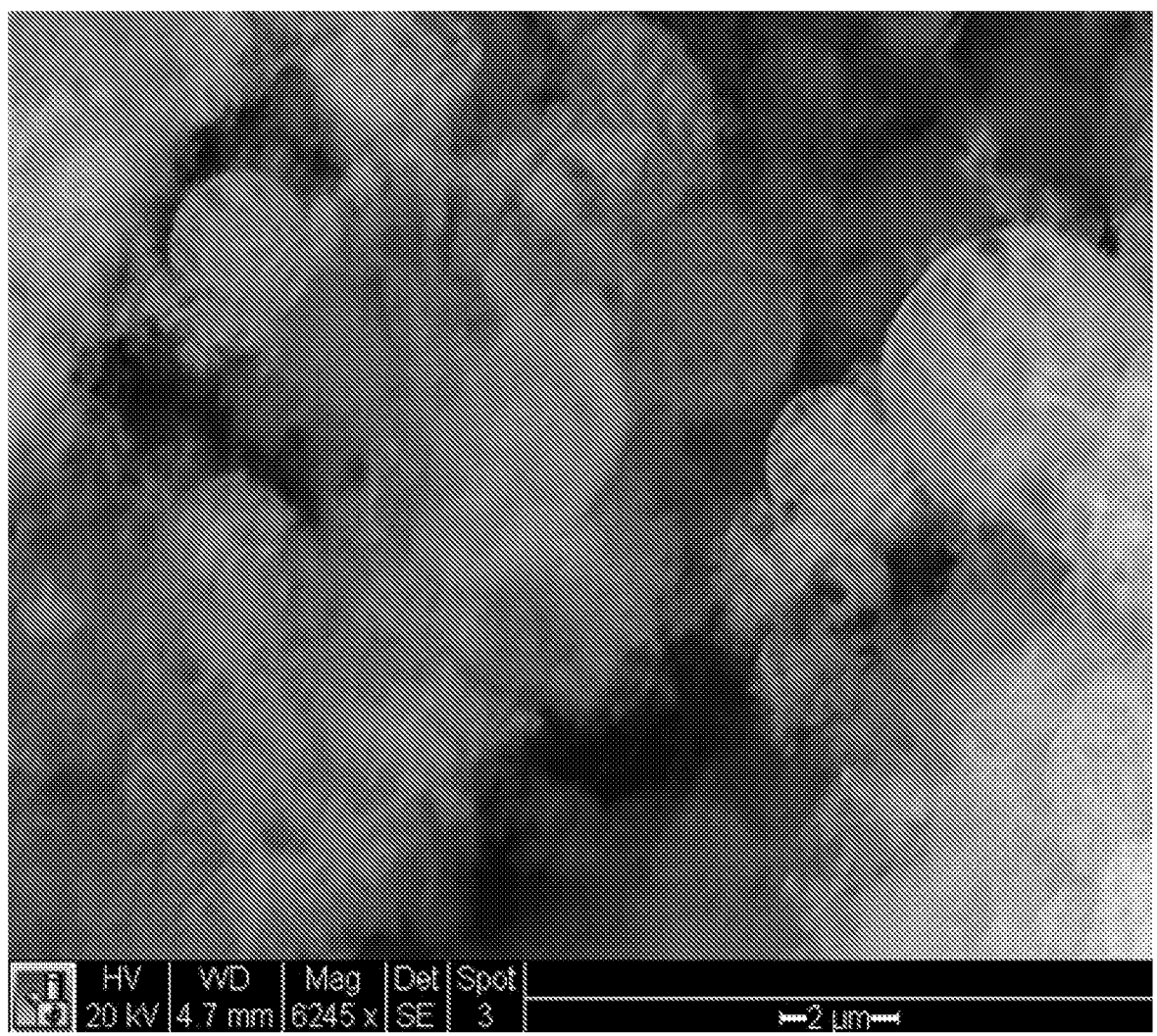
FIG. 6. SEM for material according to example 4-1.
Figure 7:
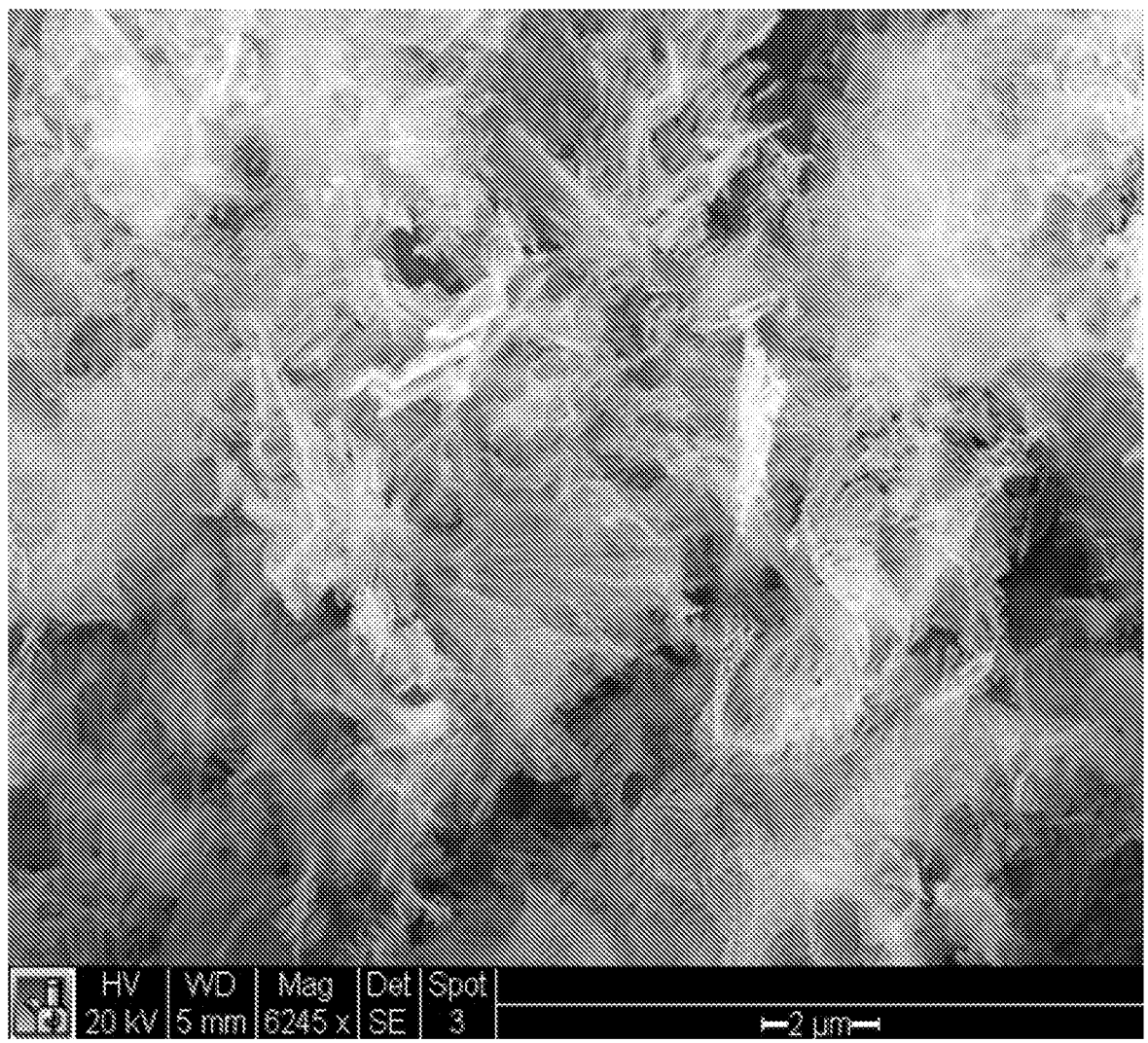
FIG. 7. SEM for material according to example 4-3.
Figure 8:
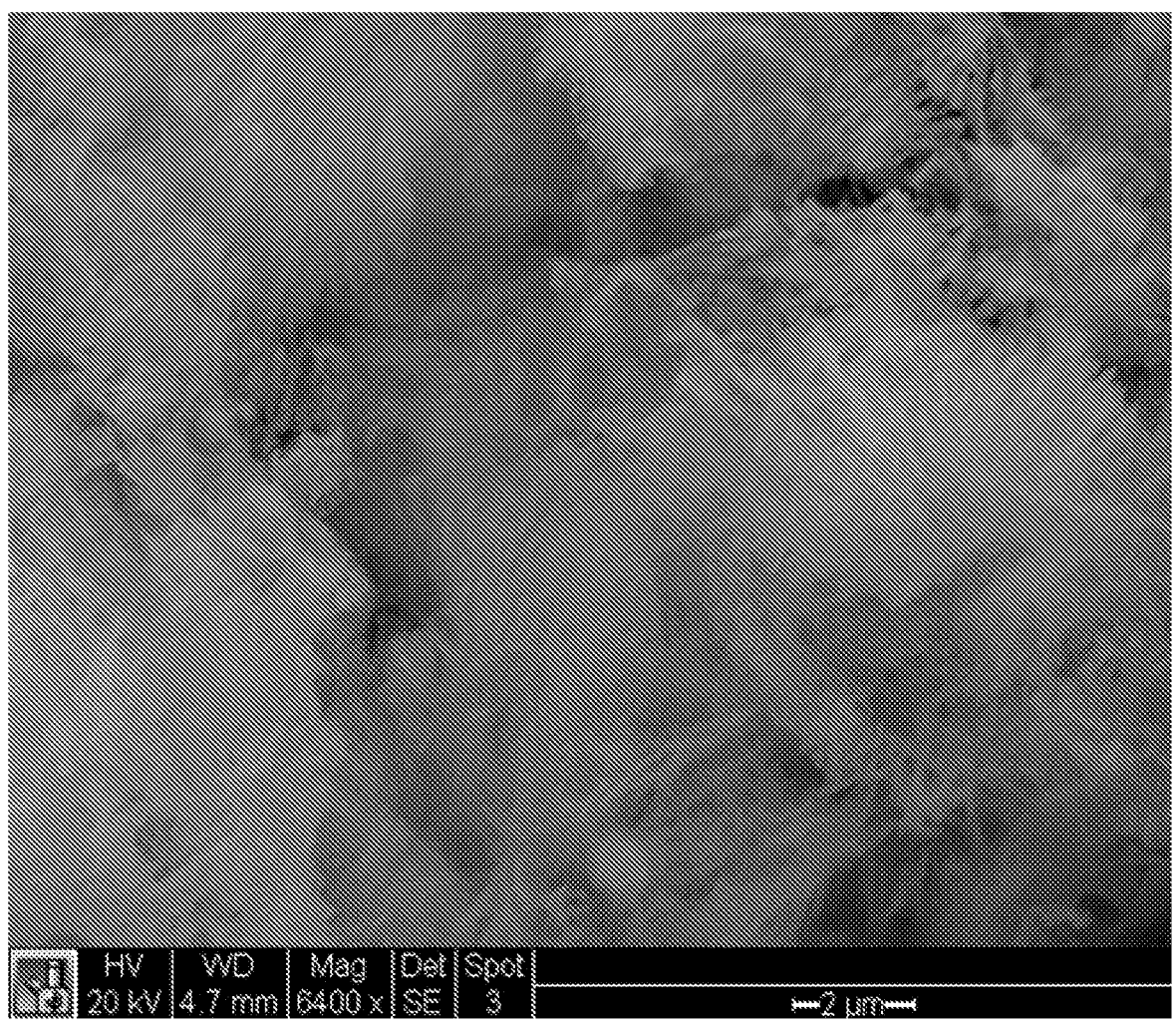
FIG. 8. SEM for material according to example 4-4.
Figure 9:
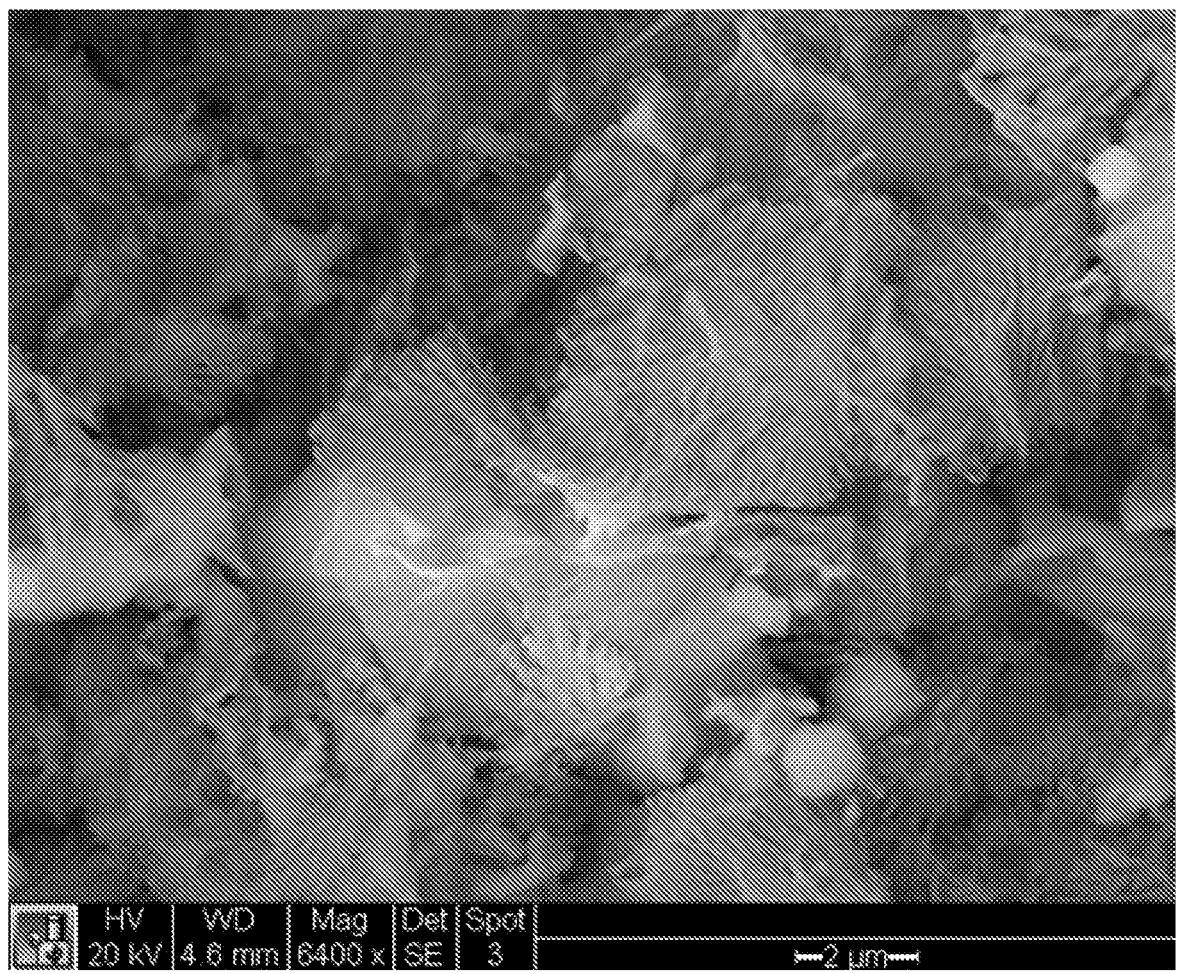
FIG. 9. SEM for material according to example 4-5.
Figure 10:
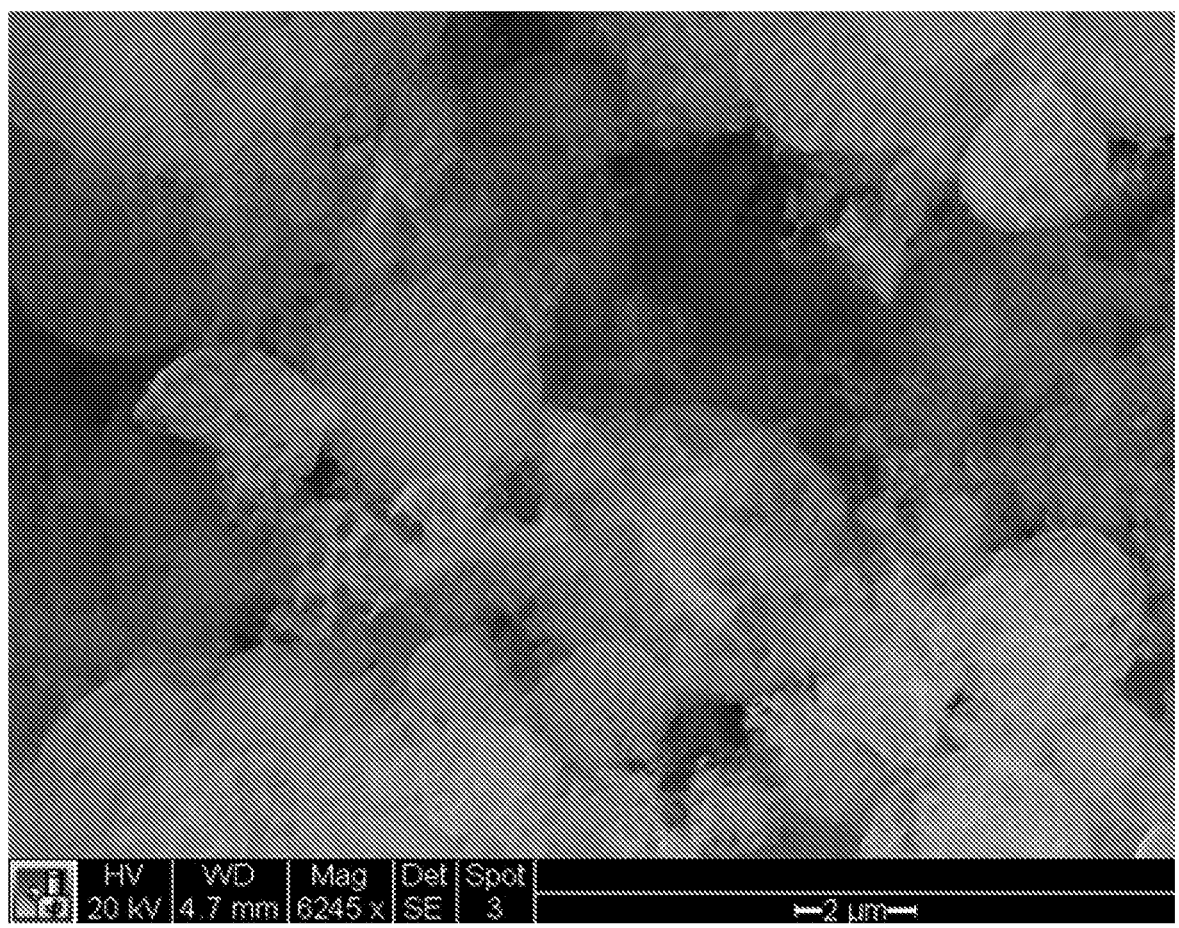
FIG. 10. SEM for material according to example 4-6.
Figure 11:
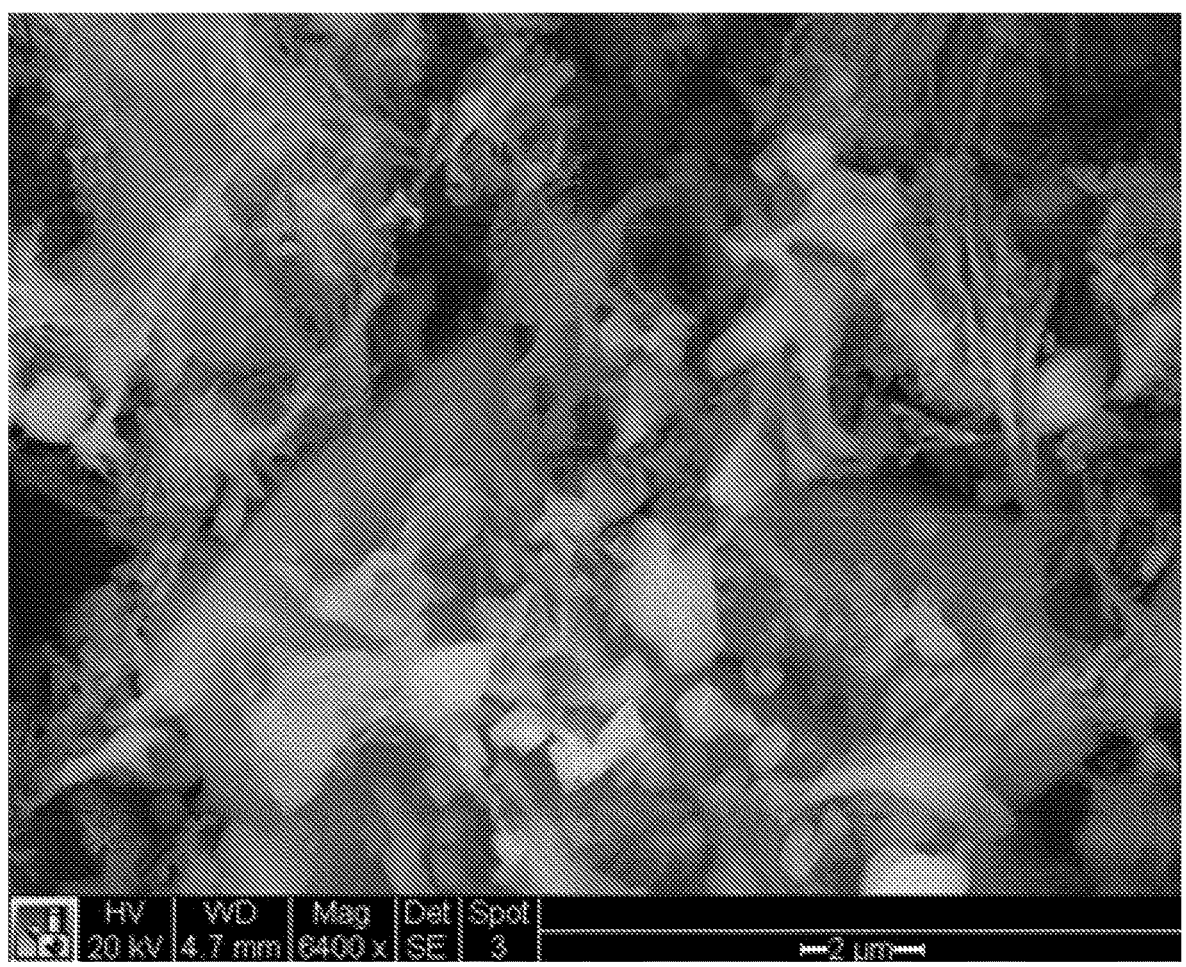
FIG. 11. SEM for material according to example 4-10.
Figure 12:
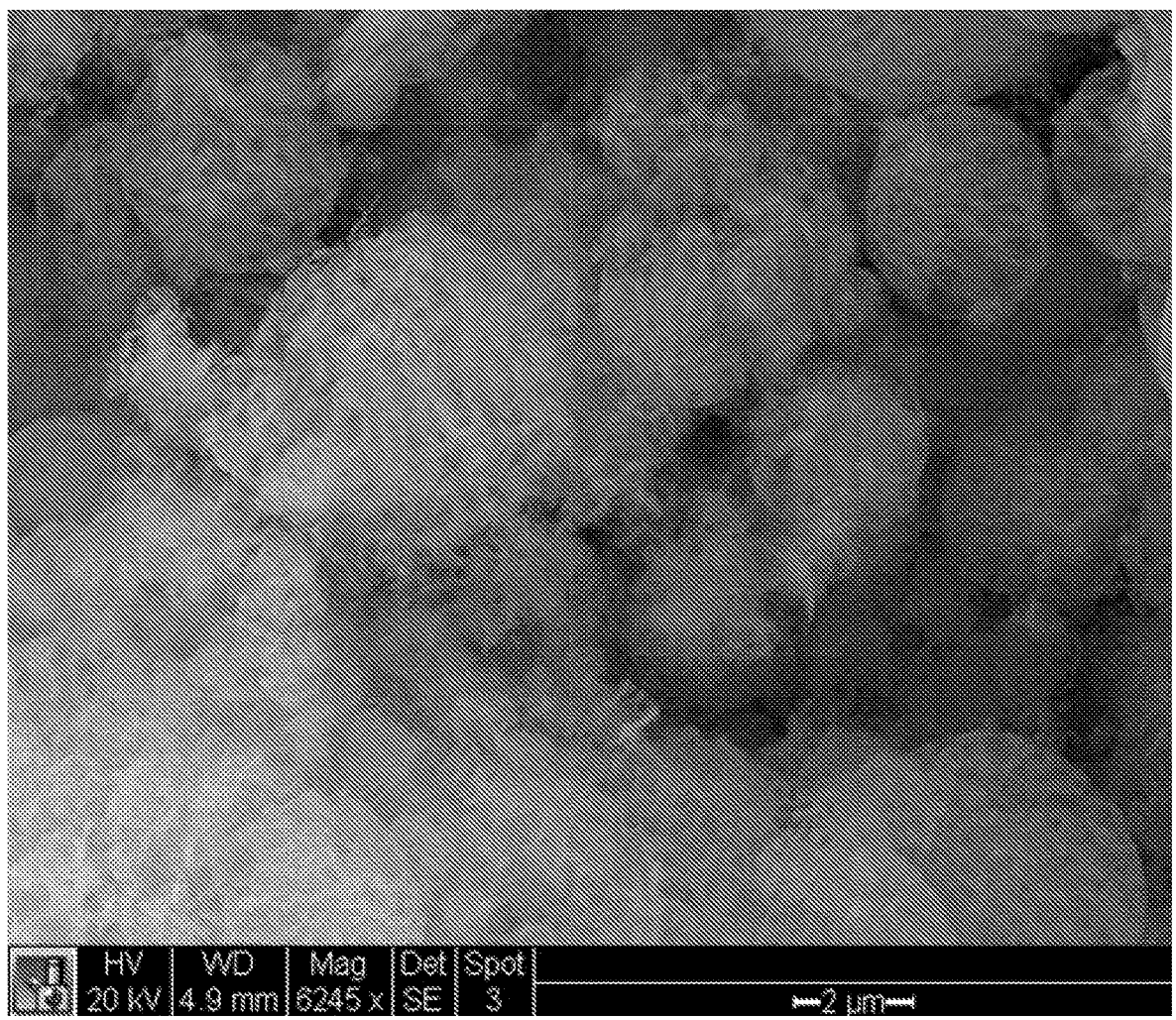
FIG. 12. SEM for material according to example 4-11.
Figure 13:
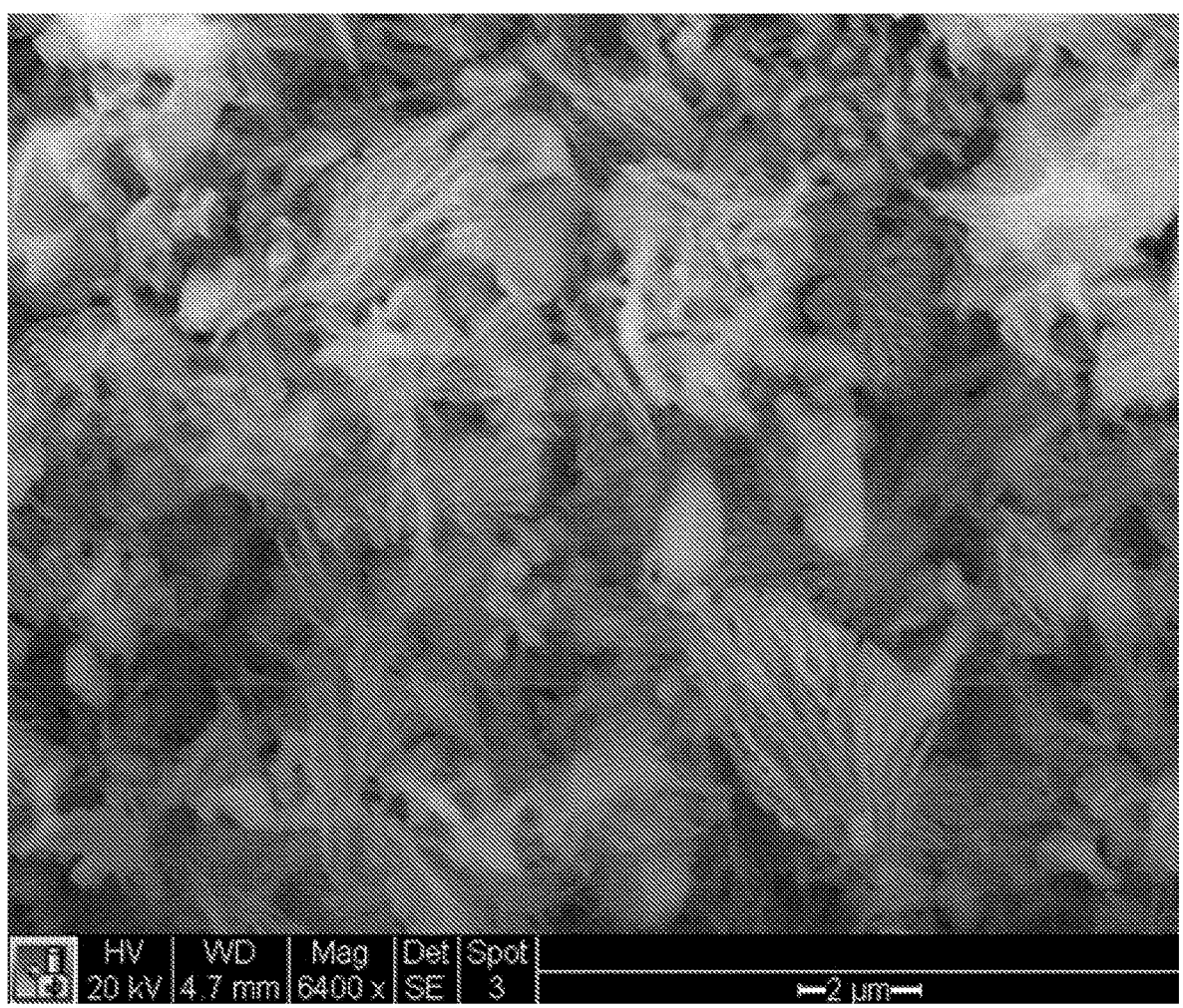
FIG. 13. SEM for material according to example 4-15.

Employing the same jet milling strategy as for Example 2, an attempt was conducted to particle size reduce a commercially available non-porous silicon. Example particle size distributions before and after jet milling are shown in FIG. 4 and FIG. 5, respectively. Before jet milling, the measured Dv0, Dv1, Dv5, Dv10, Dv20, Dv50, Dv80, Dv890, Dv95, Dv100 were 147 nm, 247 nm, 546 nm, 702 nm, 942 nm, 1.66 um, 3.03 um, 4.64 um, 17.1 um, and 23.9 um, respectively. This material was predominantly micron-sized, for example the Dv50 was 1.66 microns. After jet milling, the measured Dv0, Dv1, Dv5, Dv10, Dv20, Dv50, Dv80, Dv90, Dv99, and Dv100 were 147 nm, 245 nm, 525 nm, 685 nm, 924 nm, 1.62 nm, 2.79 um, 3.79 um, 12.5 um, and 18.6 um, respectively. As can be seen, the non-porous silicon was non-friable. There was no appreciable particle size reduction upon jet milling the jet milled non-porous silicon remained micron-sized, specifically, the Dv50 was 1.62 um.

The particle size reduction can be described in terms of the material friability, for example, friability is defined as the % reduction in volume average particle size upon employing standard jet milling processing as known in the art. By this criteria, the friability of the non-porous silicon is [1−(1.62)/1.66] or 2.4%.

Example 4

Production of Porous Nano-Featured Silicon at Various Conditions

Silicon-Aluminum alloy powders of varying particle sizes were etched to various levels of excess aluminum and characterized for physical and electrochemical properties. Si—Al powders were obtained with average particle sizes of 2 um, 8 um, and 15 um. Complete etching of the aluminum from the powders showed a decrease in specific surface area and total pore volume, with increasing alloy particle size. Samples also displayed a decrease in surface area and pore volume, with increased aluminum concentration in the final etched material. The data are presented in Table 1 for samples with 12% silicon in the alloy, and Table 2 presents data for samples with silicon content in the alloy varying from 12-25%.

TABLE 1

Production and characterization of various exemplary nano-featured porous silicon materials according to Example 4.

| Sample # | Alloy type | Dv50 | % Si in alloy | % Excess Al | BET SSA ($m^2/g$) | PV ($cm^3/g$) |
|---|---|---|---|---|---|---|
| 4-1 | 12-S2 | 2 um | 12% | 0% | 229 | 0.449 |
| 4-2 | 12-S8 | 8 um | 12% | 0% | 104 | 0.302 |
| 4-3 | 12-S15 | 15 um | 12% | 0% | 81 | 0.219 |
| 4-6 | 12-S2 | 2 um | 12% | 10% | 178 | 0.331 |
| 4-7 | 12-S8 | 8 um | 12% | 10% | 74 | 0.201 |
| 4-8 | 12-S15 | 15 um | 12% | 10% | 72 | 0.230 |
| 4-11 | 12-S2 | 2 um | 12% | 30% | 125 | 0.322 |
| 4-12 | 12-S8 | 8 um | 12% | 30% | 78 | 0.248 |
| 4-13 | 12-S15 | 15 um | 12% | 30% | 73 | 0.208 |

Silicon-Aluminum alloy powders of varying silicon percentages were etched to different levels of excess aluminum and characterized for physical and electrochemical properties. Si—Al powders with 12, 20, and 20% silicon in the alloy were etched to 0, 10, and 30% aluminum. Fully etched powders had decreasing specific surface area with increased starting aluminum content.

TABLE 2

Production and characterization of various exemplary nano-featured porous silicon materials according to Example 4.

| Sample # | Alloy type | Dv50 | % Si in alloy | % Excess Al | BET SSA ($m^2/g$) | PV ($cm^3/g$) |
|---|---|---|---|---|---|---|
| 4-2 | 12-S8 | 2 um | 12% | 0% | 104 | 0.302 |
| 4-4 | 20-10 um | 8 um | 20% | 0% | 81 | 0.232 |
| 4-5 | 25-10 um | 15 um | 25% | 0% | 57 | 0.160 |
| 4-7 | 12-S8 | 2 um | 12% | 10% | 74 | 0.201 |
| 4-9 | 20-10 um | 8 um | 20% | 10% | 82 | 0.219 |
| 4-10 | 25-10 um | 15 um | 25% | 10% | 38 | 0.110 |
| 4-12 | 12-S8 | 2 um | 12% | 30% | 78 | 0.248 |
| 4-14 | 20-10 um | 8 um | 20% | 30% | 72 | 0.239 |
| 4-15 | 25-10 um | 1 5um | 25% | 30% | 34 | 0.120 |

SEM images for materials according to samples 4-1, 4-3, 4-4, 4-5, 4-6, 4-10, 4-11, 4-15 in FIG. 6, FIG. 7, FIG. 8, FIG. 9, FIG. 10, FIG. 11, FIG. 12, and FIG. 13 respectively. As can be seen, in all cases, the resulting material is a porous silicon material with nano-sized features.

Figure 14:
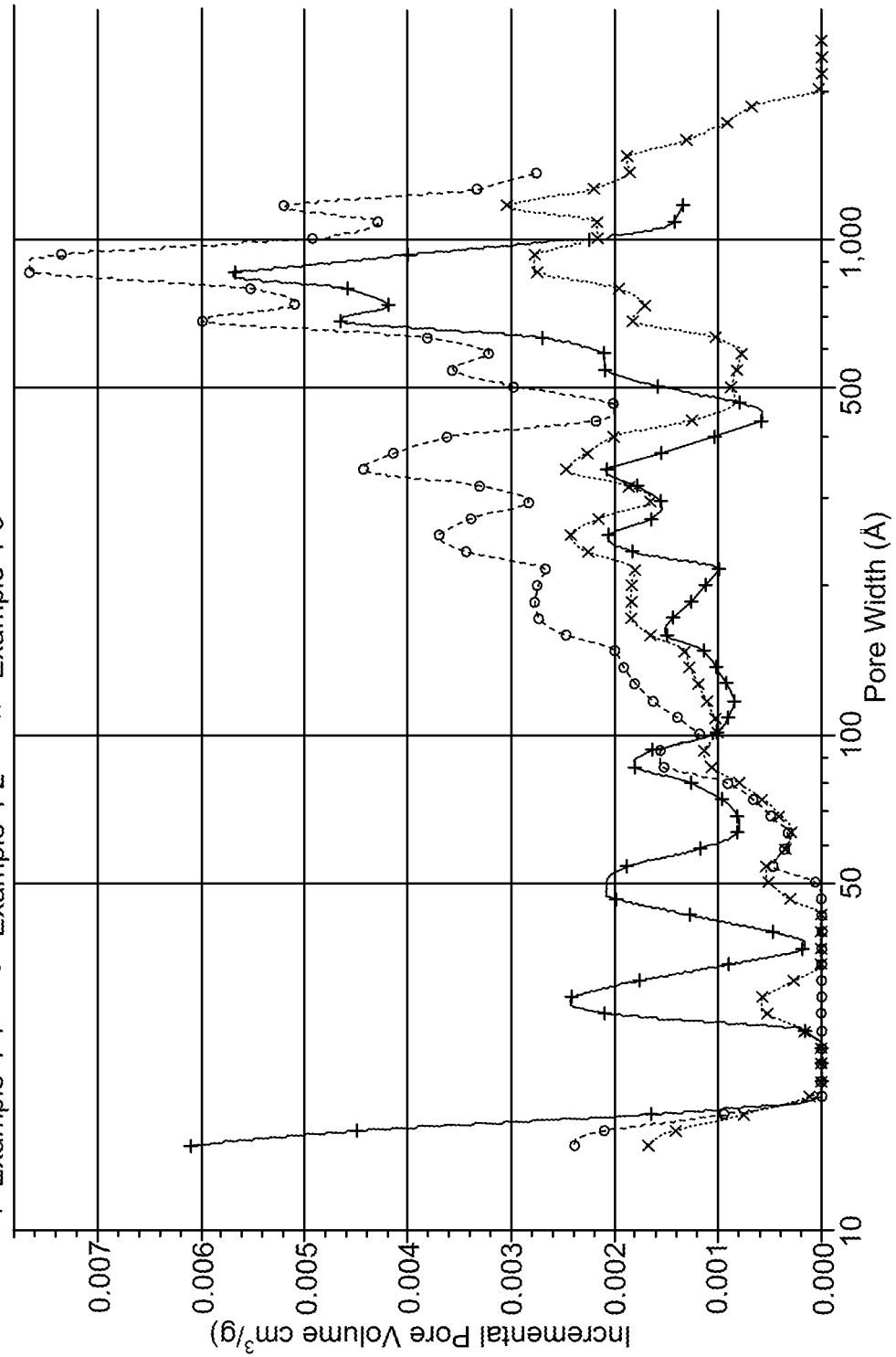
FIG. 14. Pore volume distribution for samples 4-1, 4-2, and 4-3.

Table 3 presents pore volume distributions for various exemplary nano-featured porous silicon materials according to Example 4. Representative pore distributions for samples 4-1, 4-2 and 4-3 are depicted in FIG. 14. Within this series, the samples are produced with increasing particle size, with no excess aluminum, and 12% silicon in the alloy. The data show a trend for the pore volume in decreased in the micropore range, for example pores less than 20 A.

Figure 15:
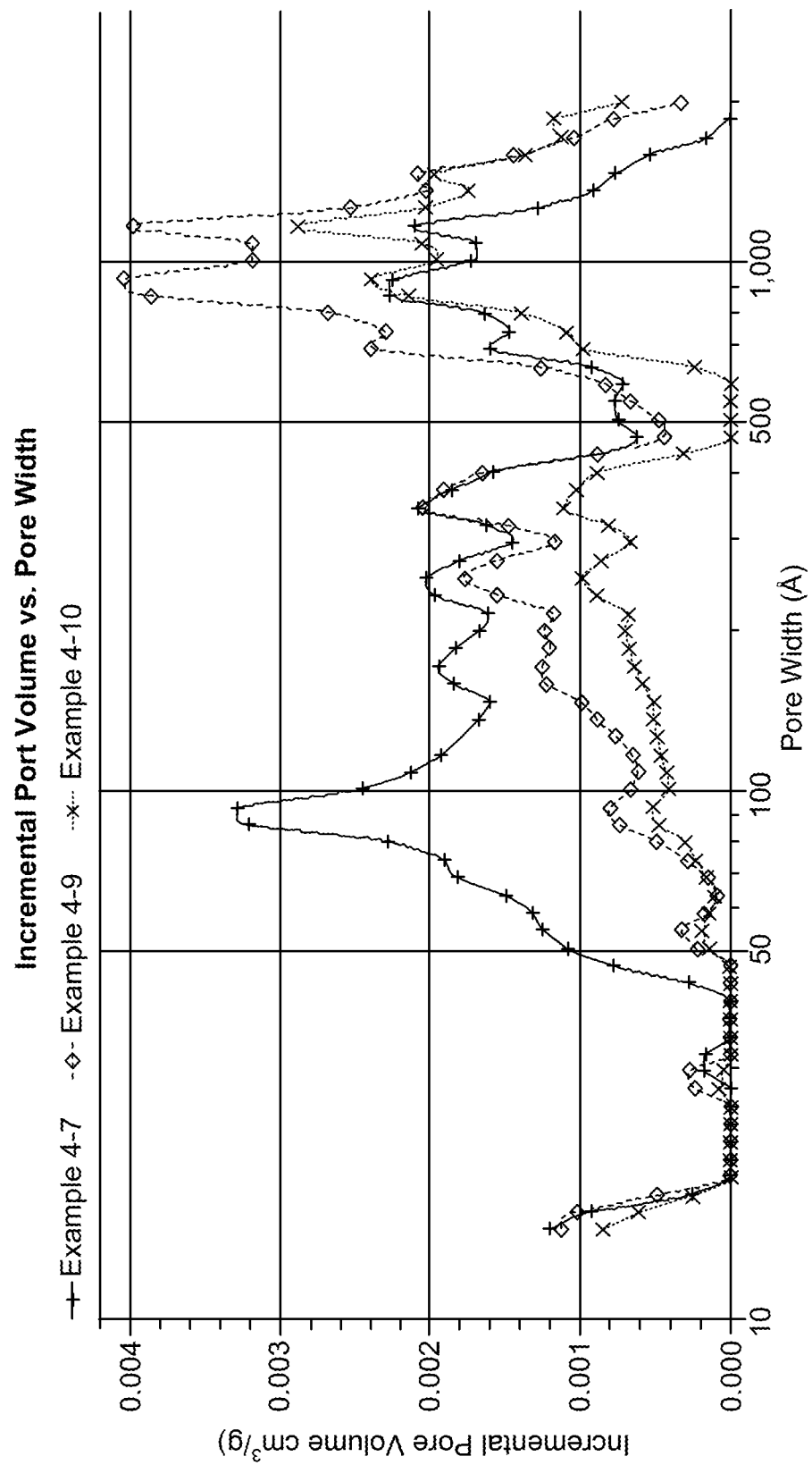
FIG. 15. Pore volume distribution for samples 4-7, 4-9, and 4-10.

The pore distribution of samples 4-7, 4-9 and 4-10 are depicted in FIG. 15. Within this series, the samples were produced from aluminum silicon alloys with increasing silicon alloy particle size and increasing % silicon in the alloy, but with the same residual aluminum content in the etched alloy. Samples 4-7 and 4-9 exhibited a higher surface area and pore volume compared to sample 7-10, although all three samples showed a similar micropore volume by DFT analysis. Sample 4-7 demonstrated a higher fraction of mesopores (20-500 A sized pores), whereas sample 4-9 demonstrated a higher fraction of macropores (>500 A sized pores).

TABLE 3

Pore volume distributions for various exemplary nano-featured porous silicon materials according to Example 4.

| Sample | Fractional pore volume micropores | Fractional Pore volume mesopores | Fractional pore volume macropores |
|---|---|---|---|
| 4-1 | 20.5% | 47.6% | 31.9% |
| 4-2 | 8.5% | 49.1% | 42.4% |
| 4-3 | 11.2% | 59.9% | 28.9% |
| 4-4 | 12.0% | 41.4% | 46.6% |
| 4-5 | 13.90 | 42.9% | 43.2% |
| 4-6 | 39.2% | 34.1% | 26.7% |
| 4-7 | 7.3% | 71.0% | 21.7% |
| 4-8 | 5.9% | 53.0% | 41.1% |
| 4-9 | 13.2% | 44.2% | 42.6% |
| 4-10 | 13.0% | 44.8% | 42.1% |
| 4-11 | 14.4% | 38.5% | 47.1% |
| 4-12 | 4.9% | 47.4% | 47.7% |
| 4-13 | 8.4% | 57.8% | 33.8% |
| 4-14 | 7.8% | 48.4% | 43.8% |
| 4-15 | 5.7% | 50.6% | 43.7% |

Samples 4-1, 4-2 and 4-3 were analyzed for the electrochemical performance in a half-cell, in a electrode comprising 10% conductive carbon, 10% binder, and 80% active material, wherein the active material is further comprised of 85% graphite and 15% nano-featured porous silicon. These samples were assembled into half-cells, and tested for five cycles at a rate of C/10, and further cycles at C/5. The average Coulombic efficiency was calculated over cycles 7 to cycle 25, and the capacity retention was calculated as the capacity at cycle 25 divided by the capacity at cycle 25. For sample 4-1, when tested in this system, the first cycle efficiency was 79%, the capacity was 561 mAh/g, the average Coulombic efficiency over cycles 7 to cycle 25 was 0.9925, and the capacity retention at cycle 25 relative to cycle 7 was 100%. For example 4-3 when tested in this system, the first cycle efficiency was 82%, the capacity was 673 mAh/g, the average Coulombic efficiency over cycles 7 to cycle 20 was 0.9898, and the capacity retention at cycle 20 relative to cycle 7 was 95.6%. These data demonstrate that the nano-featured porous silicon produced from the smaller alloy particle size (2 um vs. 15 um) provided a nano-featured porous silicon with slightly decreased capacity and substantially greater average Coulombic efficiency and capacity retention.

Example 5

Heat Treatment of Nano-Featured Porous Silicon

Figure 16:
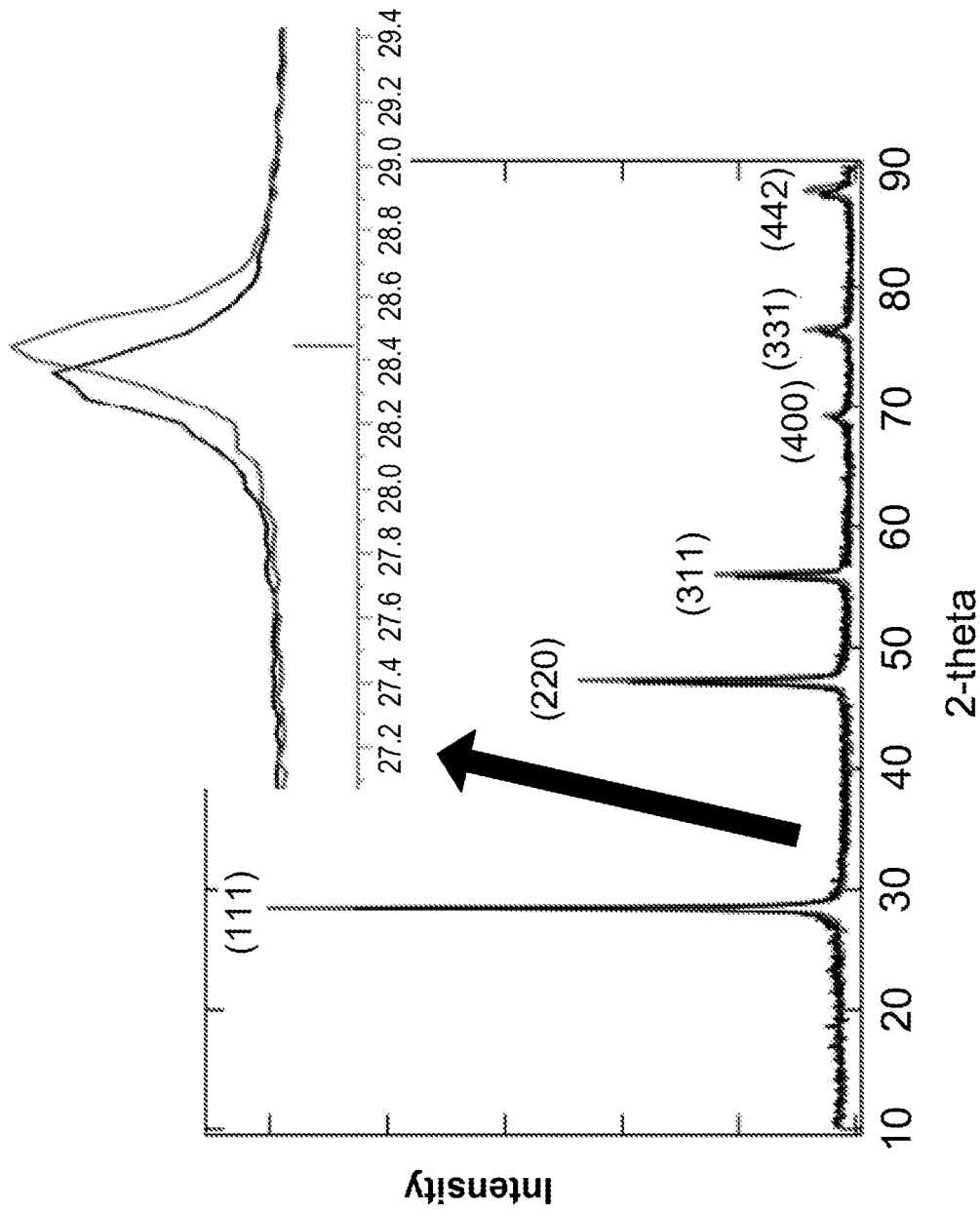
FIG. 16. XRD for nano-featured porous silicons (lighter curve=heat treated, heavier curve=non-heat treated).
Figure 17:
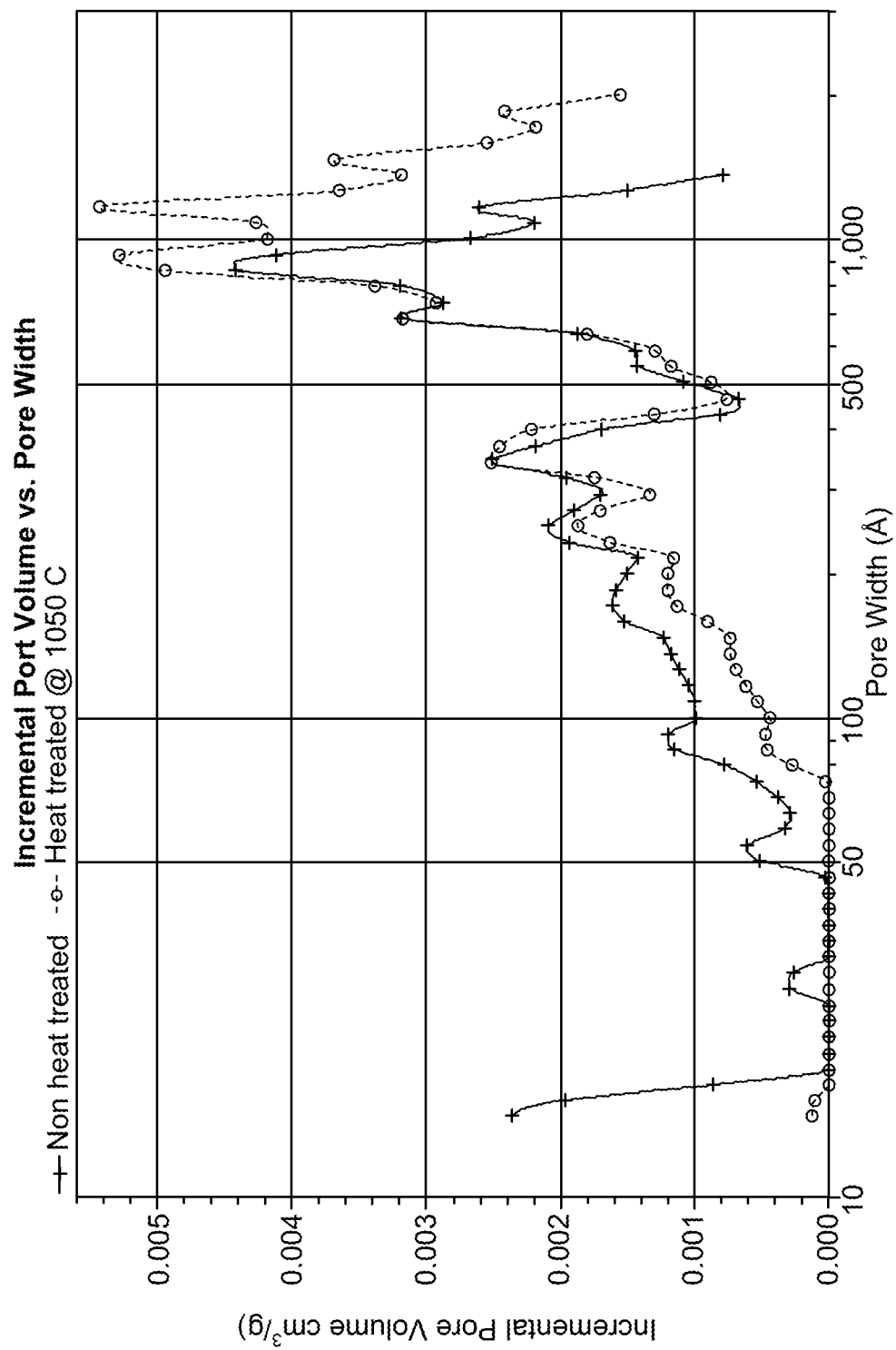
FIG. 17. Pore volume distribution for non-treated and heat-treated nano-featured porous silicons.
Figure 18:
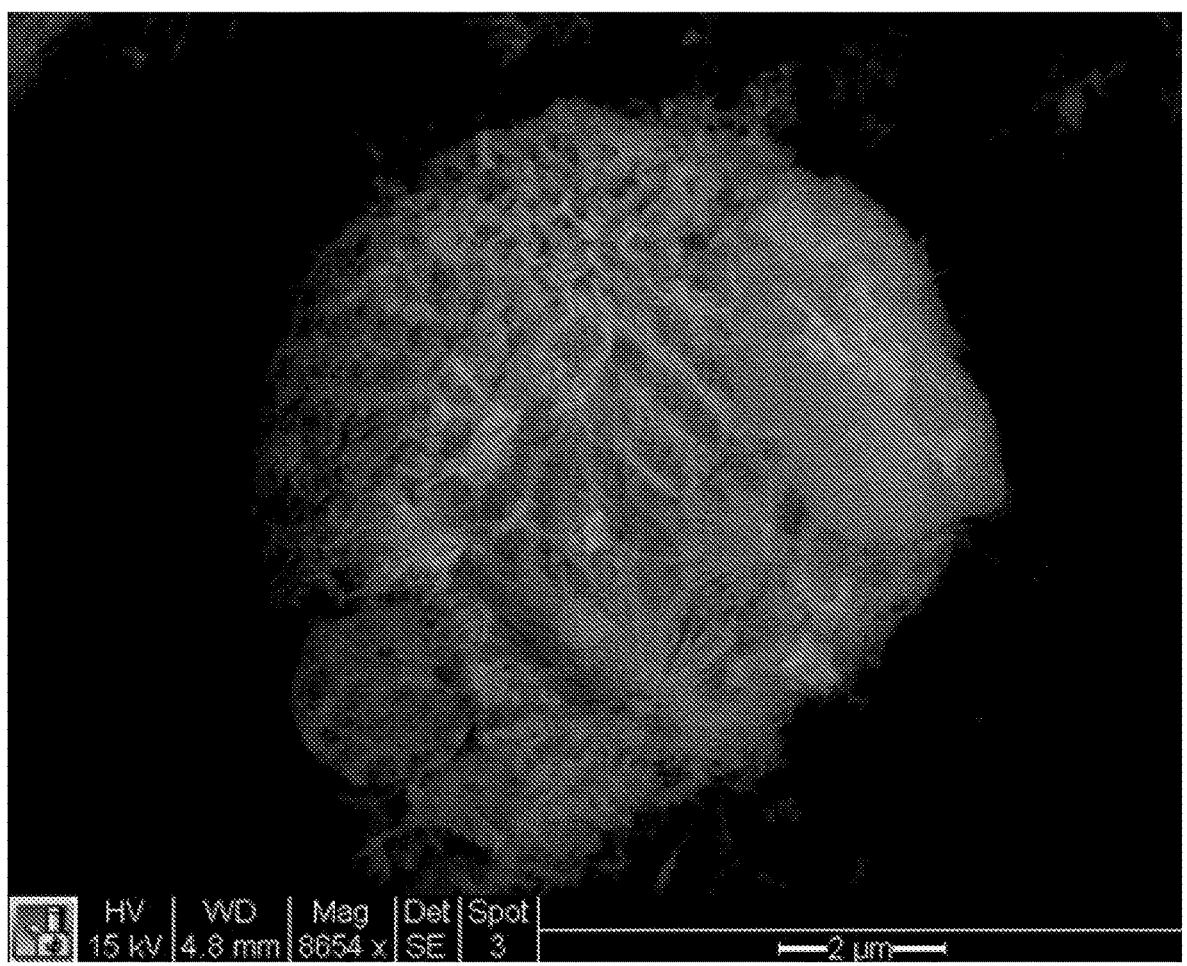
FIG. 18. SEM for heat-treated nano-featured porous silicon.

Nano-featured porous silicon was produced according to the general procedures described herein. Additionally, the nano-featured porous silicon was subjected to heat-treatment, namely incubation at 1050 C for 1 hour under an inert gas flow. The XRD pattern for the pre- and post heat-treatment are depicted in FIG. 16. For the heat-treated nano-featured porous silicon, a unique XRD pattern was observed, including the (111) peak position of 28.43° and calculated crystallite size of 31.91 nm. For comparison, the non-heat-treated webbed Si exhibited a peak position of 28.33° and crystallite size of 29.08 nm. The heat-treated webbed Si more closely matches the 2-theta peak position of a pure crystalline silicon standard (red bar shown in the insert in FIG. 16.). The surface area and pore volume for the non-treated nano-featured porous silicon were 118 m2/g and 0.246 cm3/g, respectively. The pore distribution for the non-treated nano-featured porous silicon was comprised of 18.9% micropores, 45.9% mesopores, and 35.2% macropores. There was a dramatic decrease in the surface area and pore volume after the heat-treatment; specifically, the surface area and pore volume for the heat-treated nano-featured porous silicon were 36 m2/g and 0.174 cm3/g, respectively. The pore distribution for the heat-treated nano-featured porous silicon was comprised of 1.4% micropores, 42.8% mesopores, and 55.9% macropores. A comparison of the pore volume distributions for the sample before and after the heat-treatment in presented in FIG. 17. The heat-treated nano-featured porous silicon was pressed in a pellet press under 1400 lbs of force, resulting in a pellet, and the density of the pressed pellet was 0.90 g/cm3. The same pellet press density was measured for the non heat-treated nano-featured porous silicon, resulting in a value of 1 g/cm3. With respect to particle size, the Dv10, Dv50 and Dv90 for the were heat-treated nano-featured porous silicon were 888 nm, 3130 nm, and 6670 nm, respectively. A representative SEM for the heat-treated nano-featured porous silicon is depicted in FIG. 18. As can be seen, it is surprising and unexpected that the silicon retains the same nano-features, despite being heated and the resulting dramatic reduction in specific surface area and pore volume. Indeed, the nano features are retained and appear similar in nature to those before the heat-treatment. From the pore distributions, it is evident that the heat treatment resulted in decreased in pore volume corresponding to features leading to pores less than 100 A, particularly micropores (pores under 20 A). Also based on the pore distributions, it is evident that the heat treatment resulted in similar pore volume corresponding to features leading to pores between about 100 A and 1000 A, and after heat treatment there was an increase in pore volume corresponding to features greater than 1000 A.

Figure 19:
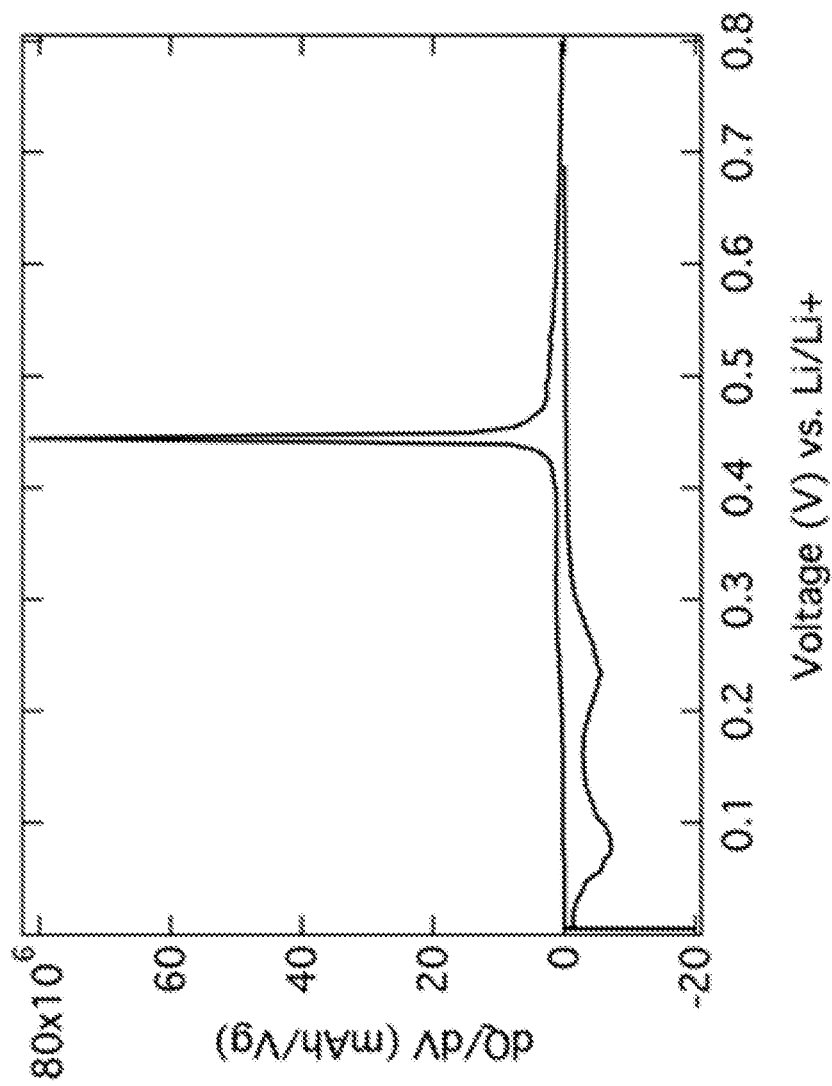
FIG. 19. Differential capacity vs. voltage profile for heat-treated nano-featured silicon in a half-cell (cycle 10).
Figure 20:
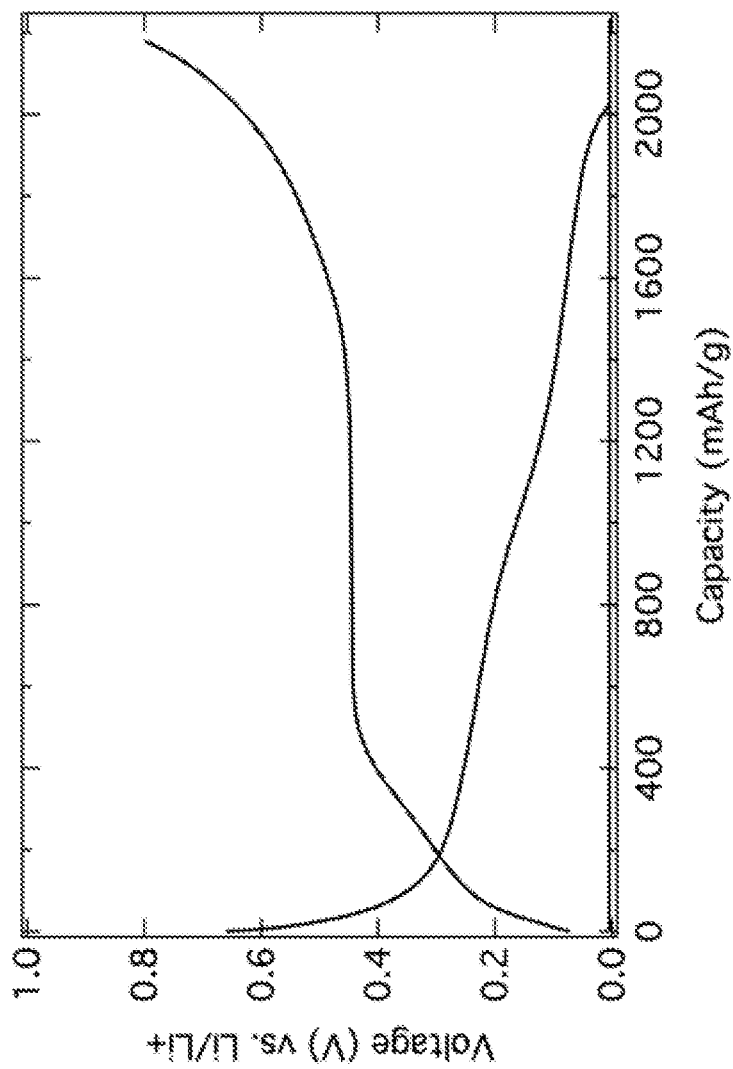
FIG. 20. Voltage profile for heat-threatened nano-featured silicon in a half-cell (cycle 10).

The heat-treated nano-featured porous silicon was tested for electrochemical performance in a lithium-ion half-cell employing techniques generally known in the art. The electrode formulation was comprised of 60% silicon material, 20% sodium CMC as a binder, and 20% conductive carbon (Super P). The first five cycles were conducted as a current rate corresponding to C/10, and the remaining cycles were conducted at a rate of C/5. The first cycle efficiency was 82% and average Coulombic efficiency, for example the average Coulombic efficiency from cycles 7-25 was 97.4%. The differential capacity vs. voltage curve is presented in FIG. 19, and the voltage profile is presented in FIG. 20, both for an exemplary cycle (cycle 10). It can be seen the extraction of lithium from the nano-featured porous silicon at cycle 10 is dominated by a peak located at about 0.4-0.5 V, associated with extraction from the Li15Si4 phase, and demonstrating full lithiation for the silicon phase.

Example 6

EDS Characterization of Nano-Featured Porous Silicon

Samples of the nano-featured porous silicon were examined by Scanning Electron Microscopy-Energy Dispersive Spectroscopy (SEM_EDS). SEM is the basic technique used for imaging. The typical accelerating voltages for the beam are 3-15 kV, with lower accelerating voltages being appropriate for less conductive samples. Generally, EDS can be used in conjunction with SEM to acquire compositional data. Backscattered electron images in the SEM display compositional contrast that results from different atomic number elements and their distribution. Energy Dispersive Spectroscopy (EDS) allows one to identify what those particular elements are and their relative proportions (Atomic % for example). Compositional analysis is achieved when the technique is used to obtain an average composition in a given area of a sample. Percentages (by weight or atomic %) are reported for each element detected in the sample. A "point and ID" method is used when individual particles are identified (used for webbed silicon), and an average area can also be analyzed if individual points of interest are not distinguishable in the sample (used for jet milled webbed silicon). A mapping analysis can also be achieved to obtain spatial distribution of the elements in a given sample.

For the nano-featured porous silicon, a total of 24 different particles on two different samples were analyzed for Si, O and Al content. The data showed the silicon content was 79±5%, the oxygen content was 16±5%, and the aluminum content was 5±1%.

Figure 21:
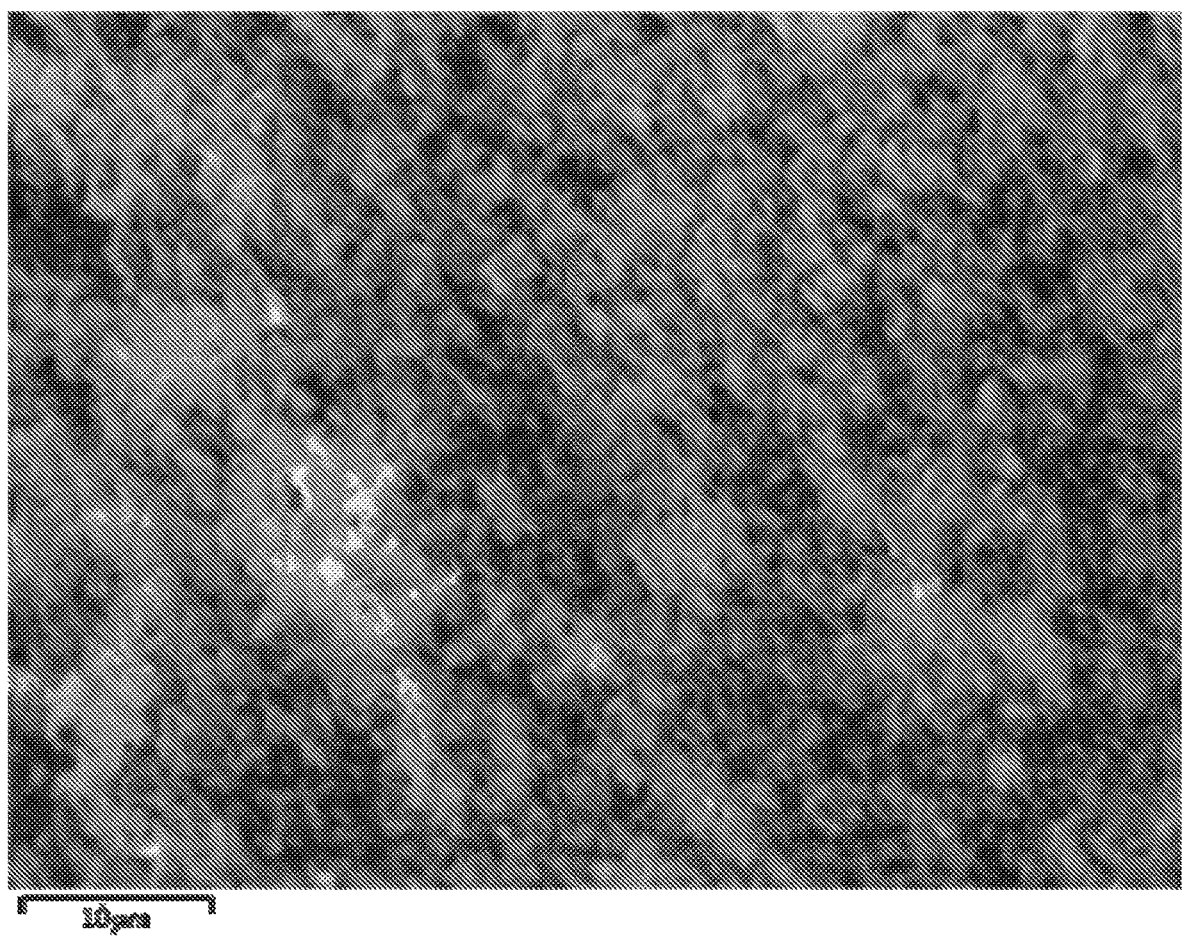
FIG. 21. SEM for nano-sized nano-featured porous silicon.

The nano-featured porous silicon was particle size reduced by jet milling as described elsewhere in this disclosure to yield a nano-sized nano-featured porous silicon. For the nano-sized nano-featured porous silicon, three different areas were analyzed. It was noted that by SEM (FIG. 21), this materials appeared to be sub-micron shards of materials, consistent with the particle size data for the jet milling nano-featured porous silicon presented elsewhere in this disclosure. It appeared to be many small shards of material, rather than particles, so the average of an area containing the material of interest was analyzed. The data showed the silicon content was 77±3%, the oxygen content was 17±3%, and the aluminum content was 6±1%.

Example 7

Electrochemical Characterization of Nano-Featured Porous Silicons

Nano-featured porous silicon was produced according to the general procedures described herein. A variety of different electrode formulations were tested, including the same formulation as described in Example 5, as well as two instances where the active material, binder, and conductive carbon comprised 80%, 10%, and 10% of the electrode mass respectively. In one case, the active material was further comprised of 90% graphite and 10% nano-feature porous silicon, and in the other case, the active material was further comprised of 85% graphite and 15% nano-feature porous silicon. These samples were assembled into half-cells, and tested for five cycles at a rate of C/10, and further cycles at C/5. The electrochemical testing data are summarized in Table 4. Unless otherwise stated, the average Coulombic efficiency and capacity retention are reported over cycle 7 to cycle 25, capacity is reported for cycle 6. A electrochemical half cell comprising substantially the same sample as indicated in the first row of Table 4 was tested for expansion, after the half cell had been cycled 26 times and at 100% state of charge, resulting in a 67% expansion.

TABLE 4

Electrochemical characterization of nano-featured porous silicon in half-cells.

| % Graphite | First cycle efficiency | Capacity | Avg. Coulombic efficiency | Capacity retention |
|---|---|---|---|---|
| 85% | 76% | 629 mAh/g | 0.9901 | 96.9% |
| 90% | 80% | 457 mAh/g | 0.9928 | 97.6% |

The electrochemical performance of the jet milled vs. non jet milled nano-featured porous silicon was conducted. The jet milling, as described in Example 2, was sufficient to yield nano-sized nano-featured silicon particles. The electrochemical characterization is presented in Table 5. The data demonstrate a slightly lower capacity and higher average Coulombic efficiency for the jet milled (e.g., nano sized) nano-featured porous silicon.

TABLE 5

Electrochemical characterization of jet milled vs. non jet milled nano-featured porous silicon in half-cells.

| Jet milled | % Graphite | First cycle efficiency | Capacity | Avg Coulombic efficiency | Capacity retention |
|---|---|---|---|---|---|
| No | 0% | 75% | 2307 mAh/g | 0.9754 | 83.2% |
| Yes | 0% | 75% | 1600 mAh/g | 0.9839 | 100% |
| No | 85% | 76% | 629 mAh/g | 0.9928 | 97.6% |
| Yes | 85% | 80% | 618 mAh/g | 0.9909 | 98.2% |

For the samples processed in the absence of graphite, the average Coulombic efficiency is averaged over cycles 7 to 10, and the capacity retention is calculated as capacity at cycle 10 divided by capacity at cycle 7. The data are consistent with a stability advantage for the nano sized and nano-featured porous silicon over the non particle size reduced material. The data for the electrochemical performance in the presence of 85% graphite also is consistent with improved capacity retention for the case where the silicon particles were sized reduced by jet milling.

Example 8

Electrochemical Characterization of Comparator Silicons

A number of different non-nano-featured, non-porous silicons were obtained and characterized according to the general procedures described herein. The electrochemical testing data are summarized in Table 6.

TABLE 6

Electrochemical characterization of various comparator silicon materials.

| Silicon type | % graphite | First cycle efficiency | Capacity | Avg. Coulombic efficiency | Capacity retention |
|---|---|---|---|---|---|
| Comparator 1, 200 nn size | 0% | 91% | 1984 mAh/g | 0.9325 | 19.4% |
| Comparator 2, 400 nm size | 0% | 88% | 1756 mAh/g | 0.9293 | 19.6% |
| Comparator 3, nano sized | 0% | 65% | 1531 mAh/g | 0.9684 | 61.1% |
| Comparator 3, nano sized | 78.3% | 68% | 529 mAh/g | 0.9900 | 87.7% |

As can be seen, these nano-sized non-porous, comparator silicon all exhibited inferior electrochemical performance compared to the nano-featured, porous silicon materials herein.

Example 9

X-Ray Photoelectron Spectroscopy of Nano-Featured Porous Silicon

X-ray photoelectron spectroscopy (XPS) is a surface-sensitive quantitative spectroscopic technique that measures the elemental composition at the parts per thousand range, empirical formula, chemical state and electronic state of the elements that exist within a material. XPS spectra are obtained by irradiating a material with a beam of X-rays while simultaneously measuring the kinetic energy and number of electrons that escape from the top 0 to 10 nm of the material being analyzed.

Figure 22:
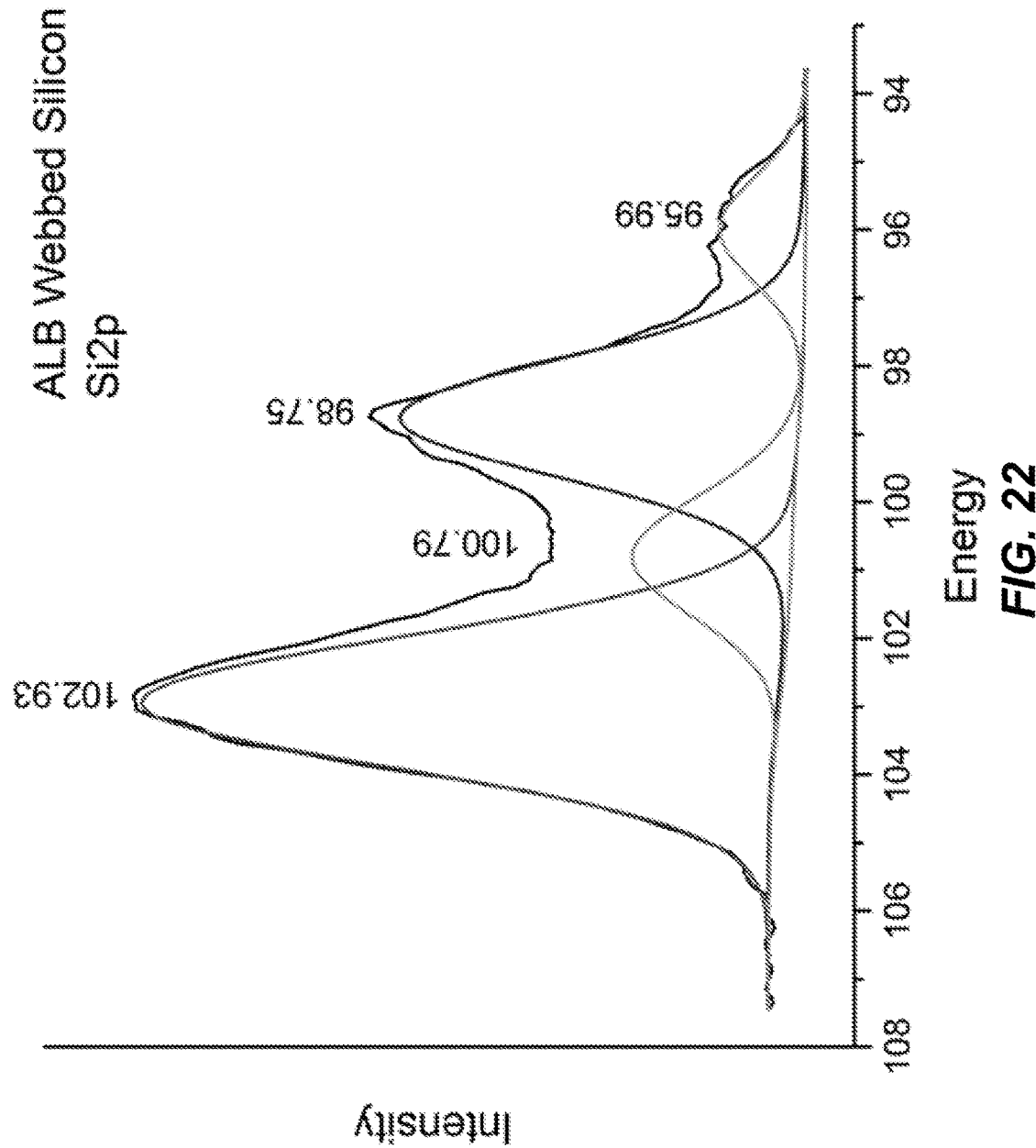
FIG. 22. XPS in the Si2p region for nano-featured porous silicon.

FIG. 22 depicts the curve-fitting of the XPS data for nano-featured porous silicon. The spin orbit splitting of the Si 2p states (binding energies around 100 eV) is clearly resolved. The data demonstrate distinct bonding species corresponding to 102.9 eV, 100.8 eV, 98.8 eV, and 96.0 eV. While not being bound by theory, such species can be assigned according to information available in the art, for example, the NIST database (http://srdata.nist.gov/xps/EnergyTypeValSrch.aspx). Accordingly in this regard, it is known that typical binding energies include Si—Si at ~99-100 eV, Si—C at ~100-101 eV, Si—N at ~102 eV, and SiOx at ~101-104 eV. A surprising and unexpected finding was a peak in the XPS for the nano-featured porous silicon located at 96.0 eV. No Si binding energies below 98 eV are reported in NIST database. This specific XPS feature is a unique property of the nano-featured porous silicon.

Example 10

Treatment of Nano-Featured Porous Silicon with Ammonia Gas

Nano-featured porous silicon was subjected to a flow of ammonia gas while held at 900 C for one hour. This material was tested for electrochemical performance in a half-cell, wherein the anode comprised 60% nano-featured porous silicon, 20% conductive carbon, and 20% binder. The first cycle efficiency was 80%, the capacity at cycle 6 was 1641 mAh/g, the average Coulombic efficiency over cycles 7 to cycle 25 was 0.9815, and the capacity retention at cycle 25 relative to cycle 10 was 98.2%.

Example 11

Production of Porous Silicon Materials in a Dunk Tank

Without being bound by theory, two of the important considerations in preparation of porous silicon materials as described herein are 1) the reaction moves faster with a higher concentration of acid and higher temperature, and 2) higher concentrations and higher temperatures can lead to thermal runaway. Rather than add cooling coils, if you have enough other mass to absorb the heat, you can prevent thermal runaway.

Figure 23:
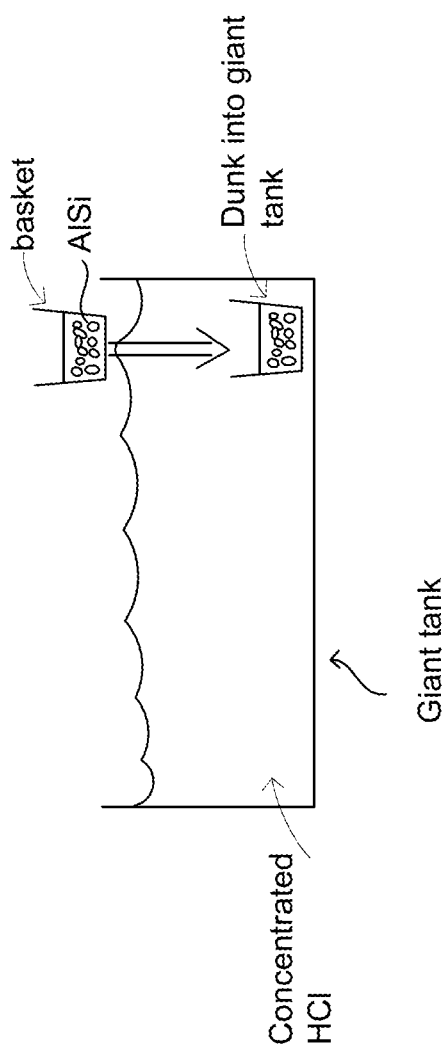
FIG. 23. Schematic of dunk tank for production of nano-featured porous silicon.

To ameliorate this situation, a large vessel can be employed containing excess reactant HCL or other appropriate etchant solution (for example, greater than 100× theoretical requirement to etch the silicon alloy). The Si—Al powder is put into a specially designed basket that has a solid bottom and solid sides but a mesh or open top to allow for the movement of liquids. The basket is dropped into the tank. After a brief induction period, the reaction will happen very quickly because of the high acid concentration. Hydrogen gas will be generated and the solution may locally boil. Overall, the entire tank temperature will not rise because of the large amount of heat exchanging material. The concentration of the solution will also remain virtually unchanged. After reacting the basket will be pulled, washed and dried. The appropriate choice of materials for this purpose, and design specifics and additions, such as a conveyor to allow for continuous processing, are known in the engineering art. A schematic of the dunk tank is presented in FIG. 23.

Example 12

Alternate Approach to Al—Si Etching with Chlorine Gas

The following method reduces the exothermic nature of mixing the alloy with HCl and also eliminates the generation of hydrogen gas: SiAl powder is loaded into a kiln and heated to between 100 and 1000° C. under nitrogen then switched to chlorine gas. The temperature in the kiln can be between 150 and 1050 C, for example, between 50 and 150 C, for example between 150 and 250 C, for example between 250 and 350 C, for example between 350 and 450 C, for example between 450 and 550 C, for example between 550 and 650 C, for example between 650 and 750 C, for example between 750 and 850 C, for example between 850 and 950 C, for example between 950 and 1050 C, for example between 350 and 850 C. The kiln can be of various designs as roller hearth kiln, rotary kiln, fluidized bed design, elevator kiln, and other designs as known in the art. The materials of construction are compatible with the reactant gases, and selection of appropriate materials to this end is known in the art.

The Al in the alloy being more reactive than the silicon reacts with the chlorine gas via a vapor-solid reaction, forming aluminum chloride. Alternate gases than chlorine, for example HCL vapor or F vapor may be employed for this purpose. The material is subsequently washed and filtered to remove the aluminum chloride leaving the webbed silicon behind. One skilled in the engineering art can select appropriate materials and specific of construction for this purpose, for example, the above process may be carried out in various

Example 13

Production of Porous Silicon in a Continuous Feed Reactor

Without being bound by theory, porous silicon can be advantageously produced in a easily scalable fashion in a continuous feed reactor. In one exemplary embodiment, the silicon alloy to be etched initially is stored in an acid starved environment where the initial incubation of the material is performed. The silicon alloy material is then charged into a tubular reactor, for instance one that it slightly inclined from the horizontal, to facilitate the movement of the silicon material down the reactor tube. The reactor may by rotating or stationary. The silicon alloy material may be fed as a solid or as a slurry, for example an aqueous slurry. Acid is then added to the silicon alloy material. One in embodiment, the acid is added to the silicon material once it is already travelling through the reaction tube. In an alternate embodiment, the acid is added to the silicon alloy prior to introduction in the reaction tube. The acid can be added as a solid or as a liquid. Preferably, the acid is an aqueous solution of hydrochloric acid. In certain configurations, the reaction tube has adequate head space or other venting mechanism to accommodate the vigorous gas generation and or/boiling that occurs as a result of the acid etching the silicon alloy. The tube angle and rotation speed can be adjusted, for example to achieve a one hour residence time. Shorter and longer residence times, as well as multiple passes of the silicon alloy through the reactor, can also be achieved. In one embodiment, multiple reaction tubes can be fed by a single vessel (or hopper). The reaction tube has an optional auger to increase effective path length and facilitate materials travelling through the reactor. In one embodiment, the material exits the tube and moves into a collection vessel where reaction can continue at a much slower pace with ventilation but without other controls. The selection of reactor and other product-contact materials are selected for the compatibility with the silicon alloy and acid components, as known in the art. In certain embodiments, the internal geometry of the reaction tube is engineered for increasing residence time or product mixing, for example, lifters can be employed within the reaction tube. The tube can also be open geometry, for example an open trough. In certain embodiments, the tube can be mounted vertically rather than horizontally and materials can be dropped into the tube from the top, with the mixing of acid and silicon alloy and the subsequent reaction occurs as the materials travel down through the tube. The reactor is not limited to cylindrical geometries: conical, rectangular, and other geometries can be employed. In certain cases, the reactor can have various zones, where different points of the reaction and/or different extents of reaction between the acid and the silicon alloy occur. For example, the reactor can be a channel-plate reactor type, with sequentially changing (for example decreasing) channel sizes, and/or can have increasing lengths and linear velocity of materials flowing through the various zones. In certain embodiments, the concentration of acid in increased as the material moves down the reactor, for example to complete the reaction. The reactor is designed for appropriate heat addition and removal, as known in the art. types of reactors, for example a fluid bed reactor, and continuous throughput system such as a roller hearth kiln, and the like, as known in the art.

Example 14

Electrochemical Synthesis of Nano-Featured Porous Silicon

Figure 24:
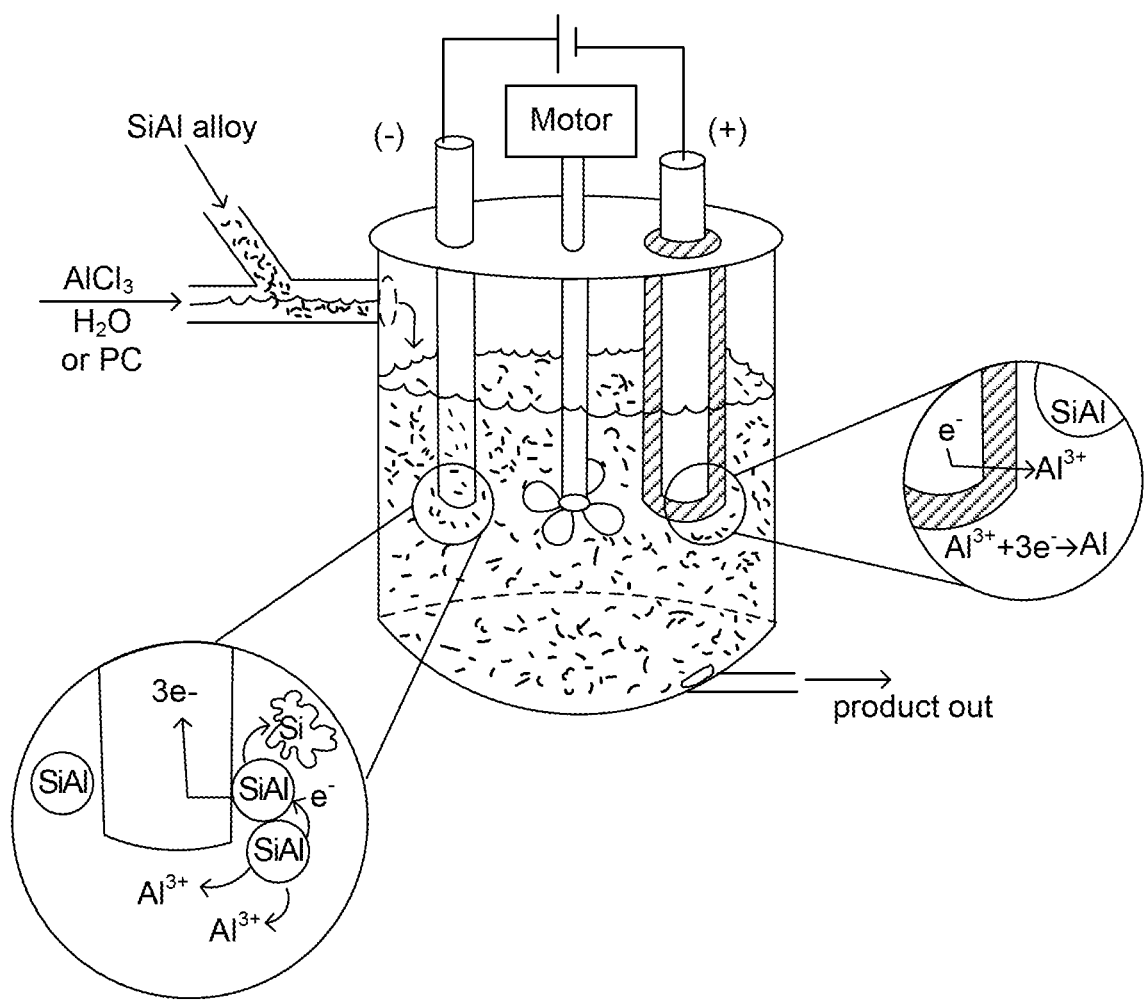
FIG. 24. Schematic of electrochemical process for production of nano-featured porous silicon.

This example describes a method for synthesizing nano-featured porous silicon from a SiAl alloy feedstock. The method itself utilizes an electrochemical method to anodically dissolute the aluminum from the alloy and thus foregoes the use of strong acids (e.g., HCl). Additionally, schematics and experimental information is also described so to perform these synthesis methods safely and conveniently. The function of the invention is to provide a method, tailored specifically for the synthesis of a porous elemental silicon material in which aluminum is electrochemically removed from the base SiAl alloy leaving behind a porous silicon material. A schematic of the electrochemical synthesis of nano-featured porous silicon is presented in FIG. 24.

Certain embodiments of producing nano-featured porous silicon involves highly corrosive etching of SiAl alloy powders using hydrochloric acid (HCl). Though this method is rather simple and cheap the exothermic nature of the reaction and flammable hydrogen generation inhibits high throughput and can lead to severe safety hazards if performed incorrectly. This example describes a simple electrochemical method to remove aluminum from the SiAl alloy without generation of hydrogen or heat. Additionally, the method requires no acids and can be performed on both small and large scales using conventional equipment.

The process involves relatively few necessary components; container with continuous mixer, inert gas flow, non-reactive metal electrodes (e.g., platinum, tungsten, etc.), silicon-aluminum alloy (micronized), and aluminum chloride as a supporting electrolyte. The silicon-aluminum alloy is loaded into a vessel containing an aqueous (or organic) solution of aluminum trichloride. The amount of silicon-alloy powder suspended in solution is controlled such that the entire solution is electrically conductive. The cathode in solution will need to be covered by a porous separator so as to allow electrolyte penetration but not silicon alloy contact. The vessel begins mixing and then voltage is applied. During this process silicon-alloy in contact with the anode is oxidized resulting aluminum-ion dissolution into solution and thus generation of pores in the silicon structure left behind. At the same time aluminum ions are generated and migrate to the cathode where they are reduced causing aluminum to plate out of solution. The concept relies on the assumption that aluminum metal is more prone to oxidation than silicon and results stable aqueous solution (where silicon-ions are not). The anodic dissolution reaction would be self-terminating once all of the aluminum has been removed from the alloy (i.e., current drops to near zero). The extent of aluminum dissolution can be controlled by a number of factors in the invention. By increasing or decreasing the dissolution (voltage on) time in the container as well as the voltage. The design also allows for a continuous or semi-batch process at large scale where in silicon-aluminum alloy slurry is pumped into a continuous stir tank. Aluminum is dissoluted/plated then pumped from the bottom to remove the porous silicon product. In a certain embodiment of the invention, the silicon-aluminum alloy is in the form of electrodes (on current collectors) rather than powder to make porous silicon monoliths.

Example 15 tXRF Purity Analysis of Nano-Featured Silicon

Nano-features silicon was produced according to the procedures generally described herein. The resulting silicon was tested for purity using total X-ray flrourecence (tXRF) analysis. Elements wherein the levels were at or below the recording limit or detection limit and not reported. The elements detected and their levels (in ppm) were as follows: Al=36073 ppm, Cl=283 ppm, K=30 ppm, Ti=24 ppm, V=16 ppm, Cr=13 ppm, Mn=29 ppm, Fe=3155 ppm, Ni=140 ppm, Cu=731 ppm, Br=8.2 ppm, W=1.9 ppm, Pb=9.5 ppm.

Example 16

Measurements of Skeletal Density by Pycnometry for Various Comparator Materials

A variety of different samples were analyzed for their skeletal density using an AccuPyc II 1340 Pycnometer, a known method for determining skeletal density in the art. These data are summarized in Table 7. The samples tested include silicon controls and silicon oxide controls. The data for the two silicon controls demonstrate a skeletal density (also referred in textbooks as "true density") very similar to that reported in textbooks of about 2.3 g/cm$^3$. As can be seen, the measured data for both silicon and SiOx comparator materials exhibit a skeletal density of at least 2.26 g/cm$^3$. These data are similar to the values expected according to the literature as known in the art. Data are also presented for the skeletal density of the SiAl alloys employed, and the data demonstrate about 2.7 g/cm$^3$.

TABLE 7

Skeletal Density of Comparator Silicon Materials.

| Sample | Density (g/cm3) |
|---|---|
| Silicon Comparator 1 | 2.3073 |
| Silicon Comparator 1, second measurement | 2.2979 |
| Silicon Comparator 2 | 2.2634 |
| Silicon Oxide (SiOx) Comparator 1 | 2.2710 |
| Silicon Oxide (SiOx) Comparator 2 | 2.2542 |
| Silicon Oxide (SiOx) Comparator 3 | 2.2533 |
| SiAl Alloy Type 12-S2 | 2.6606 |
| SiAl Alloy Type 12-S8 | 2.6505 |

Example 17

Measurements of Skeletal Density by Pycnometry for Various Porous, Nano-Featured Silicon Materials A variety of different samples were analyzed for their skeletal density using an AccuPyc II 1340 Pycnometer, a known method for determining skeletal density in the art. These data are summarized in Table 8. The samples tested include various nano-featured silicons produced according to the processes described in Example 4. As can be seen, the skeletal densities that were measured for these samples are all below 2.2 g/cm3, except for samples 4-10 and 4-11. Without being bound by theory, these latter two samples have higher densities since they have a higher starting excess of aluminum (30%) compared to the other samples. All samples where less than 30% excess Al was employ yielded nano-featured silicon with skeletal density less than 2.2 g/cm,$^3$ and less than the skeletal density measured for other silicon materials. Other ranges of skeletal density for the nano-featured silicon described herein are measured or envisioned, for example less than 2.1 g/cm$^3$, for example less than 2.0 g/cm$^3$, for example less than 2.0 g/cm$^3$, for example less than 2.0 g/cm$^3$, for example less than 1.9 g/cm$^3$, for example less than 1.8 g/cm$^3$, for example less than 1.5 g/cm$^3$, Without being bound by theory, the data demonstrate that there is trapped porosity within the nano-featured porous silicon material, i.e., porosity inaccessible to the pcynometry technique (helium gas as probe). Importantly, trapped porosity within the nano-featured porous silicon is a feature that promotes friability. Furthermore, this trapped porosity should be advantageous for electrochemical performance of the nano-featured porous silicon; without being bound by theory, it represents volume available to be filled upon lithiation of the nano-featured porous silicon without expansion of the volume enveloped by the nano-featured porous silicon particle.

TABLE 8

Skeletal Density of Various Nano-Featured Silicon Materials by Pycnometry.

| Sample | Density (g/cm3) |
|---|---|
| 4-1 | 2.1759 |
| 4-2 | 2.1237 |
| 4-3 | 2.1791 |
| 4-5 | 2.1711 |
| 4-6 | 2.1614 |
| 4-8 | 2.1641 |
| 4-10 | 2.2890 |
| 4-11 | 2.2883 |

Example 18

Measurements of Skeletal Density by Pycnometry for Pilot-Scale Produced Porous, Nano-Featured Silicon Materials Table 9 summarizes the skeletal density data for a variety of nano-featured porous silicon materials that were generally produced according to the procedures described for sample 4-2 at pilot scale (i.e., using a pilot manufacturing scale reactor vessel to produced the silicon from the SiAl alloy and a pilot manufacturing scale centrifuge for removing water). The different samples represent variations in various pilot scale manufacturing process variables, such as sieving with 38 um sieve to remove any particles presented that were larger than 38 um in size, drying at elevated temperature (e.g., >100 C) to remove residual water from the nano-featured porous silicon particles after they were collected via centrifugation, and other process steps and variables known in the art. As can be seen, the skeletal densities for all the pilot scale batches produced for nano-featured silicons exhibited skeletal densities less than 2.2 g/cm$^3$. Similar to the data presented in Example 17, the data for the samples for the current Example indicate the presence of volume within the nano-featured porous silicon that is not available as measured by pcynometry (helium probe). This feature of skeletal density lower than other comparators silicons provides the benefits as described in the previous Example.

TABLE 9

Skeletal Density of Various Nano-Featured Silicon Materials by Pycnometry.

| Sample | Total |
|---|---|
| Pilot Sample 1 | 2.0320 |
| Pilot Sample 2 | 2.1336 |
| Pilot Sample 3 | 2.1330 |
| Pilot Sample 4 | 2.1597 |
| Pilot Sample 5 | 1.9975 |

Example 19

Pore Volume and Surface Area Analysis for Pilot-Scale Produced Porous, Nano-Featured Silicon Materials Table 10 summarizes the pore volume and surface area analyses via nitrogen sorption for various porous, nano-featured silicon materials that were generally produced according to the procedures described for sample 4-2 at pilot scale (i.e., using a pilot manufacturing scale reactor vessel to produced the silicon from the SiAl alloy and a pilot manufacturing scale centrifuge for removing water). The different samples represent variations in various pilot scale manufacturing process variables, such as sieving with 38 um sieve to remove any particles presented that were larger than 38 um in size, drying at elevated temperature to remove residual water from the nano-featured porous silicon particles after they were collected via centrifugation, the addition of jet milling to produce nano-sized, nano-featured porous silicon, and other process steps and variables known in the art.

TABLE 10

Skeletal Density of Various Nano-Featured Silicon Materials by Pycnometry.

| Sample | Surface Area (m2/g) | Pore Volume (cm3/g) | Pore Volume Distribution (% micro-, % meso-, % marcoporous |
|---|---|---|---|
| Pilot Sample 2 | 78 | 0.183 | 12.0, 46.2, 41.8 |
| Pilot Sample 2, Jet milled | 67 | 0.087 | 13.3, 47.9, 38.8 |
| Pilot Sample 6 | 108 | 0.262 | 11.6, 47.8, 40.6 |
| Pilot Sample 7 | 118 | 0.246 | 18.4, 44.7, 36.9 |
| Pilot Sample 8 | 66 | 0.223 | 4.2, 57.3, 38.6 |
| Pilot Sample 9 | 32 | 0.089 | 8.4, 45.9, 45.6 |
| Pilot Sample 10 | 68 | 0.155 | 13.3, 58.2, 28.5 |

Example 20

Pore Volume and Surface Area Analysis for Aluminum-Silicon Alloys

Various Al—Si Silicon alloys were analyzed for their pore volume and surface area analyses via nitrogen sorption analysis. For Al—Si alloy denoted "20-10 um" type, the measured surface area was 0.2968 m2/g, with negligible pore volume recorded. The measured pore volume was negligible. For Al—Si alloy denoted "25-10 um" type, the measured surface area was 0.2433 m2/g, with negligible pore volume recorded. The measured pore volume was negligible.

Certain exemplary embodiments of the invention are as follows:

Embodiment 1

A nano-featured porous silicon material comprising a skeletal density less than 2.2 g/cm$^3$ as measured by helium pcynometry.

Embodiment 2

The nano-featured porous silicon of embodiment 1, wherein the skeletal density is less than 2.1 g/cm$^3$.

Embodiment 3

The nano-featured porous silicon of embodiment 1, wherein the skeletal density is less than 2.0 g/cm$^3$.

Embodiment 4

The nano-featured porous silicon of any one of embodiments 1 to 3, having a friability greater than 10%

Embodiment 5

The nano-featured porous silicon of any one of embodiments 1 to 3, having a friability greater than 50%

Embodiment 6

The nano-featured porous silicon of any one of embodiments 1 to 5, having a characteristic thickness of nano features of less than 300 nm.

Embodiment 7

The nano-featured porous silicon of any one of embodiments 1 to 5, having a characteristic thickness of nano features of less than 100 nm.

Embodiment 8

The nano-featured porous silicon of any one of embodiments 1 to 5, having a characteristic thickness of nano features of less than 50 nm.

Embodiment 9

The nano-featured porous silicon of any one of embodiments 1 to 5, having a characteristic thickness of nano features of less than 30 nm.

Embodiment 10

The nano-featured porous silicon of any one of embodiments 1 to 5, having a characteristic thickness of nano features of less than 15 nm.

Embodiment 11

The nano-featured porous silicon of any one of embodiments 1 to 5, having a characteristic distance between silicon nano features of the nano features of less than 300 nm.

Embodiment 12

The nano-featured porous silicon of any one of embodiments 1 to 5, having a characteristic distance between silicon nano features of the nano features of less than 100 nm.

Embodiment 13

The nano-featured porous silicon of any one of embodiments 1 to 5, having a characteristic distance between silicon nano features of the nano features of less than 50 nm.

Embodiment 14

The nano-featured porous silicon of any one of embodiments 1 to 5, having a characteristic distance between silicon nano features of the nano features of less than 30 nm.

Embodiment 15

The nano-featured porous silicon of any one of embodiments 1 to 5, having a characteristic distance between silicon nano features of the nano features of less than 15 nm.

Embodiment 16

The nano-featured porous silicon of any one of embodiments 1-15, wherein the nano-featured porous silicon comprises a specific surface area between 30 and 230 m$^2$/g and a pore volume between 0.1 and 0.5 cm$^3$/g.

Embodiment 17

The nano-featured porous silicon of embodiment 16, wherein the nano-featured porous silicon comprises a specific surface area between 30 and 100 m$^2$/g and a pore volume between 0.1 and 0.5 cm3/g.

Embodiment 18

The nano-featured porous silicon of any one of embodiments 1-17, wherein the nano-featured porous silicon comprises less than 40% micropores, between 30 and 40% mesopores, and between 20 and 30% macropores.

Embodiment 19

The nano-featured porous silicon of any one of embodiments 1-17, wherein the nano-featured porous silicon comprises less than 20% micropores, between 30 and 60% mesopores, and between 20 and 50% macropores.

Embodiment 20

The nano-featured porous silicon of any one of embodiments 1-17, wherein the nano-featured porous silicon comprises less than 10% micropores, between 40 and 70% mesopores, and between 20 and 50% macropores.

Embodiment 21

The nano-featured porous silicon of any one of embodiments 1-17, wherein the nano-featured porous silicon comprises less than 5% micropores, between 40 and 50% mesopores, and between 40 and 50% macropores.

Embodiment 22

The nano-featured porous silicon of any one of embodiments 1-17, wherein the nano-featured porous silicon comprises less than 2% micropores, between 40 and 50% mesopores, and between 50 and 60% macropores.

Embodiment 23

The nano-featured porous silicon of any one of embodiments 1-22, wherein the nano-featured porous silicon exhibits a capacity of at least 1600 mAh/g and an average Coulombic efficiency of at least 0.98 when tested in a lithium ion half-cell cycled between 0.8 V and 0.005 V, where the counter electrode is lithium metal, the electrolyte comprises 1M LiPF$_6$ in a solvent comprised of 2:1 iethylene carbonate:diethylcarbonate (EC:DEC) and 10% (w/w) fluoroethylenecarbonate (FEC) and employing a polypropylene separator.

Embodiment 24

The nano-featured porous silicon of embodiment 23, wherein the nano-featured porous silicon exhibits a capacity of at least 2300 mAh/g and an average Coulombic efficiency of at least 0.97.

Embodiment 25

The nano-featured porous silicon of any one of embodiments 1-24, having an oxygen content from 1 to 20% by weight, and an aluminum content from 1 to 30% by weight.

Embodiment 26

The nano-featured porous silicon of embodiment 25, comprising from 1 to 10% by weight aluminum.

Embodiment 27

The nano-featured porous silicon of any one of embodiments 1-26, wherein the nano-featured porous silicon comprises a Dv50 less than 1000 nm.

Embodiment 28

The nano-featured porous silicon of any one of embodiments 1-26, wherein the nano-featured porous silicon comprises a Dv50 less than 800 nm.

Embodiment 29

The nano-featured porous silicon of any one of embodiments 1-26, wherein the nano-featured porous silicon comprises a Dv50 less than 300 nm.

Embodiment 30

The nano-featured porous silicon of any one of embodiments 1-26, wherein the nano-featured porous silicon comprises a Dv50 less than 150 nm.

Embodiment 31

The nano-featured porous silicon of any one of embodiments 1-26, wherein the nano-featured porous silicon comprises a Dv50 less than 100 nm.

Embodiment 32

The nano-featured porous silicon of any one of embodiments 1-26, wherein the nano-featured porous silicon comprises a Dv50 less than 50 nm.

Embodiment 33

The nano-featured porous silicon of any one of embodiments 1-26, wherein the nano-featured porous silicon comprises a Dv50 less than 15 nm.

Embodiment 34

The nano-featured porous silicon of any one of embodiments 1-15, having a surface area of 30 to 120 m2/g, a pore volume of 0.08 to 0.3 cm3/g, wherein the pore volume is comprised of 5 to 40% micropores, 35-70% mesopores, and 30-60% macropores.

Embodiment 35

The nano-featured porous silicon of any one of embodiments 1-15, having a surface area of 30 to 120 m2/g, a pore volume of 0.09 to 0.18 cm3/g, wherein the pore volume is comprised of 5 to 15% micropores, 45-55% mesopores, and 30-45% macropores.

Embodiment 36

An electrode comprising a nano-featured porous silicon according to any one of embodiments 1-35.

Embodiment 37

The electrode of embodiment 36, wherein the electrode is an anode.

Embodiment 38

An energy storage device comprising a nano-featured porous silicon according to any one of embodiments 1-35 or the electrode of embodiment 36 or 37.

Embodiment 39

The energy storage device of embodiment 38, wherein the energy storage device further comprises a lithium ion battery.

Embodiment 40

A method for producing nano-featured porous silicon particles comprising:
a) suspending particles of a silicon alloy in a liquid medium containing a dissolved acid;
b) storing the suspended particles for a period of time at sufficient temperature to allow for erosion of metal cations from the silicon alloy in to the liquid medium to yield porous silicon particles with nano-sized features; and
c) removing the liquid medium to yield dried porous silicon particles with nano-sized features.

Embodiment 41

The method of embodiment 40, wherein the particles of the silicon alloy comprise a silicon-aluminum alloy.

Embodiment 42

The method of embodiment 41, wherein the silicon-aluminum alloy particles comprise a Dv50 between 1 um and 20 um.

Embodiment 43

The method of embodiment 40, wherein the liquid medium comprises aqueous hydrochloric acid, and the temperature is between 25 and 100° C.

Embodiment 44

The method of embodiment 41, wherein the Al in the alloy is present at less than 30% by weight.

Embodiment 45

The method of any one of embodiments 40-44, wherein the erosion of metal cations is conducted in a continuous feed reactor.

Embodiment 46

The method of any one of embodiments 40-44, wherein the erosion of metal cations is conducted in a dunk tank.

Embodiment 47

The method of any one of embodiments 40-44, wherein the liquid removal is accomplished by subjecting the porous silicon particles to centrifugation, vacuum, or elevated temperature, or combinations thereof.

Embodiment 48

A method for producing nano-featured porous silicon particles comprising:
a) heating particles of a silicon metal alloy at a temperature between 350 and 850 C in the presence of nitrogen;
b) holding the particles of a silicon metal alloy at a temperature between 350 and 850 C in the presence of an etching gas comprising chlorine, hydrochloric acid, fluorine, or combinations thereof, to allow for creation of a metal chloride, metal fluoride, or combinations thereof; and
c) cooling the mixture, and removing the metal chloride, metal fluoride, or combinations thereof, to yield a nano-featured porous silicon.

The various embodiments described above can be combined to provide further embodiments. To the extent that they are not inconsistent with the specific teachings and definitions herein, U.S. patent application Ser. Nos. 62/205,542, filed Aug. 14, 2015; 62/208,357 filed Aug. 21, 2015; 62/209,651 filed Aug. 25, 2015; 62/271,795 filed Dec. 28, 2015 and 62/271,799 filed Dec. 28, 2015; all of the U.S. patents, U.S. patent application publications, U.S. patent applications, foreign patents, foreign patent applications and non-patent publications referred to in this specification are incorporated herein by reference, in their entirety to the extent not inconsistent with the present description.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for producing nano-featured porous silicon particles comprising:
   a) heating particles of a silicon metal alloy at a temperature between 350 and 850° C. in the presence of nitrogen;
   b) holding a mixture of an etching gas comprising chlorine, hydrochloric acid, fluorine, or combinations thereof, and the particles of the silicon metal alloy at a temperature between 350 and 850° C., to allow for creation of a metal chloride, metal fluoride, or combinations thereof; and
   c) cooling the mixture, and removing the metal chloride, metal fluoride, or combinations thereof, to yield the nano-featured porous silicon particles.

2. The method of claim 1, wherein the silicon metal alloy comprises Al—Si.

3. The method of claim 1, wherein the mixture is held at a temperature between 450 and 550°.

4. The method of claim 1, wherein the etching gas comprises chlorine.

5. The method of claim 1, wherein the etching gas comprises hydrochloric acid.

6. The method of claim 1, wherein the etching gas comprises fluorine.

7. The method of claim 1, wherein the heating and holding is performed in a kiln or fluidized bed reactor.

8. The method of claim 7, wherein the kiln is a roller hearth kiln, rotary kiln, or elevator kiln.

9. The method of claim 1, wherein the nano-featured porous silicon particles comprise a skeletal density less than 2.2 g/cm$^3$, as measured by helium pcynometry.

10. The method of claim 1, wherein the nano-featured porous silicon particles comprise a friability greater than 10%.

11. The method of claim 1, wherein the nano-featured porous silicon particles comprise a characteristic thickness of nano features of less than 300 nm.

12. The method of claim 1, wherein the nano-featured porous silicon particles comprise a characteristic distance between silicon nano features of less than 300 nm.

13. The method of claim 1, wherein the nano-featured porous silicon particles comprise a specific surface area between 30 and 230 m$^2$/g and a pore volume between 0.1 and 0.5 cm$^3$/g.

14. The method of claim 1, wherein the nano-featured porous silicon particles comprise less than 40% micropores, between 30 and 40% mesopores, and between 20 and 30% macropores.

15. The method of claim 1, wherein the nano-featured porous silicon particles comprise less than 20% micropores, between 30 and 60% mesopores, and between 20 and 50% macropores.

16. The method of claim 1, wherein the nano-featured porous silicon particles comprise less than 10% micropores, between 40 and 70% mesopores, and between 20 and 50% macropores.

17. The method of claim 1, wherein the nano-featured porous silicon particles comprise less than 5% micropores, between 40 and 50% mesopores, and between 40 and 50% macropores.

18. The method of claim 1, wherein the nano-featured porous silicon particles comprise less than 2% micropores, between 40 and 50% mesopores, and between 50 and 60% macropores.

19. The method of claim 1, wherein the nano-featured porous silicon particles exhibit a capacity of at least 1600 mAh/g and an average Coulombic efficiency of at least 0.98 when tested in a lithium ion half-cell cycled between 0.8 V and 0.005 V, where the counter electrode is lithium metal, the electrolyte comprises 1M LiPF$_6$ in a solvent comprised of 2:1 iethylene carbonate: diethyl carbonate (EC:DEC) and 10% (w/w) fluoroethylenecarbonate (FEC) and employing a polypropylene separator.

20. The method of claim 1, wherein the nano-featured porous silicon particles exhibit a capacity of at least 2300 mAh/g and an average Coulombic efficiency of at least 0.97.

21. The method of claim 1, wherein the nano-featured porous silicon particles comprise an oxygen content from 1 to 20% by weight, and an aluminum content from 1 to 30% by weight.

22. The method of claim 1, wherein the nano-featured porous silicon particles comprise a Dv50 less than 1000 nm.

23. The method of claim 1, wherein the nano-featured porous silicon particles comprise a surface area of 30 to 120 m$^2$/g, a pore volume of 0.08 to 0.3 cm$^3$/g, wherein the pore volume comprises 5 to 40% micropores, 35-70% mesopores, and 30-60% macropores.

24. The method of claim 1, wherein the nano-featured porous silicon particles comprise a surface area of 30 to 120 m$^2$/g, and a pore volume of 0.09 to 0.18 cm$^3$/g, wherein the pore volume is comprised of 5 to 15% micropores, 45-55% mesopores, and 30-45% macropores.

* * * * *